US011004160B2

(12) United States Patent
Brockman et al.

(10) Patent No.: US 11,004,160 B2
(45) Date of Patent: *May 11, 2021

(54) SYSTEMS AND METHODS FOR ADVANCED ENERGY NETWORK

(71) Applicant: Causam Enterprises, Inc., Raleigh, NC (US)

(72) Inventors: Nathaniel Taylor Brockman, Mt. Pleasant, SC (US); Joseph W. Forbes, Jr., Raleigh, NC (US)

(73) Assignee: CAUSAM ENTERPRISES, INC., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/678,208

(22) Filed: Nov. 8, 2019

(65) Prior Publication Data
US 2020/0098056 A1    Mar. 26, 2020

Related U.S. Application Data

(63) Continuation of application No. 15/273,088, filed on Sep. 22, 2016, now Pat. No. 10,475,138.
(Continued)

(51) Int. Cl.
*G06Q 50/06* (2012.01)
*G06Q 20/14* (2012.01)
*G07F 15/00* (2006.01)

(52) U.S. Cl.
CPC ........... *G06Q 50/06* (2013.01); *G06Q 20/145* (2013.01); *G07F 15/008* (2013.01)

(58) Field of Classification Search
CPC .................................................. G06Q 50/06
(Continued)

(56) References Cited

U.S. PATENT DOCUMENTS 3,906,242 A   9/1975 Stevenson
4,023,043 A   5/1977 Stevenson
(Continued)

FOREIGN PATENT DOCUMENTS

EP    1729223 A2    12/2006
EP    2159749 A1    3/2010
(Continued)

OTHER PUBLICATIONS

"Aman Saima, Simmhan Yogesh, Prasanna Viktor, Energy Management Systems: State of the Art and Emerging Trends, Jan. 2013, IEEE Communications Magazine" (Year: 2013).*
(Continued)

*Primary Examiner* — Bruce I Ebersman
*Assistant Examiner* — Kevin T Poe
(74) *Attorney, Agent, or Firm* — Neo IP

(57) ABSTRACT

A multiplicity of participants comprising utility operators, distributed energy resource (DER) providers, vendors/aggregators, energy customers, and utility financial officers, are communicatively connected to a platform. The platform provides interactive interfaces for each type of participant to access the platform over communication network. Utility operators are enabled to view and control DER in a certain area via an interface for utility operators. DER providers are enabled to interconnect DER packages to a utility grid via an interface for DER providers. Vendors/aggregators are enabled to view and manage their portfolios via an interface for vendors/aggregators. Energy customers are enabled to view energy information, shop for new products or services, and manage rate plans via an interface for marketplace. Utility financial officers are enabled to view revenue streams from the platform to a utility via an interface for financial settlement.

20 Claims, 71 Drawing Sheets

Related U.S. Application Data

(60) Provisional application No. 62/222,470, filed on Sep. 23, 2015.

(58) Field of Classification Search
USPC .......................................................... 705/40
See application file for complete search history.

(56) References Cited

U.S. PATENT DOCUMENTS

| | | |
|---|---|---|
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,502,339 A | 3/1996 | Hartig |
| 5,544,036 A | 8/1996 | Brown et al. |
| 5,560,022 A | 9/1996 | Dunstan et al. |
| 5,570,002 A | 10/1996 | Castleman |
| 5,592,491 A | 1/1997 | Dinkins |
| 5,640,153 A | 6/1997 | Hildebrand et al. |
| 5,644,173 A | 7/1997 | Elliason et al. |
| 5,675,503 A | 10/1997 | Moe et al. |
| 5,696,695 A | 12/1997 | Ehlers et al. |
| 5,721,936 A | 2/1998 | Kikinis et al. |
| 5,926,776 A | 7/1999 | Glorioso et al. |
| 5,973,481 A | 10/1999 | Thompson et al. |
| 6,018,690 A | 1/2000 | Saito et al. |
| 6,078,785 A | 6/2000 | Bush |
| 6,102,487 A | 8/2000 | Oevreboe |
| 6,107,693 A | 8/2000 | Mongia et al. |
| 6,112,136 A | 8/2000 | Paul et al. |
| 6,115,580 A | 9/2000 | Chuprun et al. |
| 6,115,676 A | 9/2000 | Rector et al. |
| 6,154,859 A | 11/2000 | Norizuki et al. |
| 6,216,956 B1 | 4/2001 | Ehlers et al. |
| 6,233,327 B1 | 5/2001 | Petite |
| 6,254,009 B1 | 7/2001 | Proffitt et al. |
| 6,286,021 B1 | 9/2001 | Tran et al. |
| 6,296,612 B1 | 10/2001 | Mo et al. |
| 6,301,528 B1 | 10/2001 | Bertram et al. |
| 6,304,552 B1 | 10/2001 | Chapman et al. |
| 6,327,541 B1 | 12/2001 | Pitchford et al. |
| 6,366,217 B1 | 4/2002 | Cunningham et al. |
| 6,374,101 B1 | 4/2002 | Gelbien |
| 6,437,692 B1 | 8/2002 | Petite et al. |
| 6,512,966 B2 | 1/2003 | Lof et al. |
| 6,519,509 B1 | 2/2003 | Nierlich et al. |
| 6,529,839 B1 | 3/2003 | Uggerud et al. |
| 6,535,797 B1 | 3/2003 | Bowles et al. |
| 6,577,962 B1 | 6/2003 | Afshari |
| 6,583,521 B1 | 6/2003 | Lagod et al. |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,633,823 B2 | 10/2003 | Bartone et al. |
| 6,671,586 B2 | 12/2003 | Davis et al. |
| 6,681,154 B2 | 1/2004 | Nierlich et al. |
| 6,687,574 B2 | 2/2004 | Pietrowicz et al. |
| 6,732,055 B2 | 5/2004 | Bagepalli et al. |
| 6,747,368 B2 | 6/2004 | Jarrett |
| 6,778,882 B2 | 8/2004 | Spool et al. |
| 6,784,807 B2 | 8/2004 | Petite et al. |
| 6,826,267 B2 | 11/2004 | Daum et al. |
| 6,832,135 B2 | 12/2004 | Ying |
| 6,834,811 B1 | 12/2004 | Huberman et al. |
| 6,836,737 B2 | 12/2004 | Petite et al. |
| 6,850,557 B1 | 2/2005 | Gronemeyer |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,891,838 B1 | 5/2005 | Petite et al. |
| 6,897,931 B2 | 5/2005 | Lee et al. |
| 6,900,556 B2 | 5/2005 | Provanzana et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,944,555 B2 | 9/2005 | Blackett et al. |
| 6,961,641 B1 | 11/2005 | Forth et al. |
| 6,978,931 B2 | 12/2005 | Brobeck |
| 6,990,593 B2 | 1/2006 | Nakagawa |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,053,756 B2 | 5/2006 | Mollenkopf et al. |
| 7,053,767 B2 | 5/2006 | Petite et al. |
| 7,085,739 B1 | 8/2006 | Winter et al. |
| 7,088,014 B2 | 8/2006 | Nierlich et al. |
| 7,103,511 B2 | 9/2006 | Petite |
| 7,111,018 B1 | 9/2006 | Goodrich et al. |
| 7,123,994 B2 | 10/2006 | Weik et al. |
| 7,133,750 B2 | 11/2006 | Raines et al. |
| 7,141,321 B2 | 11/2006 | McArthur et al. |
| 7,142,949 B2 | 11/2006 | Brewster et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor et al. |
| 7,206,350 B2 | 4/2007 | Korobkov et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,233,843 B2 | 6/2007 | Budhraja et al. |
| 7,263,073 B2 | 8/2007 | Petite et al. |
| 7,263,450 B2 | 8/2007 | Hunter |
| 7,274,975 B2 | 9/2007 | Miller |
| 7,282,921 B2 | 10/2007 | Sela et al. |
| 7,289,887 B2 | 10/2007 | Rodgers |
| 7,295,128 B2 | 11/2007 | Petite |
| 7,305,282 B2 | 12/2007 | Chen |
| 7,313,465 B1 | 12/2007 | O'Donnell |
| 7,337,153 B2 | 2/2008 | Peljto et al. |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Rissanen et al. |
| 7,412,304 B2 | 8/2008 | Uenou |
| 7,424,268 B2 | 9/2008 | Diener et al. |
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,502,698 B2 | 3/2009 | Uenou et al. |
| 7,528,503 B2 | 5/2009 | Rognli et al. |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,609,158 B2 | 10/2009 | Banting et al. |
| 7,650,425 B2 | 1/2010 | Davis et al. |
| 7,697,492 B2 | 4/2010 | Petite |
| 7,711,796 B2 | 5/2010 | Gutt et al. |
| 7,715,951 B2 | 5/2010 | Forbes et al. |
| 7,738,999 B2 | 6/2010 | Petite |
| 7,739,378 B2 | 6/2010 | Petite |
| 7,747,165 B2 | 6/2010 | Emery et al. |
| 7,844,370 B2 | 11/2010 | Pollack et al. |
| 7,890,436 B2 | 2/2011 | Kremen |
| 7,925,552 B2 | 4/2011 | Tarbell et al. |
| 7,940,901 B2 | 5/2011 | Paraskevakos et al. |
| 7,949,435 B2 | 5/2011 | Pollack et al. |
| 8,010,812 B2 | 8/2011 | Forbes et al. |
| 8,032,233 B2 | 10/2011 | Forbes et al. |

(56) References Cited

U.S. PATENT DOCUMENTS

| | | |
|---|---|---|
| 8,032,461 B2 | 10/2011 | Winter et al. |
| 8,045,660 B1 | 10/2011 | Gupta |
| 8,060,259 B2 | 11/2011 | Budhraja et al. |
| 8,068,938 B2 | 11/2011 | Fujita |
| 8,095,233 B1 | 1/2012 | Shankar et al. |
| 8,145,361 B2 | 3/2012 | Forbes et al. |
| 8,260,468 B2 | 9/2012 | Ippolito et al. |
| 8,260,470 B2 | 9/2012 | Forbes et al. |
| 8,305,215 B2 | 11/2012 | Markhovsky et al. |
| 8,307,225 B2 | 11/2012 | Forbes et al. |
| 8,311,483 B2 | 11/2012 | Tillman et al. |
| 8,315,717 B2 | 11/2012 | Forbes et al. |
| 8,315,743 B2 | 11/2012 | Sackman et al. |
| 8,359,124 B2 | 1/2013 | Zhou et al. |
| 8,359,215 B1 | 1/2013 | Robbins et al. |
| 8,364,609 B2 | 1/2013 | Ozog |
| 8,407,252 B2 | 3/2013 | Bennett et al. |
| 8,417,569 B2 | 4/2013 | Gross |
| 8,428,752 B2 | 4/2013 | Bennett et al. |
| 8,442,917 B1 | 5/2013 | Burke |
| 8,457,802 B1 | 6/2013 | Steven et al. |
| 8,467,353 B2 | 6/2013 | Proctor |
| 8,473,111 B1 | 6/2013 | Shankar et al. |
| 8,521,337 B1 | 8/2013 | Johnson |
| 8,565,811 B2 | 10/2013 | Tan et al. |
| 8,571,930 B1 | 10/2013 | Galperin |
| 8,583,520 B1 | 11/2013 | Forbes |
| 8,583,799 B2 | 11/2013 | Podila |
| 8,588,991 B1 | 11/2013 | Forbes |
| 8,639,392 B2 | 1/2014 | Chassin |
| 8,684,266 B2 | 4/2014 | Bennett et al. |
| 8,704,678 B2 | 4/2014 | Wang et al. |
| 8,761,051 B2 | 6/2014 | Brisebois et al. |
| 8,761,952 B2 | 6/2014 | Forbes |
| 8,818,283 B2 | 8/2014 | McHenry et al. |
| 10,295,969 B2 | 5/2019 | Forbes, Jr. |
| 2001/0030468 A1 | 10/2001 | Anderson et al. |
| 2001/0038343 A1 | 11/2001 | Meyer et al. |
| 2002/0019758 A1 | 2/2002 | Scarpelli |
| 2002/0019802 A1 | 2/2002 | Malme et al. |
| 2002/0035496 A1 | 3/2002 | Fukushima et al. |
| 2002/0036430 A1 | 3/2002 | Welches et al. |
| 2002/0084655 A1 | 7/2002 | Lof et al. |
| 2002/0091626 A1 | 7/2002 | Johnson et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2002/0161648 A1 | 10/2002 | Mason et al. |
| 2002/0198629 A1 | 12/2002 | Ellis |
| 2003/0006613 A1 | 1/2003 | Lof et al. |
| 2003/0009705 A1 | 1/2003 | Thelander et al. |
| 2003/0036820 A1 | 2/2003 | Yellepeddy et al. |
| 2003/0074244 A1 | 4/2003 | Braxton |
| 2003/0083980 A1 | 5/2003 | Satake |
| 2003/0144864 A1 | 7/2003 | Mazzarella |
| 2003/0149937 A1 | 8/2003 | McElfresh et al. |
| 2003/0160595 A1 | 8/2003 | Provanzana et al. |
| 2003/0167178 A1 | 9/2003 | Jarman et al. |
| 2003/0171851 A1 | 9/2003 | Brickfield et al. |
| 2003/0176952 A1 | 9/2003 | Collins |
| 2003/0198304 A1 | 10/2003 | Sugar et al. |
| 2003/0204756 A1 | 10/2003 | Ransom et al. |
| 2003/0220864 A1 | 11/2003 | Peljto et al. |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0006439 A1 | 1/2004 | Hunter |
| 2004/0024483 A1 | 2/2004 | Holcombe |
| 2004/0044571 A1 | 3/2004 | Bronnimann et al. |
| 2004/0088083 A1 | 5/2004 | Davis et al. |
| 2004/0095237 A1 | 5/2004 | Chen et al. |
| 2004/0107025 A1 | 6/2004 | Ransom et al. |
| 2004/0117330 A1 | 6/2004 | Ehlers et al. |
| 2004/0128266 A1 | 7/2004 | Yellepeddy et al. |
| 2004/0138834 A1 | 7/2004 | Blackett et al. |
| 2004/0153170 A1 | 8/2004 | Santacatterina et al. |
| 2004/0158417 A1 | 8/2004 | Bonet |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0203826 A1 | 10/2004 | Sugar et al. |
| 2004/0206813 A1 | 10/2004 | Brobeck |
| 2004/0225514 A1 | 11/2004 | Greenshields et al. |
| 2004/0230533 A1 | 11/2004 | Benco |
| 2005/0021397 A1 | 1/2005 | Cui et al. |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0080772 A1 | 4/2005 | Bem |
| 2005/0096856 A1 | 5/2005 | Lubkeman et al. |
| 2005/0096857 A1 | 5/2005 | Hunter |
| 2005/0096979 A1 | 5/2005 | Koningstein |
| 2005/0097204 A1 | 5/2005 | Horowitz et al. |
| 2005/0125243 A1 | 6/2005 | Villalobos |
| 2005/0127680 A1 | 6/2005 | Lof et al. |
| 2005/0131583 A1 | 6/2005 | Ransom |
| 2005/0138432 A1 | 6/2005 | Ransom et al. |
| 2005/0144437 A1 | 6/2005 | Ransom et al. |
| 2005/0192711 A1 | 9/2005 | Raines et al. |
| 2005/0192713 A1 | 9/2005 | Weik et al. |
| 2005/0197742 A1 | 9/2005 | Scott et al. |
| 2005/0216302 A1 | 9/2005 | Raji et al. |
| 2005/0216580 A1 | 9/2005 | Raji et al. |
| 2005/0227625 A1 | 10/2005 | Diener |
| 2005/0234600 A1 | 10/2005 | Boucher et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2005/0288954 A1 | 12/2005 | McCarthy et al. |
| 2006/0020544 A1 | 1/2006 | Kaveski |
| 2006/0020596 A1 | 1/2006 | Liu et al. |
| 2006/0022841 A1 | 2/2006 | Hoiness et al. |
| 2006/0025891 A1 | 2/2006 | Budike |
| 2006/0031934 A1 | 2/2006 | Kriegel |
| 2006/0038672 A1 | 2/2006 | Schoettle |
| 2006/0064205 A1 | 3/2006 | Ying |
| 2006/0069616 A1 | 3/2006 | Bau |
| 2006/0106635 A1 | 5/2006 | Ulrich et al. |
| 2006/0119368 A1 | 6/2006 | Sela et al. |
| 2006/0142900 A1 | 6/2006 | Rothman et al. |
| 2006/0142961 A1 | 6/2006 | Johnson et al. |
| 2006/0161310 A1 | 7/2006 | Lal |
| 2006/0161450 A1 | 7/2006 | Carey et al. |
| 2006/0168191 A1 | 7/2006 | Ives |
| 2006/0190354 A1 | 8/2006 | Meisel et al. |
| 2006/0195334 A1 | 8/2006 | Reeb et al. |
| 2006/0212350 A1 | 9/2006 | Ellis et al. |
| 2006/0224615 A1 | 10/2006 | Korn et al. |
| 2006/0241244 A1 | 10/2006 | Soeda et al. |
| 2006/0241314 A1 | 10/2006 | Sullivan et al. |
| 2006/0271244 A1 | 11/2006 | Cumming et al. |
| 2006/0271314 A1 | 11/2006 | Hayes |
| 2006/0276938 A1 | 12/2006 | Miller |
| 2006/0282328 A1 | 12/2006 | Gerace et al. |
| 2007/0021874 A1 | 1/2007 | Rognli et al. |
| 2007/0026857 A1 | 2/2007 | Kotzin |
| 2007/0038563 A1 | 2/2007 | Ryzerski |
| 2007/0058453 A1 | 3/2007 | Shaffer et al. |
| 2007/0058629 A1 | 3/2007 | Luft |
| 2007/0067132 A1 | 3/2007 | Tziouvaras et al. |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0100961 A1 | 5/2007 | Moore |
| 2007/0124026 A1 | 5/2007 | Troxell et al. |
| 2007/0150353 A1 | 6/2007 | Krassner et al. |
| 2007/0156621 A1 | 7/2007 | Wright et al. |
| 2007/0156887 A1 | 7/2007 | Wright et al. |
| 2007/0174114 A1 | 7/2007 | Bigby et al. |
| 2007/0192333 A1 | 8/2007 | Ali |
| 2007/0203722 A1 | 8/2007 | Richards et al. |

(56) References Cited

U.S. PATENT DOCUMENTS

| | | |
|---|---|---|
| 2007/0204176 A1 | 8/2007 | Shaffer et al. |
| 2007/0213878 A1 | 9/2007 | Chen |
| 2007/0214118 A1 | 9/2007 | Schoen et al. |
| 2007/0214132 A1 | 9/2007 | Grubb et al. |
| 2007/0255457 A1 | 11/2007 | Whitcomb et al. |
| 2007/0260540 A1 | 11/2007 | Chau et al. |
| 2007/0276547 A1 | 11/2007 | Miller |
| 2007/0286210 A1 | 12/2007 | Gutt et al. |
| 2007/0291644 A1 | 12/2007 | Roberts et al. |
| 2007/0293171 A1 | 12/2007 | Li et al. |
| 2007/0299562 A1 | 12/2007 | Kates |
| 2008/0010212 A1 | 1/2008 | Moore et al. |
| 2008/0015976 A1 | 1/2008 | Sander et al. |
| 2008/0039979 A1 | 2/2008 | Bridges et al. |
| 2008/0039980 A1 | 2/2008 | Pollack et al. |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0040296 A1 | 2/2008 | Bridges et al. |
| 2008/0040479 A1 | 2/2008 | Bridge et al. |
| 2008/0046387 A1 | 2/2008 | Gopal et al. |
| 2008/0052145 A1 | 2/2008 | Kaplan et al. |
| 2008/0091580 A1 | 4/2008 | Kremen |
| 2008/0091581 A1 | 4/2008 | Kremen |
| 2008/0091590 A1 | 4/2008 | Kremen |
| 2008/0091625 A1 | 4/2008 | Kremen |
| 2008/0091626 A1 | 4/2008 | Kremen |
| 2008/0104026 A1 | 5/2008 | Koran |
| 2008/0109387 A1 | 5/2008 | Deaver et al. |
| 2008/0130673 A1 | 6/2008 | Cregg et al. |
| 2008/0133604 A1 | 6/2008 | Kim |
| 2008/0147465 A1 | 6/2008 | Raines et al. |
| 2008/0154801 A1 | 6/2008 | Fein et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini et al. |
| 2008/0186202 A1 | 8/2008 | Vaswani et al. |
| 2008/0195462 A1 | 8/2008 | Magdon-Ismail et al. |
| 2008/0209117 A1 | 8/2008 | Kajigaya |
| 2008/0224892 A1 | 9/2008 | Bogolea et al. |
| 2008/0231114 A1 | 9/2008 | Tolnar et al. |
| 2008/0238710 A1 | 10/2008 | Tolnar et al. |
| 2008/0249832 A1 | 10/2008 | Richardson et al. |
| 2008/0255899 A1 | 10/2008 | McConnell et al. |
| 2008/0263025 A1 | 10/2008 | Koran |
| 2008/0270223 A1 | 10/2008 | Collins et al. |
| 2008/0272934 A1 | 11/2008 | Wang et al. |
| 2008/0281473 A1 | 11/2008 | Pitt |
| 2008/0306824 A1 | 12/2008 | Parkinson |
| 2008/0306830 A1 | 12/2008 | Lasa et al. |
| 2008/0313632 A1 | 12/2008 | Kumar et al. |
| 2008/0319893 A1 | 12/2008 | Mashinsky et al. |
| 2009/0012996 A1 | 1/2009 | Gupta et al. |
| 2009/0018884 A1 | 1/2009 | McConnell et al. |
| 2009/0024718 A1 | 1/2009 | Anagnostopoulos et al. |
| 2009/0040029 A1 | 2/2009 | Bridges et al. |
| 2009/0043519 A1 | 2/2009 | Bridges et al. |
| 2009/0043520 A1 | 2/2009 | Pollack et al. |
| 2009/0045804 A1 | 2/2009 | Durling et al. |
| 2009/0046625 A1 | 2/2009 | Diener et al. |
| 2009/0055031 A1 | 2/2009 | Slota et al. |
| 2009/0055032 A1 | 2/2009 | Rodgers |
| 2009/0062970 A1 | 3/2009 | Forbes et al. |
| 2009/0063228 A1 | 3/2009 | Forbes |
| 2009/0063680 A1 | 3/2009 | Bridges et al. |
| 2009/0066287 A1 | 3/2009 | Pollack et al. |
| 2009/0088907 A1 | 4/2009 | Lewis et al. |
| 2009/0111463 A1 | 4/2009 | Simms et al. |
| 2009/0112701 A1 | 4/2009 | Turpin |
| 2009/0112758 A1 | 4/2009 | Herzig |
| 2009/0119039 A1 | 5/2009 | Banister et al. |
| 2009/0124241 A1 | 5/2009 | Krishnaswamy et al. |
| 2009/0125462 A1 | 5/2009 | Krishnaswamy et al. |
| 2009/0135836 A1 | 5/2009 | Veillette |
| 2009/0138362 A1 | 5/2009 | Schroedl et al. |
| 2009/0157529 A1 | 6/2009 | Ehlers et al. |
| 2009/0157545 A1 | 6/2009 | Mobley |
| 2009/0177548 A1 | 7/2009 | Eisenlohr |
| 2009/0187284 A1 | 7/2009 | Kreiss et al. |
| 2009/0187344 A1 | 7/2009 | Brancaccio et al. |
| 2009/0187499 A1 | 7/2009 | Mulder et al. |
| 2009/0195349 A1 | 8/2009 | Frader-Thompson et al. |
| 2009/0198384 A1 | 8/2009 | Ahn |
| 2009/0200988 A1 | 8/2009 | Bridges et al. |
| 2009/0207950 A1 | 8/2009 | Tsuruta et al. |
| 2009/0228335 A1 | 9/2009 | Niyogi et al. |
| 2009/0240381 A1 | 9/2009 | Lane |
| 2009/0240677 A1 | 9/2009 | Parekh et al. |
| 2009/0281673 A1 | 11/2009 | Taft |
| 2009/0281674 A1 | 11/2009 | Taft |
| 2009/0313034 A1 | 12/2009 | Ferro et al. |
| 2009/0313103 A1 | 12/2009 | Ambrosio et al. |
| 2009/0319415 A1 | 12/2009 | Stoilov et al. |
| 2009/0326726 A1 | 12/2009 | Ippolito et al. |
| 2010/0023337 A1 | 1/2010 | Case |
| 2010/0076835 A1 | 3/2010 | Silverman |
| 2010/0094981 A1 | 4/2010 | Cordray et al. |
| 2010/0100250 A1 | 4/2010 | Budhraja et al. |
| 2010/0106332 A1 | 4/2010 | Chassin et al. |
| 2010/0106342 A1 | 4/2010 | Ko et al. |
| 2010/0106575 A1 | 4/2010 | Bixby |
| 2010/0106641 A1 | 4/2010 | Chassin et al. |
| 2010/0138452 A1 | 6/2010 | Henkin et al. |
| 2010/0146599 A1 | 6/2010 | Padmanabha et al. |
| 2010/0163634 A1 | 7/2010 | Klein et al. |
| 2010/0164749 A1 | 7/2010 | Hope et al. |
| 2010/0169175 A1 | 7/2010 | Koran |
| 2010/0179862 A1 | 7/2010 | Chassin et al. |
| 2010/0191862 A1 | 7/2010 | Forbes et al. |
| 2010/0198535 A1 | 8/2010 | Brown et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0228601 A1 | 9/2010 | Vaswani et al. |
| 2010/0235008 A1 | 9/2010 | Forbes et al. |
| 2010/0250590 A1 | 9/2010 | Galvin |
| 2010/0255794 A1 | 10/2010 | Agnew |
| 2010/0259998 A1 | 10/2010 | Kwon et al. |
| 2010/0274407 A1 | 10/2010 | Creed |
| 2010/0293045 A1 | 11/2010 | Burns et al. |
| 2010/0306033 A1 | 12/2010 | Oved et al. |
| 2010/0324748 A1 | 12/2010 | Voysey |
| 2010/0325719 A1 | 12/2010 | Etchegoyen |
| 2010/0328849 A1 | 12/2010 | Ewing et al. |
| 2011/0007824 A1 | 1/2011 | Bridges et al. |
| 2011/0010016 A1 | 1/2011 | Giroti |
| 2011/0015799 A1 | 1/2011 | Pollack et al. |
| 2011/0022242 A1 | 1/2011 | Bukhin et al. |
| 2011/0025556 A1 | 2/2011 | Bridges et al. |
| 2011/0029655 A1 | 2/2011 | Forbes et al. |
| 2011/0040666 A1 | 2/2011 | Crabtree et al. |
| 2011/0055036 A1 | 3/2011 | Helfan |
| 2011/0060474 A1 | 3/2011 | Schmiegel et al. |
| 2011/0060476 A1 | 3/2011 | Iino et al. |
| 2011/0080044 A1 | 4/2011 | Schmiegel |
| 2011/0090939 A1 | 4/2011 | Diener et al. |
| 2011/0106321 A1 | 5/2011 | Cherian et al. |
| 2011/0106729 A1 | 5/2011 | Billingsley et al. |
| 2011/0115302 A1 | 5/2011 | Slota et al. |
| 2011/0130886 A1 | 6/2011 | Haag et al. |
| 2011/0133655 A1 | 6/2011 | Recker et al. |
| 2011/0137763 A1* | 6/2011 | Aguilar .......... G06Q 40/12 705/30 |
| 2011/0145061 A1 | 6/2011 | Spurr et al. |
| 2011/0161250 A1 | 6/2011 | Koeppel et al. |
| 2011/0172837 A1 | 7/2011 | Forbes, Jr. |
| 2011/0172841 A1 | 7/2011 | Forbes, Jr. |
| 2011/0185303 A1 | 7/2011 | Katagi et al. |
| 2011/0196546 A1 | 8/2011 | Muller et al. |
| 2011/0196547 A1 | 8/2011 | Park et al. |
| 2011/0202418 A1 | 8/2011 | Kempton et al. |
| 2011/0204717 A1 | 8/2011 | Shaffer |

(56) References Cited

U.S. PATENT DOCUMENTS

| | | |
|---|---|---|
| 2011/0204719 A1 | 8/2011 | Sackman et al. |
| 2011/0208365 A1 | 8/2011 | Miller |
| 2011/0208366 A1 | 8/2011 | Taft |
| 2011/0208367 A1 | 8/2011 | Sackman et al. |
| 2011/0231028 A1 | 9/2011 | Ozog |
| 2011/0235656 A1 | 9/2011 | Pigeon |
| 2011/0251730 A1 | 10/2011 | Pitt |
| 2011/0254269 A1 | 10/2011 | Kaiser |
| 2011/0257809 A1 | 10/2011 | Forbes et al. |
| 2011/0258022 A1 | 10/2011 | Forbes et al. |
| 2011/0267202 A1 | 11/2011 | Efthymiou et al. |
| 2011/0270454 A1 | 11/2011 | Kreiss et al. |
| 2011/0270457 A1 | 11/2011 | Kreiss et al. |
| 2011/0270550 A1 | 11/2011 | Kreiss et al. |
| 2011/0270682 A1 | 11/2011 | Valin |
| 2011/0282511 A1 | 11/2011 | Unetich |
| 2011/0288905 A1 | 11/2011 | Mrakas |
| 2012/0004872 A1 | 1/2012 | Oh et al. |
| 2012/0029720 A1 | 2/2012 | Cherian et al. |
| 2012/0029897 A1 | 2/2012 | Cherian et al. |
| 2012/0059532 A1 | 3/2012 | Reifenhaeuser et al. |
| 2012/0078427 A1 | 3/2012 | Jang et al. |
| 2012/0089263 A1 | 4/2012 | Park et al. |
| 2012/0095830 A1 | 4/2012 | Contreras Delpiano et al. |
| 2012/0095841 A1 | 4/2012 | Luckerman et al. |
| 2012/0101652 A1 | 4/2012 | Shin et al. |
| 2012/0131100 A1 | 5/2012 | Van Olst et al. |
| 2012/0146799 A1 | 6/2012 | Bell et al. |
| 2012/0153888 A1 | 6/2012 | Jung |
| 2012/0154171 A1 | 6/2012 | Hurri et al. |
| 2012/0196482 A1 | 8/2012 | Stokoe |
| 2012/0205977 A1 | 8/2012 | Shin et al. |
| 2012/0221162 A1 | 8/2012 | Forbes |
| 2012/0223840 A1 | 9/2012 | Guymon et al. |
| 2012/0226384 A1 | 9/2012 | Forbes |
| 2012/0230214 A1 | 9/2012 | Kozisek et al. |
| 2012/0232816 A1 | 9/2012 | Oh et al. |
| 2012/0239218 A1 | 9/2012 | Forbes |
| 2012/0245753 A1 | 9/2012 | Forbes |
| 2012/0246392 A1 | 9/2012 | Cheon |
| 2012/0253540 A1 | 10/2012 | Coyne et al. |
| 2012/0259760 A1 | 10/2012 | Sgouridis et al. |
| 2012/0282942 A1 | 11/2012 | Uusitalo et al. |
| 2012/0296482 A1 | 11/2012 | Steven et al. |
| 2012/0296799 A1 | 11/2012 | Playfair et al. |
| 2012/0303553 A1 | 11/2012 | LaFrance |
| 2012/0310760 A1* | 12/2012 | Phillips ............... G06Q 20/227 705/26.1 |
| 2012/0310800 A1 | 12/2012 | Xia et al. |
| 2012/0316691 A1 | 12/2012 | Boardman et al. |
| 2012/0316697 A1 | 12/2012 | Boardman et al. |
| 2013/0006435 A1 | 1/2013 | Berrios et al. |
| 2013/0020992 A1 | 1/2013 | Wu et al. |
| 2013/0023285 A1 | 1/2013 | Markhovsky et al. |
| 2013/0031201 A1 | 1/2013 | Kagan et al. |
| 2013/0035802 A1 | 2/2013 | Khaitan et al. |
| 2013/0038468 A1 | 2/2013 | Wang et al. |
| 2013/0054036 A1 | 2/2013 | Cherian |
| 2013/0079939 A1 | 3/2013 | Thomas et al. |
| 2013/0079943 A1 | 3/2013 | Darden |
| 2013/0110297 A1 | 5/2013 | Reichmuth et al. |
| 2013/0123998 A1 | 5/2013 | King et al. |
| 2013/0124320 A1 | 5/2013 | Karner |
| 2013/0144768 A1 | 6/2013 | Rohrbaugh |
| 2013/0173360 A1 | 7/2013 | Thatcher |
| 2013/0178990 A1 | 7/2013 | Kayton et al. |
| 2013/0191260 A1 | 7/2013 | Michael |
| 2013/0231793 A1 | 9/2013 | Elliott et al. |
| 2013/0242792 A1 | 9/2013 | Woodings |
| 2014/0018969 A1 | 1/2014 | Forbes |
| 2014/0025486 A1 | 1/2014 | Bigby et al. |
| 2014/0039699 A1 | 2/2014 | Forbes, Jr. |
| 2014/0039701 A1 | 2/2014 | Forbes |
| 2014/0039703 A1 | 2/2014 | Forbes |
| 2014/0114829 A1* | 4/2014 | Forbes, Jr. ......... G06Q 30/0283 705/35 |
| 2014/0114844 A1* | 4/2014 | Forbes, Jr. ............. B60L 53/63 705/39 |
| 2014/0163309 A1 | 6/2014 | Bernhard et al. |
| 2014/0222698 A1 | 8/2014 | Potdar et al. |
| 2014/0277788 A1 | 9/2014 | Forbes, Jr. |
| 2014/0278851 A1 | 9/2014 | Kopanati |
| 2014/0279711 A1 | 9/2014 | Angelis et al. |
| 2014/0304025 A1 | 10/2014 | Steven et al. |
| 2014/0351010 A1 | 11/2014 | Kong |
| 2015/0094968 A1 | 4/2015 | Jia et al. |
| 2015/0160672 A1 | 6/2015 | Hakim et al. |
| 2015/0278968 A1 | 10/2015 | Steven et al. |
| 2016/0055507 A1* | 2/2016 | Patil ................... G06Q 30/0206 705/7.31 |
| 2017/0025893 A1 | 1/2017 | Forbes, Jr. |
| 2017/0083989 A1 | 3/2017 | Brockman et al. |
| 2018/0343339 A1 | 11/2018 | Lotter et al. |

FOREIGN PATENT DOCUMENTS

| | | |
|---|---|---|
| JP | 2000078748 A | 3/2000 |
| JP | 2001306839 A | 11/2001 |
| JP | 20040180412 A | 6/2004 |
| JP | 2004248174 A | 9/2004 |
| JP | 2006060911 A | 3/2006 |
| JP | 2007132553 A | 5/2007 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| KR | 20090033299 A | 4/2009 |
| WO | 2007136456 A2 | 11/2007 |
| WO | 2008073477 A2 | 6/2008 |
| WO | 2008125696 A2 | 10/2008 |
| WO | 2011079235 A1 | 6/2011 |
| WO | 2012008979 A2 | 1/2012 |
| WO | 2012015507 A1 | 2/2012 |
| WO | 2012015508 A1 | 2/2012 |
| WO | 2012058114 A2 | 5/2012 |

OTHER PUBLICATIONS

"Molderink Albert, Bakker Vincent, Bosman Maurice, Hurink Johann, Smith Gerard, Sep. 2010, IEEE Transactions on Smart Grid vol. 1 No. 2" (Year: 2010).*

"Adika Christopher, Wang Lingfend, Autonomous Appliance Scheduoing for Household Energy Management, Mar. 2014, IEEE Transactions on Smart Grid, vol. 1 No. 5" (Year: 2014).*

Automated power exchange. (2000). Energy Markets, 19. Retrieved from http://search.proquest.com/docview/228731930?accountid=14753.

B.J. Kirby, Spinning Reserve from Responsive Loads, Oak Ridge National Laboratory, United States Dept. of Energy, Mar. 2003 (54 pages).

Byers J. Risk Management and Monetizing the Commodity Storage Option. Natural Gas & Electricity [serial online]. Jul. 2005; 21 (12):1-8. Available from: Business Source Complete, Ipswich, MA.

C.W. Gellings and W.M. Smith, Integrating Demand-Side Management into Utility Planning, Proceedings of the IEEE, vol. 77, Issue: 6, Jun. 1989, pp. 908-918 (Abstract only).

Cazalet, E. G. & Samuelson, R. D. 2000, "The power market: E-commerce for all electricity products", Public Utilities Fortnightly, vol. 138, No. 3, pp. 42-47.

Ercot Settlement Metering Operating Guide. Dec. 2010. http://www.ercot.com/mktrules/guides/settlement/201 0/index.

Eric Hirst and Brendan Kirby, Opportunities for Demand Participation in New England Contingency-Reserve Markets, New England Demand Response Initiative, Feb. 2003 (15 pages).

Eric Hirst and Richard Cowart, Demand Side Resources and Reliability, New England Demand Response Initiative, Mar. 20, 2002 (32 pages).

(56) References Cited

OTHER PUBLICATIONS

Galvin Electricity Institute: Frequently Asked Questions, printed Apr. 23, 2014, same page available through archive.org unchanged Mar. 1, 2008.
GE Digital Energy Residential Electrical Metering Brochure. Sep. 12, 2012. https://web.archive.org/web/20120912144353/http://www.gedigitalenergry.com/products/brochures/1210-Family.pdf.
IDC Energy I. IDC Energy Insights Forecasts 27% Worldwide Growth in the Commercial Smart Building Systems Market. Business Wire (English) [serial online]. 4: Available from: Regional Business News, Ipswich, MA.
Illinois General Assembly: Public Act 094-0977, Effective Date: Jun. 30, 2006.
Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).
L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).
Lobsenz G. Maryland Regulators Reject BG&E Smart Grid Proposal. Energy Daily [serial online]. Jun. 23, 2010; (118): 3. Available from: Business Source Complete, Ipswich, MA.
M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).
Michael Ahlheim and Friedrich Schneider; "Allowing for Household Preferences in Emission Trading, A Contribution to the Climate Policy Debate"; Environmental and Resource Economics, vol. 21, pp. 317-342; Kluwer Academic Publishers; The Netherlands; 2002.
Moeller, Mar. 15, 2011, NERC, 116 pages.
Olivier Rousse; "Environmental and economic benefits resulting from citizens' participation in $CO_2$ emissions trading: An efficient alternative solution to the voluntary compensation of $CO_2$ emissions", Energy Policy 36 (2008), pp. 388-397; Oct. 29, 2007 (online).
Pablo A. Ruiz and Peter W. Sauer, Valuation of Reserve Services, IEEE Proceedings of the 41.sup.st Hawaii International Conference on System Sciences, 2008 (9 pages).
Paul Darbee, Insteon Compared, SmartLabs, Inc., Jan. 2, 2006, 69 pages.
Paul Darbee, Insteon The Details, Smarthome, Inc., Aug. 11, 2005, 68 pages.
Thomas, K. 2000, "Energy e-commerce takes off", Energy Markets, vol. 5, No. 4, pp. 26.
Woolf, Tim, Demand Response Compensation in Organized Wholesale Energy Markets, May 4, 2010, NARUC, 34 pages.
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Chicco, Gianfranco. Load Pattern-Based Classification of Electricity Customers, May 2004, IEEE Transactions on Power Systems, vol. 19, No. 2 (Year: 2004).
Valero Verdu, Sergio. Classification, Filtering, and Identification of Electrical Customer Load Patterns Through the Use of Self-Organizing Maps, Nov. 2006, IEEE Transactions on Power Systems, vol. 21, No. 4 (Year: 2006).

\* cited by examiner

Community Solar

Used by 2434 Timberwind Drive and 14 other homes near you...

Shared renewable energy arrangements allow several energy customer to share the benefits of one local renewable energy power plant. When the power is supplied strictly by solar energy, it is sometimes called "community solar." The shared renewables project pools investments from multiple members of a community and provides power and/or financial benefits in return.

FIG. 49

Other Popular Services

Heating and Air Conditioning Inspection and Tune-Up

Leasing Program $89⁹⁹ for residential Battery Storage

Payments Dashboard

Payment Status

- 1007 Johnny Dodds Blvd
  Last Bill $1,024.46 processed on 2/10/2015
  OVERDUE Please top-off your account

- Monitoring Apps
  Monthly $9.99 processed on 2/01/2015

- Upgrade Financing: Solar Array
  Payment of $128.99 processed on 2/01/2015

Account Balance
$523.88

Marketplace Recommendations

Usage Predictor App

When combined with a battery storage system, this app intelligently purchases & stores power in preparation for high-cost weather events.

See More Apps

Payments

Dashboard

Add an Account

Add a Building

Billing Summary

Rate Plan: SCE&G Business Rate Plan 12

| Weekly History | Usage | Rate | Change | Total |
|---|---|---|---|---|
| Fri 02/14 | 268.9 kWh | $.29 | -10% | $26.89 |
| Thu 02/13 | 432.4 kWh | $.29 | +23% | $43.27 |
| Wed 02/12 | 683.8 kWh | $.29 | +40% | $68.42 |
| Tue 02/11 | 444.9 kWh | $.29 | +25% | $44.50 |
| Mon 02/10 | 238.5 kWh | $.29 | +1% | $23.87 |
| Sun 02/09 | 160.4 kWh | $.20 | -2% | $16.06 |
| Sat 02/08 | 165.4 kWh | $.20 | -3% | $16.55 |

FIG. 50

ENERGYNET

Customer Report page 1 of 1
Duke Energy Progress

| | |
|---|---|
| Account number | |
| Total charges | $13.16 |
| Current charges past due after | Apr 7 |
| Previous draft payment | $13.16 |
| Usage period | Feb 10 - Mar 11 |
| This bill was mailed on | March 14, 2016 |

DUKE ENERGY PROGRESS

107 DORIC CT
CARY NC 27519-5038

Your account will be drafted for this bill on April 7, 2016. Do not send a check.

Thank you for paying by draft!

kWh Usage History

Usage

| | |
|---|---|
| Meter number | D21177 |
| Readings: Mar 11 | 56458 |
| Feb 10 | − 56458 |
| kWh usage | 0 |
| Days in period 30 Average kWh per day | 0.00 |

Billing
Residential
Service rate

| 10/15 HOUSE - 30 Days | |
|---|---|
| Electric service | 11.13 |
| REPS Adjustment | 1.17 |
| 7% North Carolina sales tax | 0.86 |
| Total charges | $13.16 |

This bill is subject to a 1% per month late payment charge after 04/07/2016.

For your information    PIN:

Utility Bill Verification
Thanks for submitting your utility bill, shown on the left.
Please verify the following information we've extracted from your bill.
Electric Provider
South Carolina Electric & Gas (SCE&G)
Service Address
1007 Johnnie Dodds Blvd, Mount Pleasant SC
Building Type
Residential
Bill Date
Apr 7 2016
Current Charges
1496.40
FIG. 55B

SYSTEMS AND METHODS FOR ADVANCED ENERGY NETWORK

CROSS-REFERENCES TO RELATED APPLICATIONS

The present invention is related to and claims priority from the following U.S. patent documents: this application is a continuation of U.S. patent application Ser. No. 15/273,088, filed Sep. 22, 2016, which claims priority from U.S. Provisional Patent Application No. 62/222,470, filed Sep. 23, 2015, each of which is incorporated herein by reference in its entirety.

BACKGROUND OF THE INVENTION

1. Field of the Invention

The present invention relates to electric power messaging and settlements, and more particularly, to advanced energy settlements, messaging, and applications for electric power supply, load, and/or curtailment and data analytics associated with the same.

2. Description of the Prior Art

Generally, it is known in the prior art to provide electric power systems management, including financial settlements and messaging. However, limited information is available to electric power consumers regarding their past, present, and future projected use of power with sufficient details to make informed choices about types of power supply and pricing alternatives. Furthermore, retail electric providers (REPs) in prior art systems and methods do not have access to data and analytics to provide optimal pricing for power supplied to business and/or residential electricity customers, and do not have the ability to provide advanced energy settlements to provide the lowest pricing for power supplied at predetermined times, due at least in part to costs associated with obtaining power agreements without visibility to the data and analytics that provide a reduced risk of capital and performance associated with the supply and demand sides. Thus, there remains a need for improved information, controls, real-time or near-real-time data on power consumption and production for electric power market participants, REPs, customers, data centers, and microgrid owners, and messaging and management of financial settlement therefor.

SUMMARY OF THE INVENTION

The present invention relates to electric power messaging and settlements, and more particularly, to advanced energy settlements, messaging, and applications for electric power supply, load, and/or curtailment and data analytics associated with the same. Systems and methods for data analytics and customer or consumer guidance and controls are provided, and coupled with graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof.

The present invention provides for systems, methods, and graphical user interface (GUI) embodiments for providing electric power usage (past, current, and/or future projected) information, management, financial settlements, and messaging, and applications as described herein.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 31 is a screenshot of a vendor/aggregator view interface displaying submission of a device for catalog content review.

FIG. 41 is a screenshot of a marketplace view interface showing a comparison between two buildings.

FIG. 49 is a screenshot of a marketplace view interface displaying other services provided by the marketplace.

FIG. 50 is a screenshot of a marketplace view interface showing the payments dashboard.

FIG. 54A and FIG. 54B are screenshots of a utility bill verification for an electric bill. FIG. 54A is the left side of the screen and FIG. 54B is the right side of the screen.

FIG. 55A and FIG. 55B are screenshots of a utility bill verification for an electric and gas bill. FIG. 55A is the left side of the screen and FIG. 55B is the right side of the screen.

DETAILED DESCRIPTION

Figure 1:
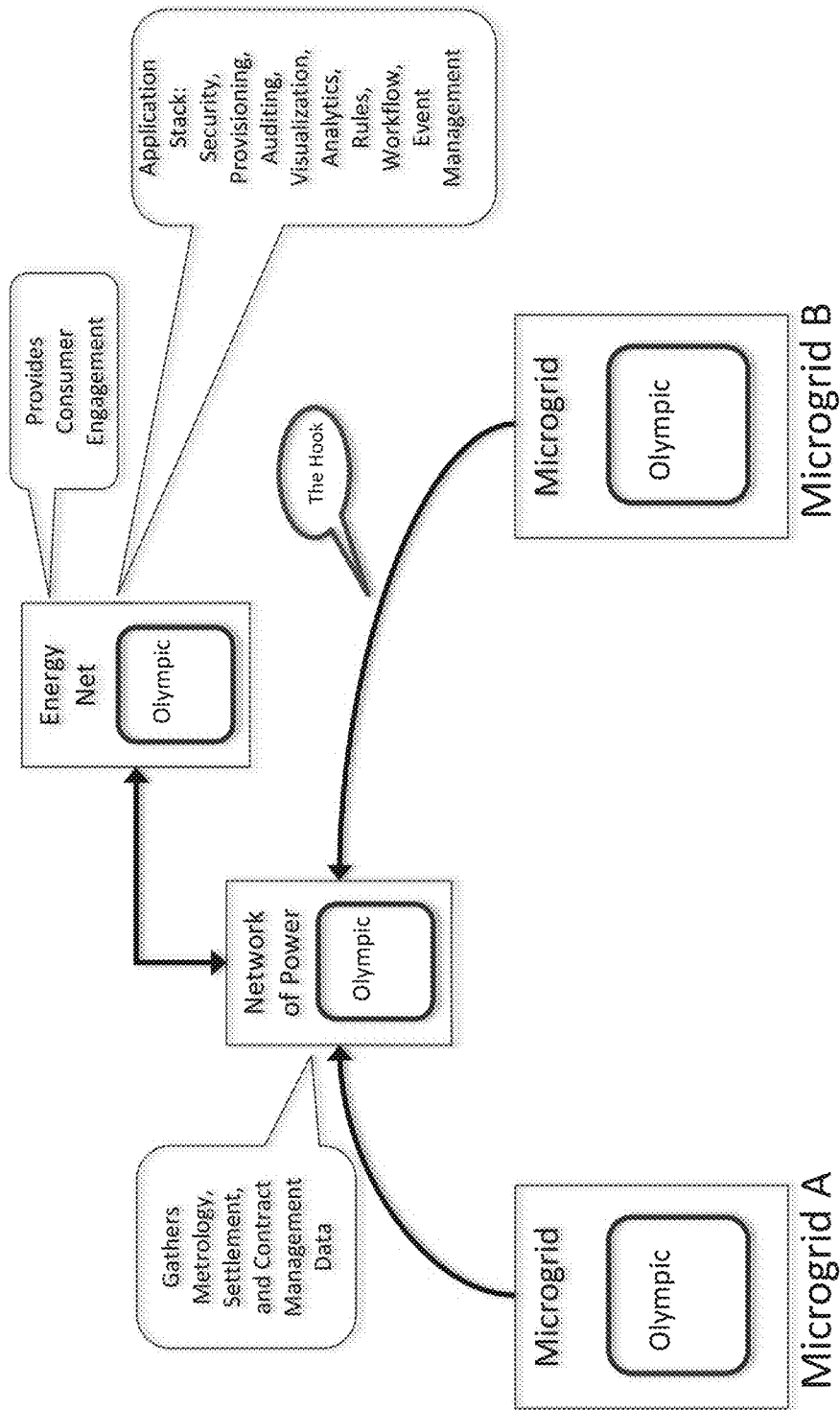
FIG. 1 illustrates an embodiment of a network of microgrids integrated with an EnergyNet platform.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention provides systems and methods for data analysis, messaging, advanced energy settlements, command and control and management of electric power supply, demand, and/or curtailment including graphical user interfaces for consumers, including consumer profiles and alternative pricing programs and/or settlement programs for business and residential applications, including but not limited to graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof. Apparatus embodiments are also provided in accordance with the systems and methods described herein.

Furthermore, novel methods of the present invention provide for consumer guidance and controls that are coupled with graphical user interfaces for mobile applications, websites, and computer displays that provide improved information and controls for consumers for electric power consumption and management of financial settlement therefor. Preferably, the customer sets their preferences through the user interfaces and then the customer's own data, including whether the customer has opted in for direct response participation, is used to make recommendations for grid elements, services, etc., to the end users, and inputs or opt in/out relating to permissions of data use (e.g., meter data aggregator usage).

In the description of the present invention, it will be understood that all EnergyNet embodiments and AES systems and methods descriptions include and incorporate by this reference without regard to individual, specific recitation for each example described, real-time and/or near-real-time data, including revenue grade metrology used for AES financial settlements. Revenue grade metrology data, which a generic computer is incapable of using, is generated by active grid elements in the power grid; measured data is then transformed into settlement grade data for market financial settlement for load and supply. Additionally and similarly, real-time communication, messaging, and data packet transfer is provided over at least one network associated with the systems and methods of the present invention. This requires physical devices, including at least one client device and at least one server, communicating and interacting over the network. The present invention is necessarily rooted in computer technology in order to overcome a problem specifically arising in the realm of computer networks, more specifically, advanced energy settlements, messaging, and applications for electric power supply, load, and/or curtailment and data analytics associated with the same.

This detailed description of the present invention includes energy financial settlements and messaging and/or data packet transfer or transmission, including the following issued patents and/or copending applications by common inventor and/or assignee Causam Energy, Inc.: U.S. Pat. Nos. 8,849,715, 8,583,520, 8,595,094, 8,719,125, 8,706,583, 8,706,584, 8,775,283, 8,768,799, 8,588,991, and 8,761,952, each of which is incorporated by reference in its entirety herein; US Patent Publication Nos. 2014/0180884, 2014/0279326, 2014/0277788, 2014/0039701, 2014/0277786, and 2014/0277787, each of which is incorporated by reference in its entirety herein; and WIPO Publication Nos. WO2014/066087, 2014/0039699, and WO2014/022596, each of which is incorporated by reference in its entirety herein.

The systems and methods of the present invention also provide support and functionality for at least one distribution service provider through the market-based platform to allow communities, municipalities, cooperative power groups, and/or other combinations of persons or entities to be aggregated to form at least one distribution service provider, which may exist within another distribution service provider, transmission/distribution service provider (TDSP), and/or utility. Additionally, a meter data aggregator (MDA) is provided to interface with the distribution service provider and power marketer and/or utility.

FIG. 1 illustrates an embodiment of a network of microgrids integrated with an EnergyNet platform. There are two microgrids, Microgrid A and Microgrid B, electrically and communicatively integrated to a network of power. An EnergyNet platform is coupled to the network of power. The network of power gathers metrology, settlement, and contract management data from Microgrid A and Microgrid B. The EnergyNet platform has its application stack including security, provisioning, auditing, visualization, analytics, rules, workflow, and event management. The EnergyNet platform provides consumer engagement.

Figure 2:
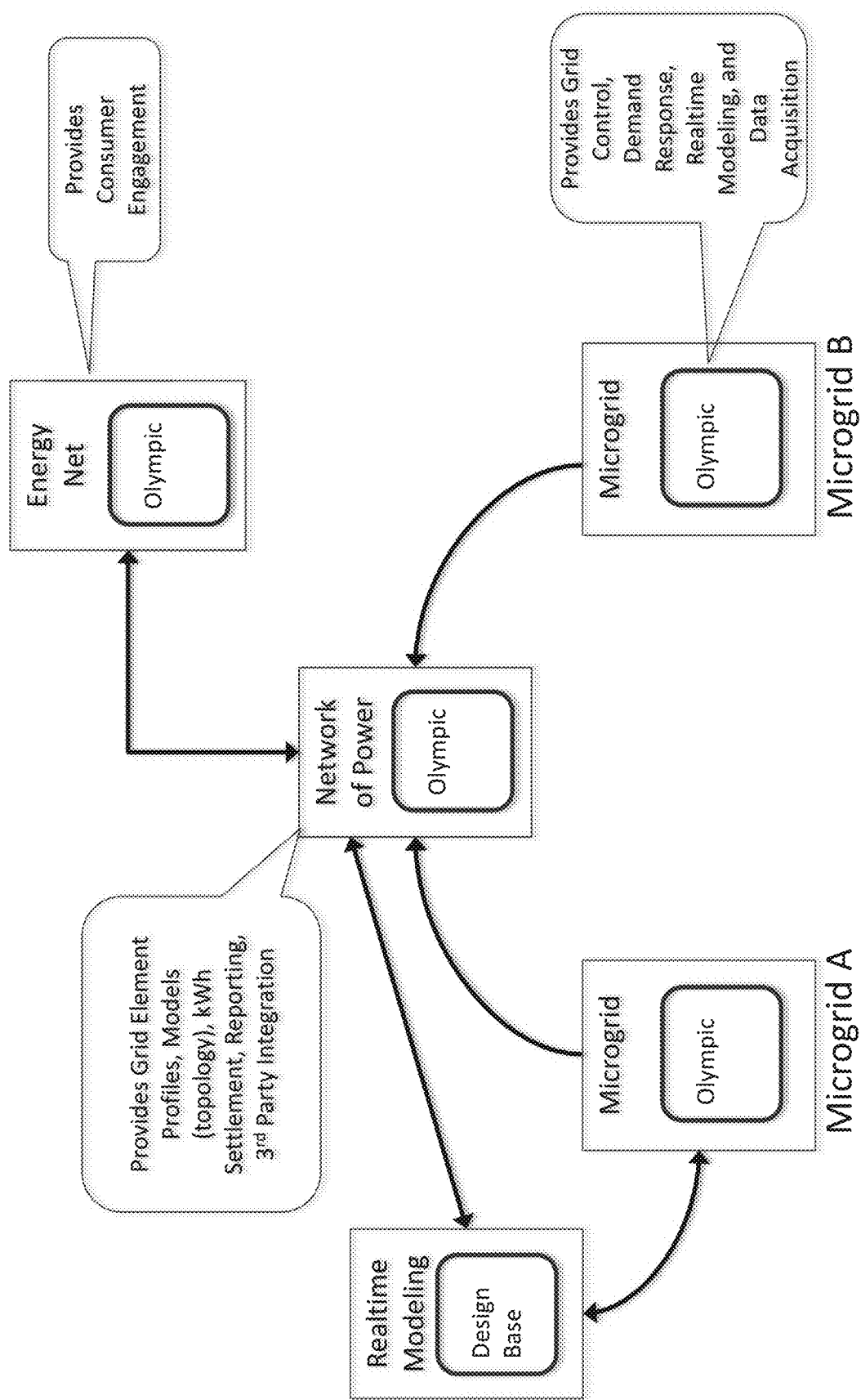
FIG. 2 illustrates another embodiment of a network of microgrids integrated with an EnergyNet platform.

FIG. 2 illustrates another embodiment of a network of microgrids integrated with an EnergyNet platform. There are two microgrids, Microgrid A and Microgrid B. Microgrid B is electrically and communicatively integrated to a network of power, and provides grid control, demand response, real-time modeling, and data acquisition. Microgrid A is externally linked to a real-time modeling module. Both Microgrid A and the real-time modeling module are connected to the network of power for providing grid control, demand response, real-time modeling, and data acquisition. The network of power provides grid element profiles, models and/or topologies, energy settlement, financial settlement, reporting, and third party integration. The network of power is coupled with an EnergyNet platform, which provides consumer engagement on at least one level and preferably on a multiplicity of levels providing for varying levels or degrees of user engagement (e.g., level 0 to level 4, described hereinbelow) from consumer energy consumption from historical data (at least one electrical power bill) uploaded to the platform or system, to grid element introduction and load curtailment or power supply through managed or command and control programs operated by or on behalf of at least one utility or market participant, to vendor interaction and retail electric provider or data aggregator engagement via digital contracts accepted within the electric markets for market-based financial settlement and energy settlement.

Figure 3:
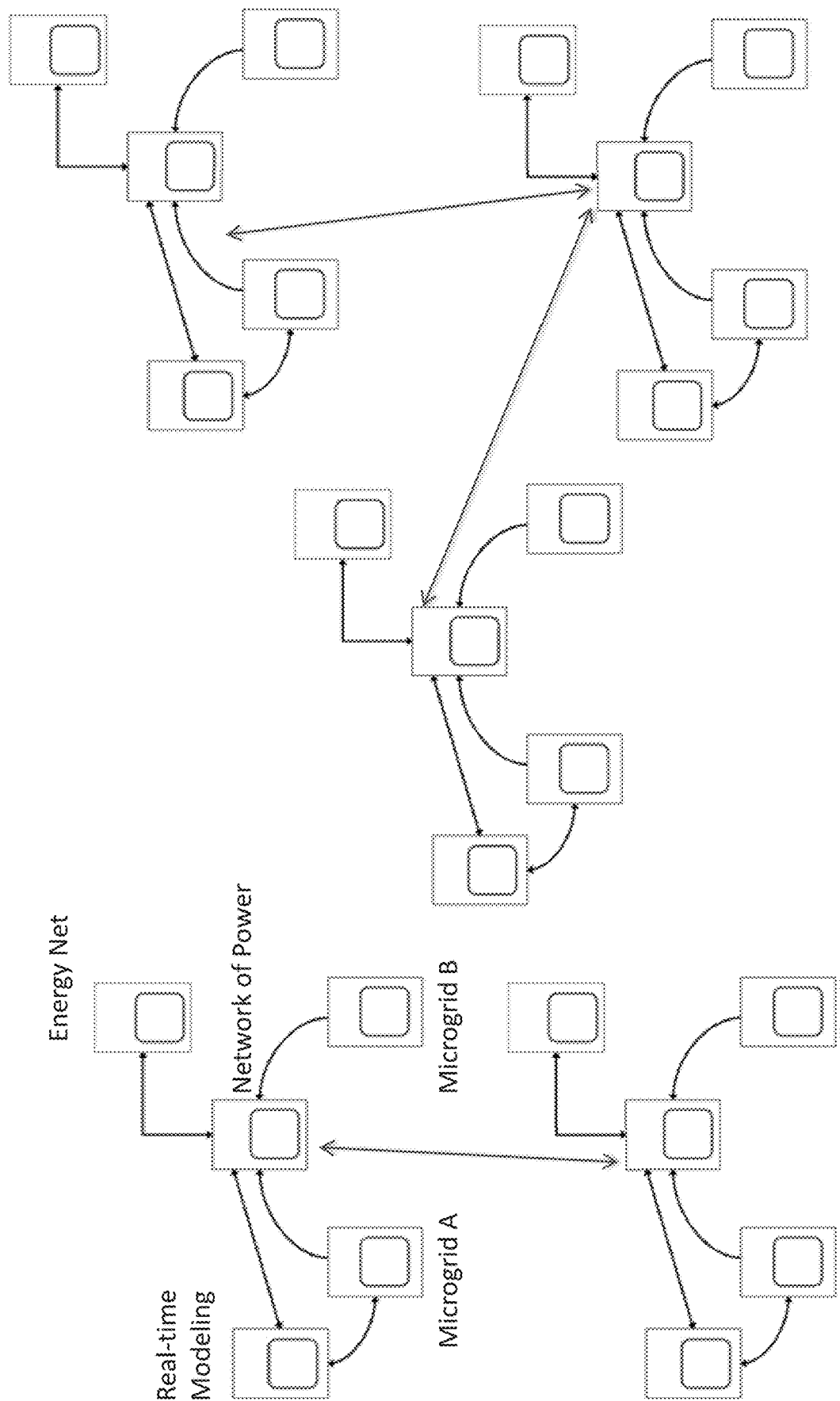
FIG. 3 is a schematic diagram of Federated Microgrid Communities comprising different grid zones.

FIG. 3 is a schematic diagram of Federated Microgrid Communities. These microgrid communities are located in different grid zones. Each of the microgrid communities has a structure as shown in FIG. 2. There are communication links between different microgrid communities within a grid zone.

The present invention includes a multiplicity of interactive graphical user interfaces (GUIs) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a cloud-based computing system as illustrated in FIG. 4.

Figure 4:
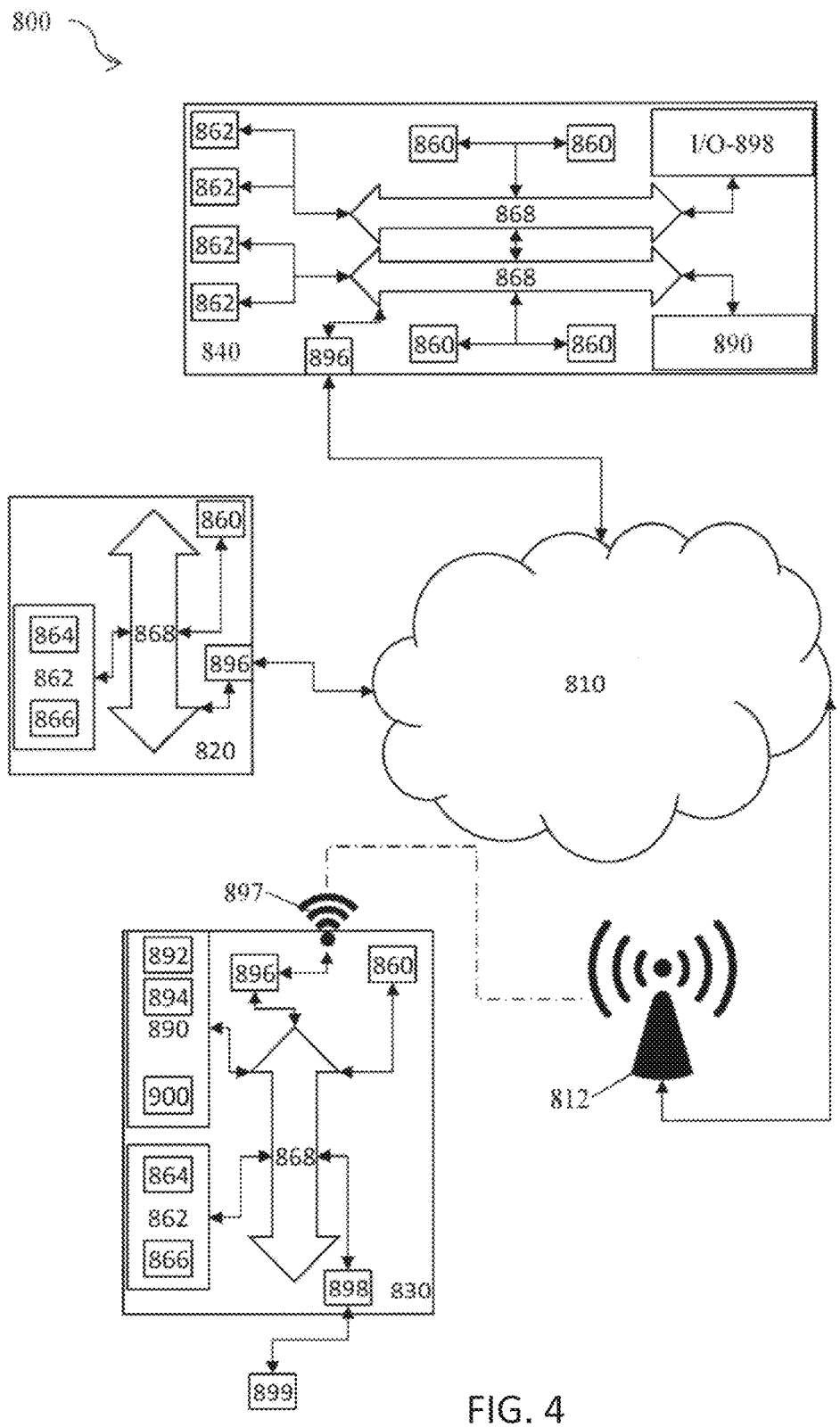
FIG. 4 is a schematic diagram of an embodiment showing a configuration for a cloud-based computing system allowing users to interface with the systems of the present invention.

FIG. 4 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections, or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal, such as a carrier wave or other transport mechanism, and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disk, or other magnetic storage devices; or any other medium that can be used to store the computer readable instructions and which can be accessed by the computer system 800.

It is also contemplated that the computer system 800 may not include all of the components shown in FIG. 4, may include other components that are not explicitly shown in FIG. 4, or may utilize an architecture completely different than that shown in FIG. 4. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the application (e.g., smartphone app) automatically provides information via the GUI associated with the app to indicate to the user (consumer) information about electric pricing plan alternatives, including but not limited to their location, the price for electric power supply on any per unit (e.g., data center, microgrid, building type (commercial or residential), facility, device, grid element, and combinations thereof) basis for a duration and/or at a predetermined time, and combinations thereof. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account.

In a virtualized or cloud-based computing system and methods of the present invention, the following components are provided as illustrated by way of example and not limitation to those described in FIG. 4. Components of a cloud-based computing system and network for distributed communication therewith by mobile communication devices include but are not limited to a server computer with a processing unit. The server is constructed, configured, and coupled to enable communication over a network. The server provides for user interconnection with the server over the network using a remote computer device or a personal computer (PC), smartphone, tablet computer, etc., positioned remotely from the server. Furthermore, the system is operable for a multiplicity of remote personal computers or terminals, for example, in a client/server architecture, as shown. Alternatively, a user may interconnect through the network using a user device such as a personal digital assistant (PDA), mobile communication device, such as by way of example and not limitation, a mobile phone, cell phone, smartphone, tablet computer, laptop computer, netbook, terminal, in car computer, or any other computing device suitable for network connection. Also, alternative architectures may be used instead of the client/server architecture. For example, a computer communications network, or other suitable architecture may be used. The network may be the Internet, an intranet, or any other network suitable for searching, obtaining, and/or using information and/or communications. The system of the present invention further includes an operating system installed and running on the server, enabling the server to communicate through the network with the remote, distributed user devices. The operating system may be any operating system known in the art that is suitable for network communication.

Figure 5:
FIG. 5 illustrates method steps for providing advanced energy settlements (AES) according to one embodiment of the present invention.

FIG. 5 illustrates method steps for providing advanced energy settlements (AES) according to one embodiment of the present invention. A settlement AES process is outlined in six distinct steps as follows: (1) revenue grade settlement block data is used to underpin the settlement process for the billing period (e.g., daily, weekly, monthly, predict & pay); (2) settlement block data is mapped to the appropriate distributed or fixed energy power purchase agreement in effect at that point in time; (3) the cost of each settlement block inclusive of Time of Use (TOU), demand, taxes, access fees, and energy charges is calculated; (4) a customer balance is calculated from all the settlement blocks that apply within the period and automatically collected from the customer; (5) distributed energy charges for all customers billed in the cycle are aggregated by generator and settled through the clearing house; and (6) fixed energy charges for all customers billed in the cycle are aggregated and settled with the energy retailer or REP.

Figure 11:
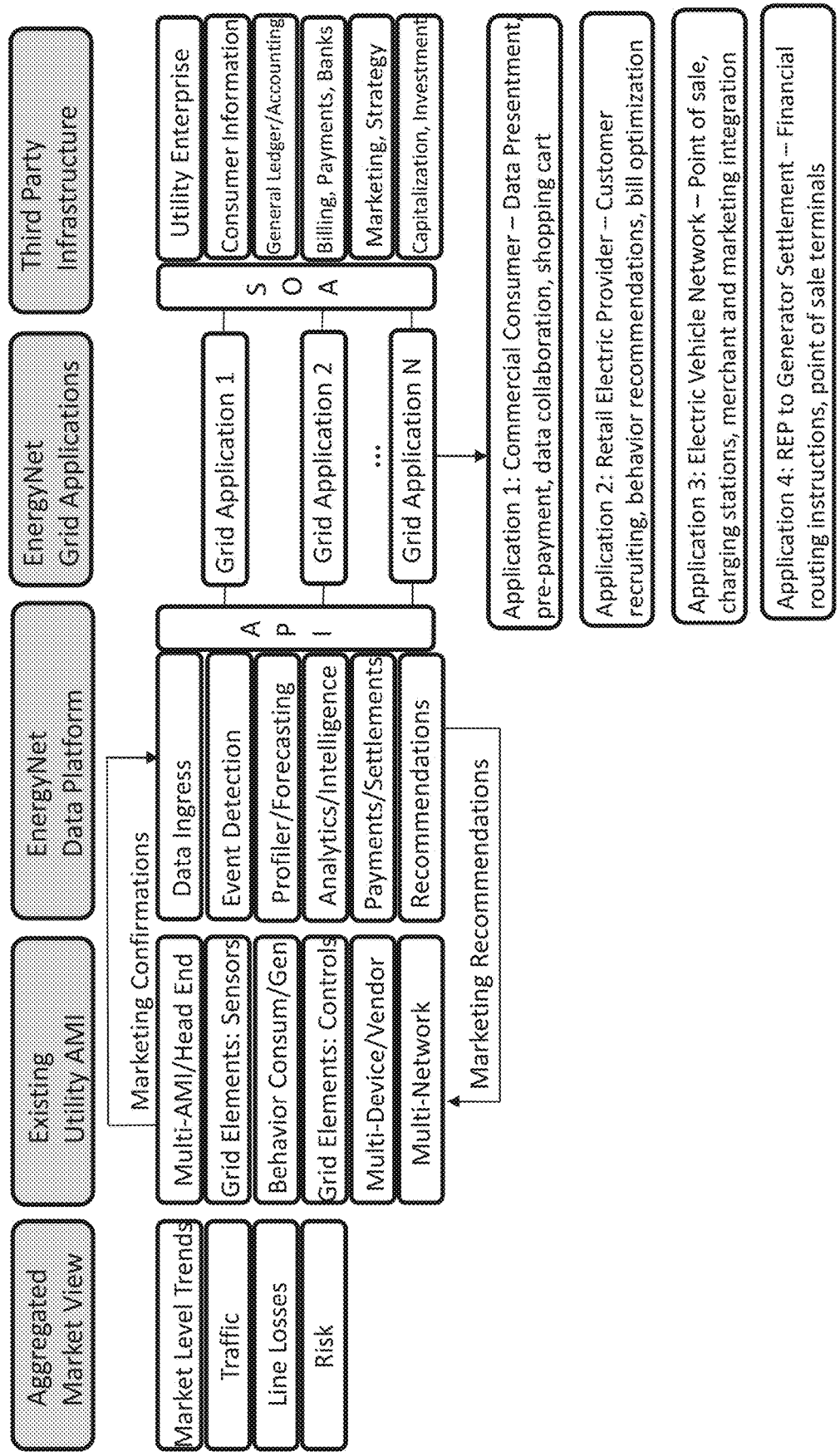
FIG. 11 is a schematic diagram illustrating a grid application model of the systems and methods of the present invention.

The EnergyNet data platform used with AES preferably provides and/or is operable for real-time revenue grade data ingress; stores and organizes packet level information that can be used for forecasting, data mining, revenue extraction, event detection, sophisticated energy management, and enterprise integration purposes; aggregates and stores revenue data into revenue grade settlement blocks (or Power Trading Blocks (PTBs)); connects microgrid and spot market buyers and sellers; provides a fully automated and low latency industry leading settlement process underpinned by a distributed settlement rules engine capable of settling with both distributed and fixed generator market participants; provides an automated payment exchange which supports all advanced billing models (e.g., shared data plan, daily plan, predict & pay); manages payments as single energy bills for customers with EnergyNet responsible for settlement payments between multiple distributed energy generators and the customer's existing energy retailer; provides a real-time energy purchasing solution that matches the customer's real energy consumption against energy currently available within the microgrid or spot market; captures and transforms market data that can provide intelligent analytics by generators for trending, forecasting, planning, and maximizing revenue/investment opportunities; captures and transforms energy data that can provide intelligent analytics for customers' energy management, forecasting, procurement, profiling, bill optimization, and recommendation purposes; and integrates with the existing distributed energy market exchange to allow EnergyNet buyers and sellers to connect and agree prices on distributed generation. As illustrated in FIG. 11, EnergyNet grid applications ensure that the EnergyNet framework is operable to support 1:n grid applications. Third party infrastructure may provide Service-Oriented Architecture (SOA) integration with utility and/or market participant enterprise systems; provide SOA integration with general ledger and accounting systems; and/or provide SOA integration with the financial, banking, and clearing infrastructure, as needed.

For example, in a microgrid management application the EnergyNet platform is transacting between the market, utility, consumers, REPs, distribution service providers, balancing authorities, etc. The energy management system (EMS) power model includes data for frequency, voltage, VARs, state estimation, SCED, and actual or real-time information. Data associated with the microgrid is communicated over a secure IP network. The GUIs of the present invention allow for monitoring the market conditions or grid stability conditions as signaled by the distribution service providers, utilities, etc.; it also allows for monitoring of normal conditions, reserves, forecast conditions, etc. External triggers for the EMS may include changes in forecast conditions, actual conditions, market conditions, market price, schedule based upon forecast price exceeding operating cost for the microgrid, etc. Software as a Service (SaaS) operable within the systems and methods of the present invention provides for dispatch of load and supply via EMS systems for distributed assets, wherein the microgrid is considered its own balancing area. So the various external triggers, including the market and/or market-based pricing, are operable as inputs to activate the isolation or connection of the microgrid according to the profile associated with the microgrid. In one embodiment, the microgrid is a secure, critical infrastructure (such as, by way of example and not limited to, data centers) and/or a military installation or facility, wherein the microgrid is locally managed in GUIs and software for grid stability and function such that the computer and software that controls the microgrid and its grid elements are located within the geographic footprint of the microgrid to enable it to function as its own balancing authority shielded from any external controls of the electrical power flows within it. A microgrid is considered any sub-grid, power generating asset, or power supplying asset that can island itself from the electric power grid and/or connect or reconnect with the main electric power grid (having external controls from the microgrid).

Figure 6:
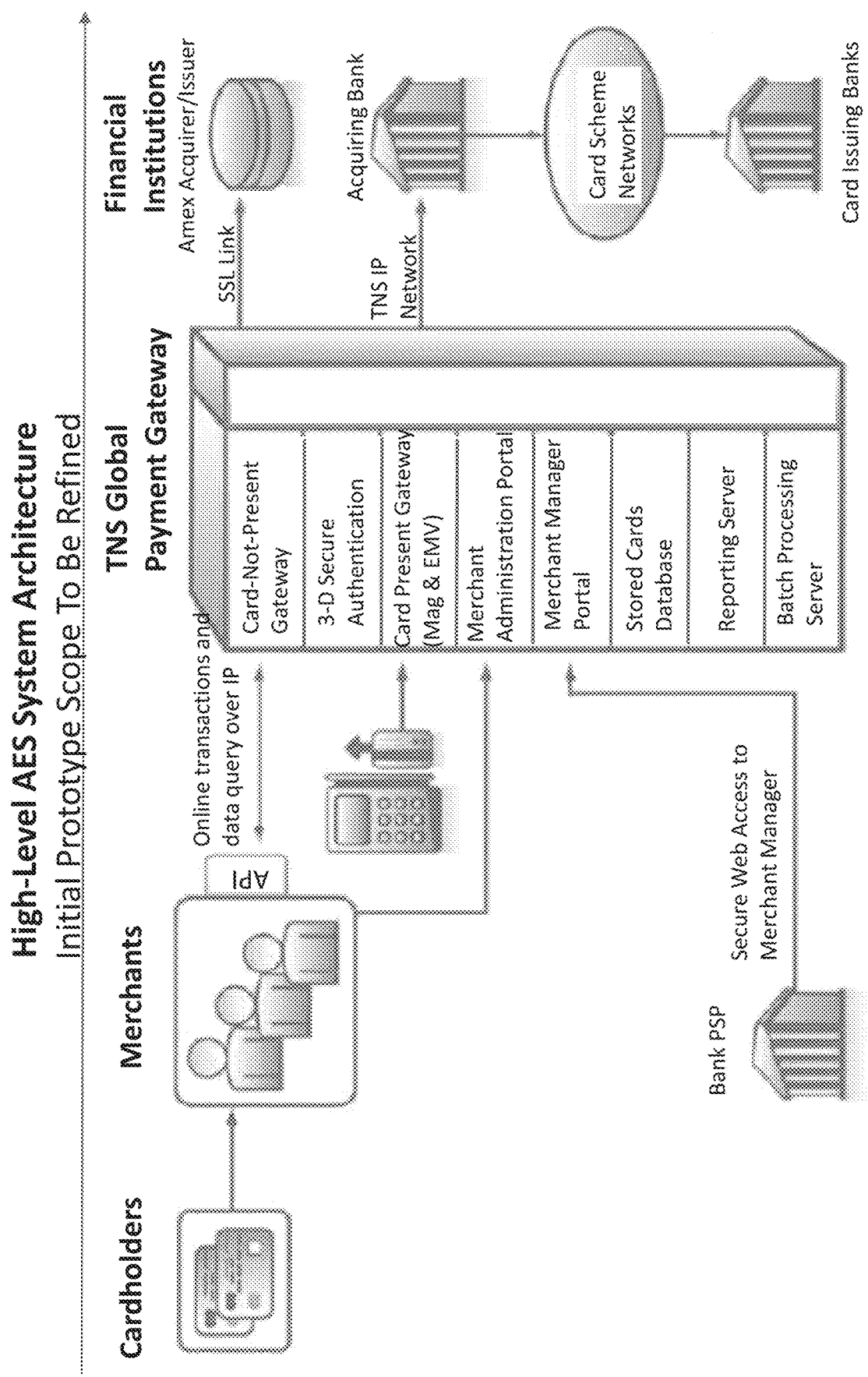
FIG. 6 is a schematic diagram illustrating a high-level AES system architecture according to the present invention.
Figure 12:
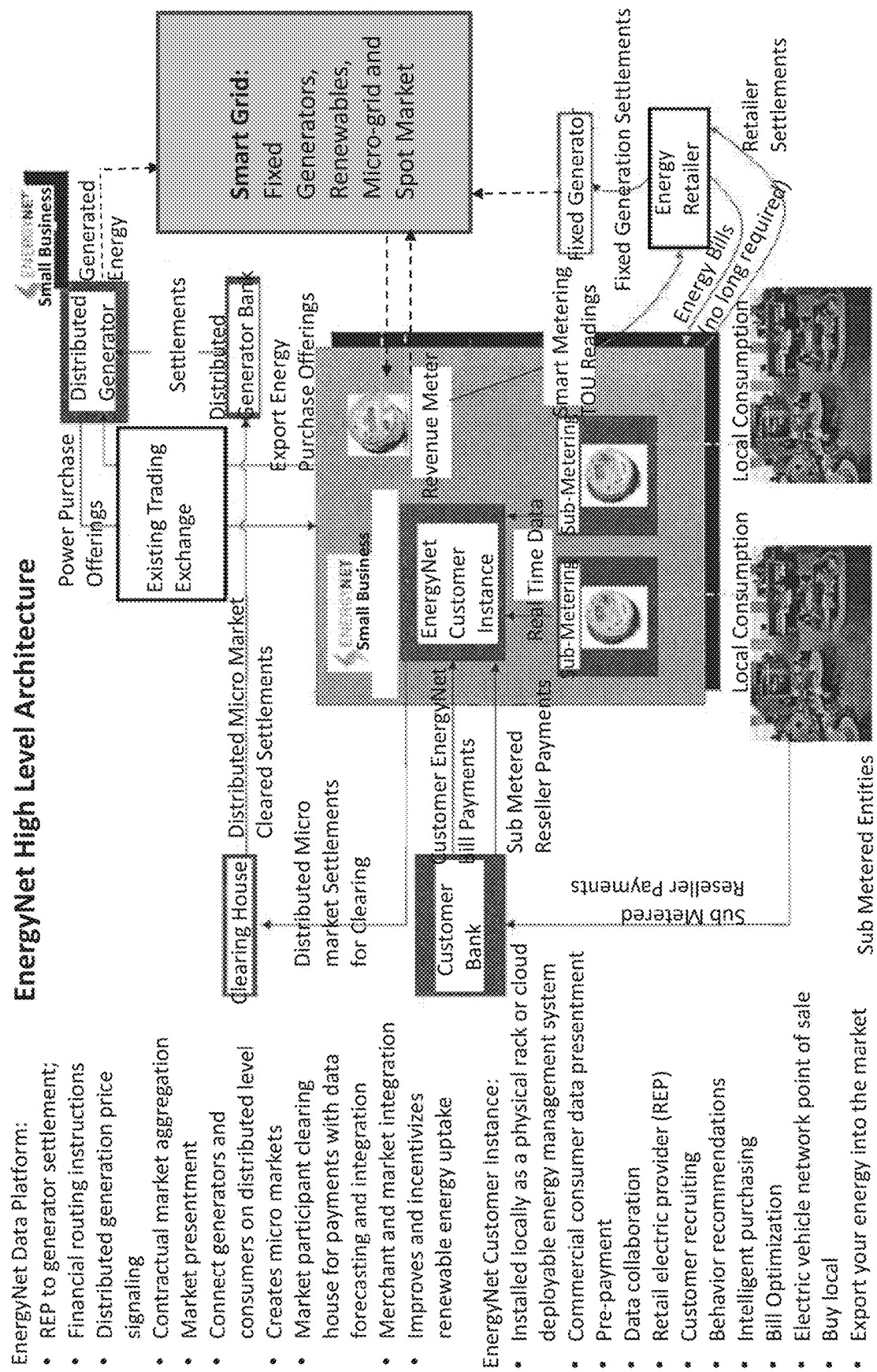
FIG. 12 is a schematic diagram illustrating a high-level system architecture for an EnergyNet embodiment according to the present invention.
Figure 13:
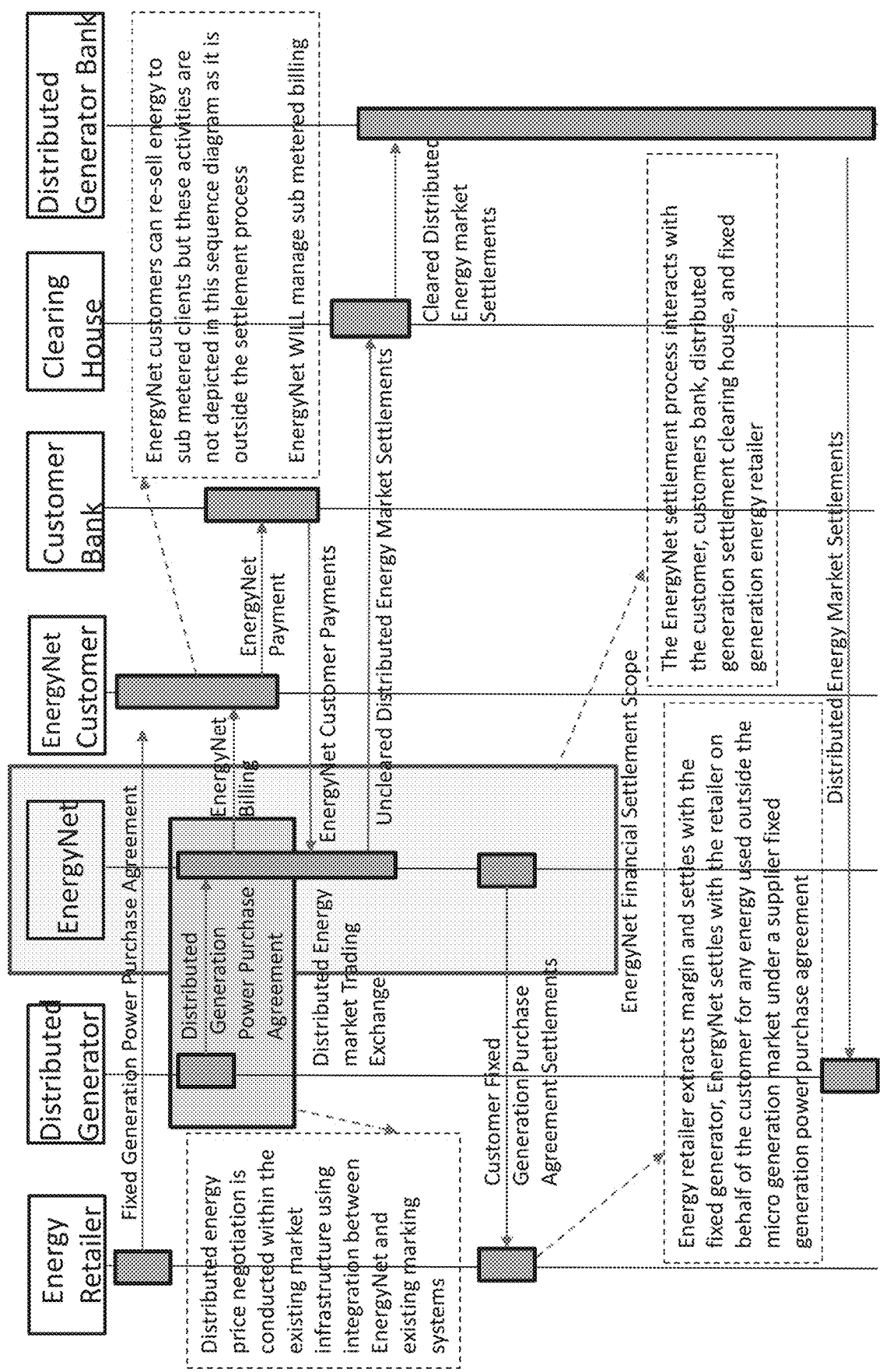
FIG. 13 is a schematic and flow diagram illustrating AES sequencing.

FIG. 6 is a schematic diagram illustrating a high-level AES system architecture according to the present invention. The principal actors and data flows are depicted in FIGS. 6, 12, and 13 for EnergyNet embodiments. Customers receive near-real-time market connection data and price signals through the EnergyNet platform, giving visibility to generated power as it becomes available in the market. This data is used by EnergyNet to facilitate intelligent energy purchasing and settlement between all market participants. Distributed Generators advertise available energy to EnergyNet customers with power purchase offerings published within the EnergyNet platform, ensuring that intelligent energy purchasing decisions can be automated or recommended by EnergyNet within a real-time market. Customers with the capacity to both generate and export energy (i.e., if they have an exportable capacity) can also act as generators through EnergyNet. Customer Payments received from a Customer Bank represent consolidated single payments to EnergyNet for energy purchased on both the fixed and distributed generation market (i.e., supplied by their existing Energy Retailer or Distributed Generators). Settlements are apportioned across revenue grade TOU meter readings over a billing period; internal usage is measured through real-time sub-metering technology at 1 second intervals and/or near real time or real time. EnergyNet supports the billing of sub-metered entities, allowing the EnergyNet customer to resell or cross charge energy using the sub-metered meter readings. The EnergyNet customer instance allows these energy costs to be recovered against the enterprise's total energy consumption. Distributed Generators/generation supplier participants receive cleared settlements from a Distributed Generator Bank for all energy consumed within the billing timelines specified in the distributed power purchase agreements of EnergyNet customers. The Distributed Generator Bank receives aggregated and cleared settlements from a Clearing House for distributed energy that was consumed under each distributed power purchase agreement held by EnergyNet customers. The Clearing House receives all uncleared distributed energy settlements made through EnergyNet's point of sale devices or advanced billing methods before passing the cleared settlements to the Distributed Generator Bank. EnergyNet performs all settlement activities for all participants in a transaction. EnergyNet can also manage the payments for energy resold or cross charged by the customer. This can be viewed and analyzed against the imported energy bill. Customers can still consume energy supplied by fixed generators (e.g., Energy Retailers, REPs) outside the spot energy or micro market; the portion of a customer's consumption that resides within their fixed generation power purchase agreement will be settled with the retailer. The settlement algorithms resolve this using settlement blocks, all power purchase agreements in place, and data generated by revenue grade meter. Purchasing within the spot market requires prices to be negotiated and agreed to in seconds, and these activities require integration with existing market trading systems. A growing customer base allows EnergyNet to provide a complete trading market between users. The purchasing rules engine criteria allows generators to respond to customer preferences and offer a variety of different tariffs as well as alter their own behavior (e.g., if they are a customer/generator can they shift their highest usage off peak and export excess energy at peak periods when demand and prices are higher).

Figure 7:
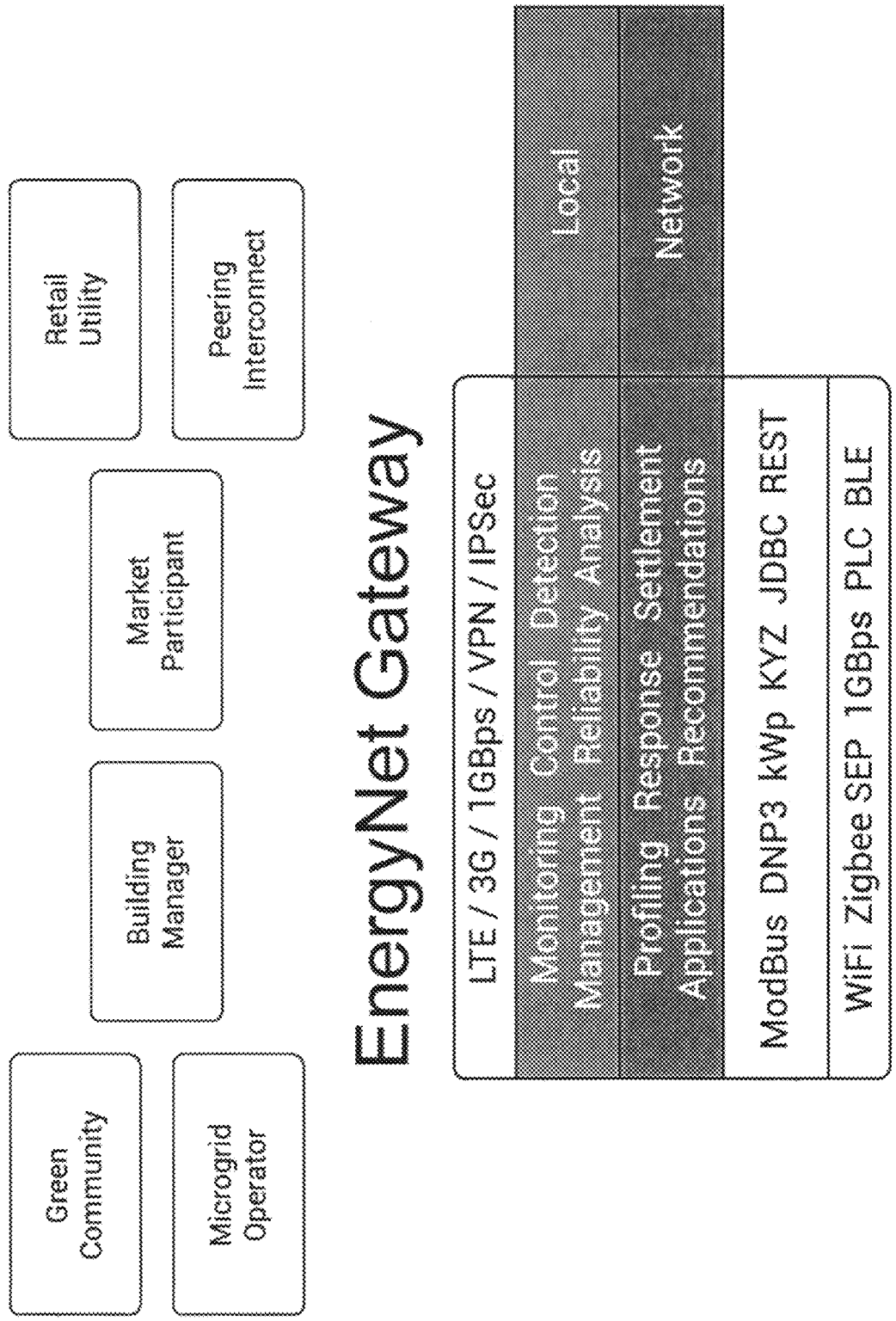
FIG. 7 is a schematic diagram illustrating an exemplary EnergyNet gateway according to the present invention.

FIG. 7 is a schematic diagram illustrating an exemplary EnergyNet gateway according to the present invention. The EnergyNet gateway in the present invention connects different participants having different network protocols to the advanced energy settlement platform. The different participants include green communities, microgrid operators, building managers, market participants, and retail utilities. The EnergyNet gateway is also used for peering interconnections. Different communication protocols/standards may be supported by the EnergyNet gateway (e.g., LTE, 3G, 1 GBps, VPN, IPSec, ModBus, DNP3, kWp, KYZ, JDBC, REST, WiFi, Zigbee, SEP, PLC, BLE). At the local level, the EnergyNet gateway is operable for monitoring, control, detection, management, reliability, and analysis. At network level, the EnergyNet gateway is operable for profiling, response, settlement, applications, and recommendations. Zigbee Hadoop or any distributed DB or structure capable of receiving large amounts of data, whether structured or unstructured data.

Figure 8:
FIG. 8 is a schematic diagram illustrating a partial list of exemplary grid elements according to the present invention.

FIG. 8 is a schematic diagram illustrating a partial list of exemplary grid elements according to the present invention. The grid elements include but are not limited to power transfer switches, wind meters, utility meters, battery discharge controllers, tenant sub-meters, solar meters, power distribution units (PDUs), appliance switches, electric vehicle charging stations, distributed energy resources (DERs), transfer switches, electric vehicle batteries, inverters, controllable loads, weather stations, and HVAC environments.

Figure 9:
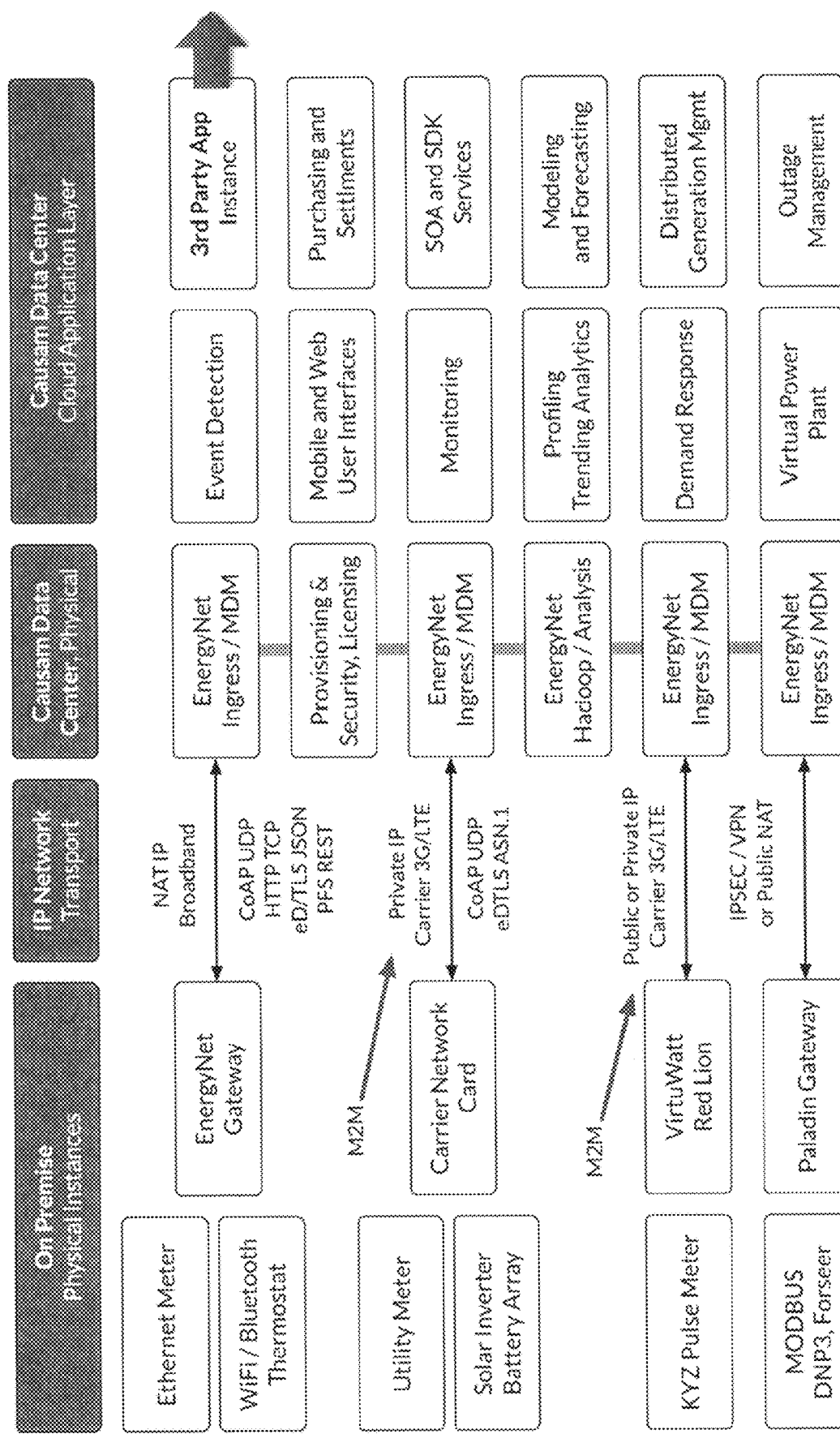
FIG. 9 is a schematic diagram illustrating components of the systems and methods of the present invention.
Figure 10:
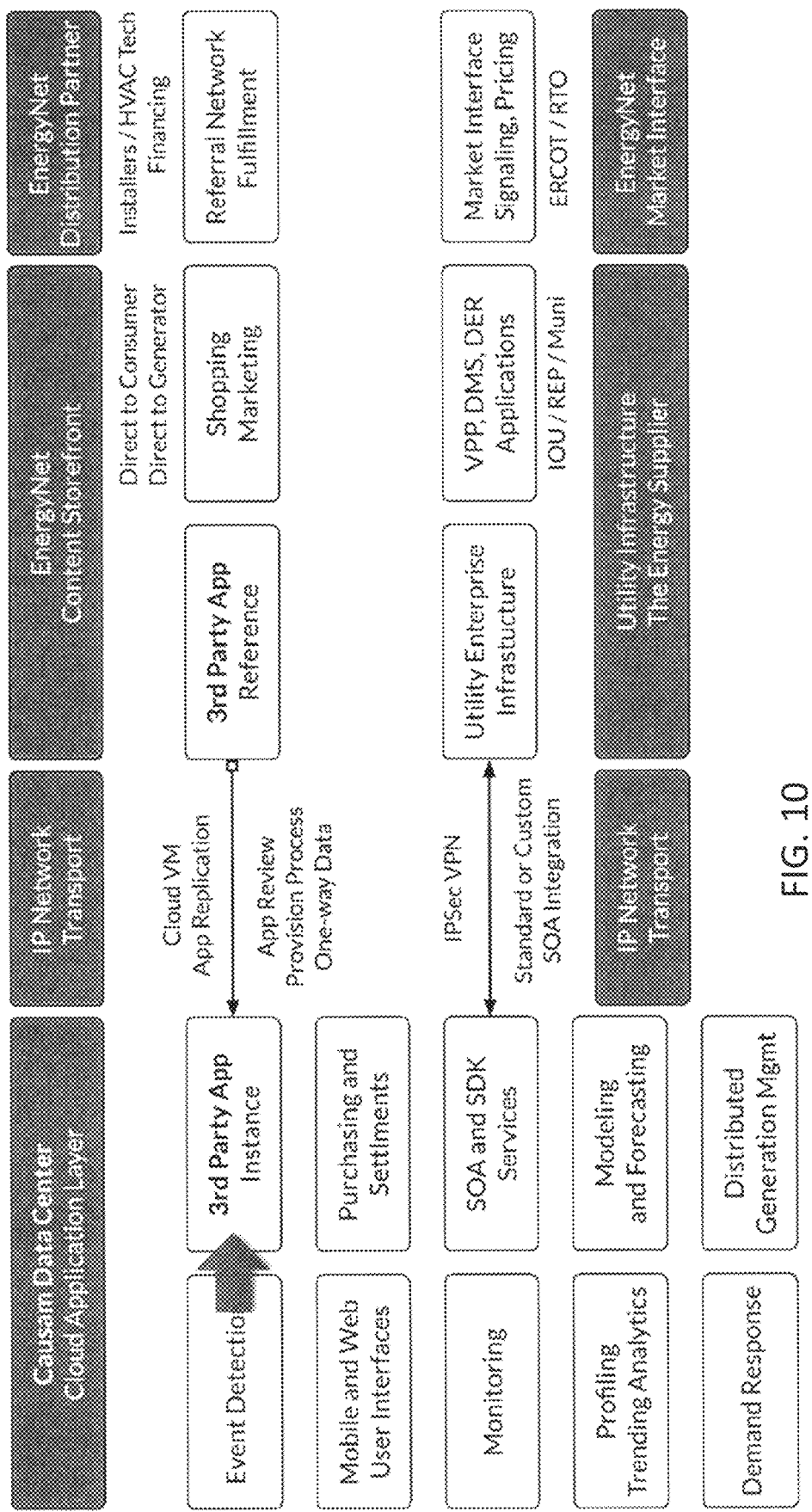
FIG. 10 continues to illustrate components of the systems and methods of the present invention shown in FIG. 9.

FIGS. 9 and 10 are schematic diagrams illustrating components of the systems and methods of the present invention. The systems of the present invention include on premise physical instances, an IP network, a Causam data center, an EnergyNet Content Storefront, at least one EnergyNet Distribution Partner, an EnergyNet Market Interface, and Utility Infrastructure at the Energy Supplier. The on premise physical instances, such as Ethernet meters, WiFi/Bluetooth thermostats, utility meters, solar inverter battery arrays, KYZ Pulse meters, and devices using MODBUS, DNP3, or Foreseer, are connected to an IP network through an EnergyNet gateway, a carrier network card, a VirtuWatt Red Lion, or a Paladin gateway. The Causam data center has a physical layer that includes EnergyNet Ingress for meter data management (MDM); provisioning, security and licensing; and EnergyNet Hadoop for analysis. The Causam data center further includes a cloud application layer providing event detection, third party App instances, mobile and web user interfaces, purchasing and settlements, monitoring, Service-Oriented Architecture (SOA) and Software Development Kit (SDK) services, profiling and trending analytics, modeling and forecasting, demand response, distributed generation management, virtual power plant (VPP), and outage management. The EnergyNet Content Storefront provides third party App reference, which has one-way communication to the third party App instance in the Causam data center for cloud Virtual Machine (VM), App replication, App review, and provision process. The EnergyNet Content Storefront also provides shopping and marketing directed to consumers and generators. The EnergyNet Distribution Partner includes installers, HVAC technicians, and financing institutions, who serve as a referral network, fulfill orders, and provide services. The EnergyNet Market Interface connects with regulation agencies, for example ERCOT and other RTOs, for signaling and pricing. The Energy Supplier can be an investor-owned utility (IOU), REP, and/or municipal power agency. The Utility Infrastructure at the Energy Supplier provides applications, such as VPP, Distribution Management System (DMS), and DER applications, and Utility Enterprise Infrastructure. The Utility Enterprise Infrastructure communicates with the SOA and SDK services at the Causam data center via IPSec and/or VPN for standard or customer SOA integration. AMI system feeds directly into EnergyNet or into a meter data management system that then communicates the data to the EnergyNet platform.

FIG. 11 is a schematic diagram illustrating a grid application model of the systems and methods of the present invention. The EnergyNet Grid Application Model includes aggregated market view, existing utility advanced metering infrastructure (AMI), EnergyNet Data Platform, EnergyNet Grid Applications, and third party infrastructure. The aggregated market view provides information such as market level trends, traffic, line losses, and risk. The existing utility AMI includes multi-AMI for head end systems, grid elements for sensing, grid elements for controlling, multi-devices/vendors, and multi-network. The EnergyNet Data Platform provides application program interfaces (APIs) for data ingress, event detection, profiling and forecasting, analytics and intelligence, payments and settlements, and recommendations. The multi-AMI for head end systems in the existing utility AMI provides marketing confirmation to data ingress on the EnergyNet Data Platform. The recommendations provided by the EnergyNet Data Platform are marketing recommendations provided to multi-network in the existing Utility AMI. EnergyNet Grid Applications include multiple grid applications. For example, grid application 1 is for data presentment, pre-payment, data collaborations, and shopping carts for commercial consumers; grid application 2 is for customer recruiting, behavior recommendations, and bill optimization for retail electric providers; grid application 3 is for point of sale, charging stations, merchant and marketing integration for an electric vehicle network; grid application 4 is for financial routing instructions and point of sale terminals for REP to generator settlements; etc. Third party infrastructure includes SOA for utility enterprise; consumer information; general ledger and accounting; billing, payment, and banks; marketing and strategy; and capitalization and investment.

FIG. 12 is a schematic diagram illustrating a high-level system architecture for an EnergyNet embodiment according to the present invention. This high-level system architecture includes a customer deployable distributed EnergyNet Customer Instance providing customers with a complete energy management, purchasing, and settlement solution within the microgrid and spot generation market for AES.

FIG. 13 is a schematic and flow diagram illustrating AES sequencing. There are four key elements within the EnergyNet enterprise financial settlement product: data ingress, market participation, payments collection, and advanced energy settlements. Intelligent purchasing decisions require advanced smart metering, and EnergyNet uses high speed IP metering technology to build a complete and real-time energy consumption profile aggregated from multiple sub-metering points. All consumption data within the enterprise forms settlement blocks, which are used to drive the billing and settlement process. All metering data is aggregated to provide a real-time settlement block and total enterprise consumption view with drill down. This data forms the basis for billing, settlement, forecasting, market view, and other analytical transformations. Note that EnergyNet can also utilize less dynamic data from legacy meters and head end systems where a customer investment in conventional sub-metering has already been made. Profiling is an important element for customers to forecast future usage and committing to purchase offerings. Time of Use (TOU) and/or demand profiles created from base data are an important tool for customers and generators alike; industry standard profiling techniques can be used to create profiles. Generators can use profiles to price their products and plan their generation activities. Customers can use profiles to ensure they commit to the power purchase offerings that are best aligned with their anticipated usage.

Buyers and sellers of electric power are connected within the microgrid or spot market associated with AES of the present invention. Sellers can advertise their generated capacity to customers in near real time and customers can make intelligent purchasing decisions based upon actionable real-time data. The Advanced Energy Settlement (AES) process performs all billing, payment, and settlement activities with financial and clearing participants. A configurable market purchasing rules engine ranks and selects energy from the market based on customer preferences such as cost, payment preference, locality, renewability of the energy, market supply, consumption, etc., and may recommend purchasing from one or more suppliers. The suitability of the offering also depends on additional factors, such as any minimum and maximum usage constraints, which requires decisions to be made based upon forecasts derived using historical data and profiles stored within EnergyNet.

Figure 14:
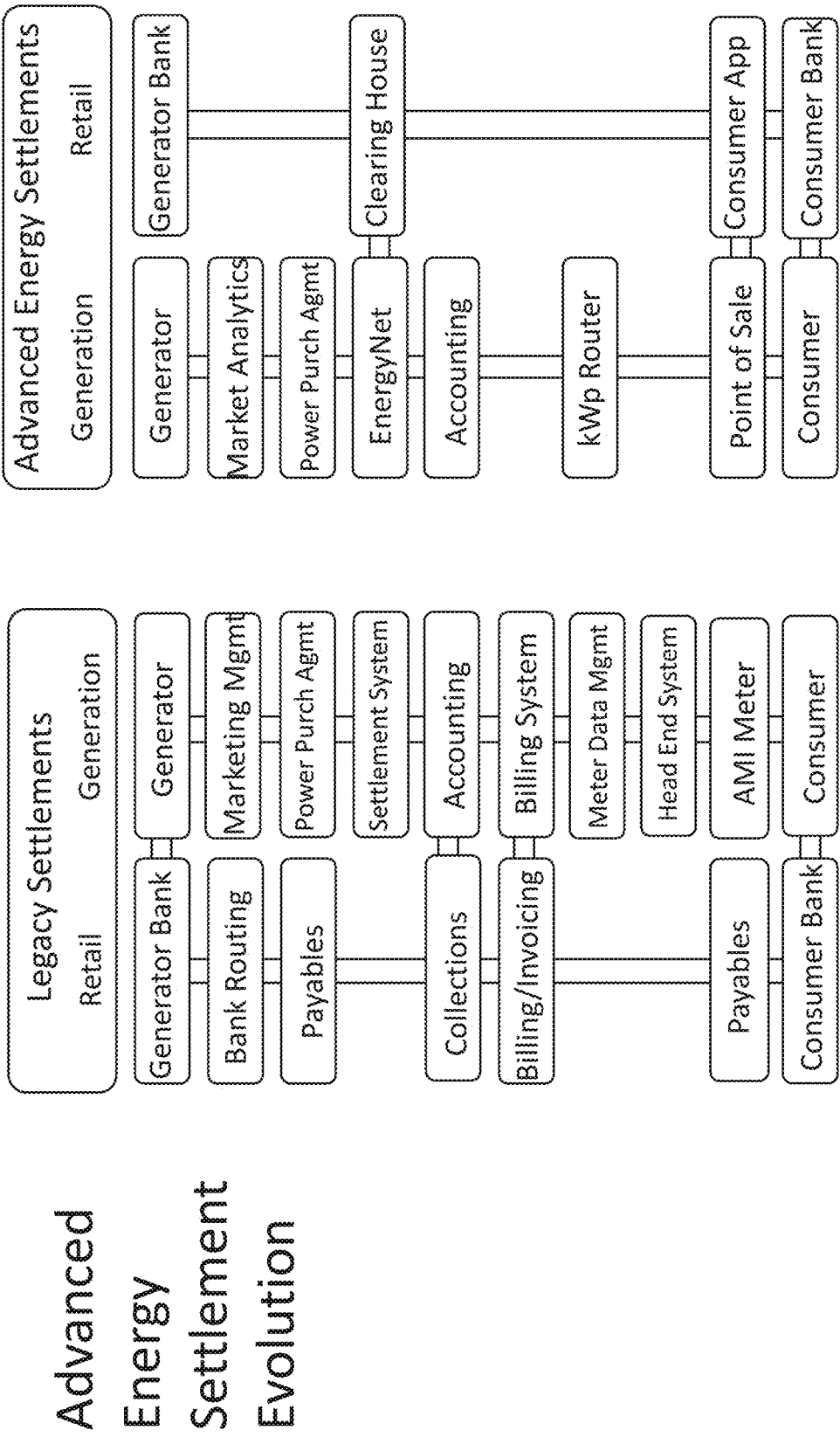
FIG. 14 is a schematic diagram illustrating AES evolution for the systems and methods of the present invention.

FIG. 14 is a schematic diagram illustrating AES evolution for the systems and methods of the present invention. The advanced energy settlements in the present invention has an EnergyNet Platform in communication with a clearing house, which does the settlements between the generator bank and the consumer bank. This requires fewer participants than legacy settlements, which results in simplified communications between the participants.

The EnergyNet data platform provides distinct graphic user interfaces (GUIs) for various participants of advanced energy settlements. In one embodiment, the GUIs are web-based interfaces. In another embodiment, the GUIs are interfaces of mobile application programs (Apps) for various participants.

The GUI enables simulation and modeling for building demand response resources DERs, microgrids, etc., allowing for a drag and drop that automatically triggers generation of a power model and a pro forma model having at least one generator and/or at least one load device associated with it, and an engineering interconnection based upon location, equipment, grid identifier, geodetic information, attachment point information, etc. The model considers collected data provided by the customer, historical data, and the current environment of the distribution system; it allows any operable attachment point to be an energy settlement and market-based financial settlement point, and provides an interconnection to the attachment point. The model also indicates if devices are added, provides cost information for the devices, lists the attributes of the devices, etc., which are used as inputs to generate a cost curve that determines how much the customer will spend and funds receivable based upon participation in programs (e.g., encouraging sustainable or alternative energy).

The system includes a grid element catalog that includes attributes of the grid elements. Based upon customer inputs, the model indicates options that match or fit the customer's profile. The model also provides information about financing and energy capacity programs as provided by REP, TDSP, independent system operator (ISO), RTO, community, FERC, and/or the governing body of the power grid. Once the customer selects a grid element, the system provides digital contract elements and/or financing terms associated with that grid element and/or corresponding services. For example, installation, service, and maintenance contract terms for generator, solar, etc. The digital contract is a standard form document between suppliers and consumers at wholesale or retail level. Digital contract terms are coordinated through the platform for market participants (e.g., utilities, consumers, and all parties between the utility and consumer). Digital contract terms for a grid element device are presented as part of update messaging and/or programming, through a coordinator or distributed database, or combinations thereof. Contract terms and data, including but not limited to financial settlements for grid elements and their participation on or with any electric power grid, extend through the fields of the template and function as a complex rules engine to be administered vis-à-vis the grid elements and related or corresponding services, distributed architectures, networks, etc.

The GUI shows options for customers based on customer preferences, data generated by the customer, and the results of power modeling. End use customers (residential or commercial) are presented choices for grid elements, OEMs offering grid elements, energy plans, and service and maintenance plans.

The platform makes calculations based upon the reliability of microgrids and/or DERs. These calculations are used to provide recommendations and updated information to users in real time and/or near real time through the GUIs.

Electric vehicles or other mobile power storage devices on the microgrid are part of the platform. The present invention allows for receiving, delivering, and/or discharging power from a mobile power storage device, interrupting the charging of that device, and combinations thereof with a portable market participant platform and corresponding GUI. Grid elements may decouple or couple to any pre-approved attachment point; this provides for dynamic interconnection of the grid element having mobile power storage. The platform dynamically updates the model for the grid upon confirmation of location or geo-detection of that grid element. The platform also contains predictive analytics that show locations in need of power inputs. Required components associated with the mobile storage device or electric vehicle include at least a meter for revenue grade metrology sufficient for market-based financial settlement and at least one pre-approved attachment point for the interconnect; the mobile storage device or electric vehicle must also be registered with the platform. Pre-approved interconnection zones are thus provided for mobile grid elements; these zones and/or their aggregation further provide for logical nodes for controlling or inputting power or load, demand response, etc. The zones may further function as balancing areas.

Utility Operator Interface

A utility operator interface provides a utility view for control room staff to control DERs with transparency. Maps, tables, and charts are applied for illustration and view in regional or smaller areas. Regional control scenario algorithm and detail view control for specific premise or units are applied for real-time behavior or run-mode adjustments to support grid operations.

Figure 15:
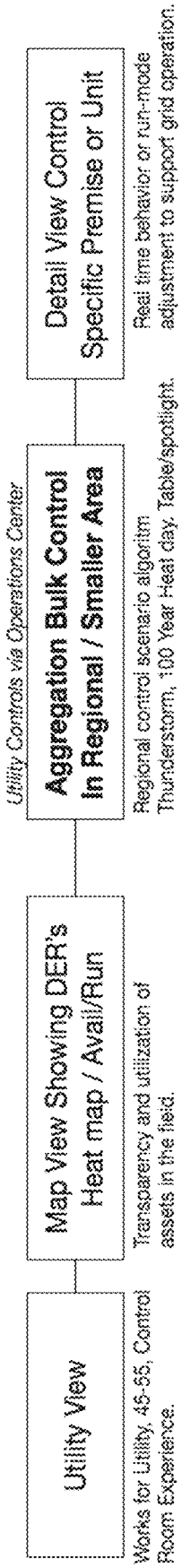
FIG. 15 is a block diagram for the functions of a utility operator interface provided by an EnergyNet data platform.

FIG. 15 is a block diagram for the functions of a utility operator interface provided by an EnergyNet data platform. The utility operator interface provides utility operators with a utility view, map view showing DERs, aggregation bulk control in regional or smaller areas, and detail view control for a specific premise or unit. In one embodiment, the map view of the utility operator interface includes a heat map of DERs showing available capacity and running capacity. It provides a transparent view of utilization of assets in the field. In one embodiment, a regional control scenario algorithm is used for aggregation bulk control. Current and/or historical weather and climate data may be listed in a table. Detail view control provides real-time behavior or run-mode adjustment to support grid operation.

Figure 16:
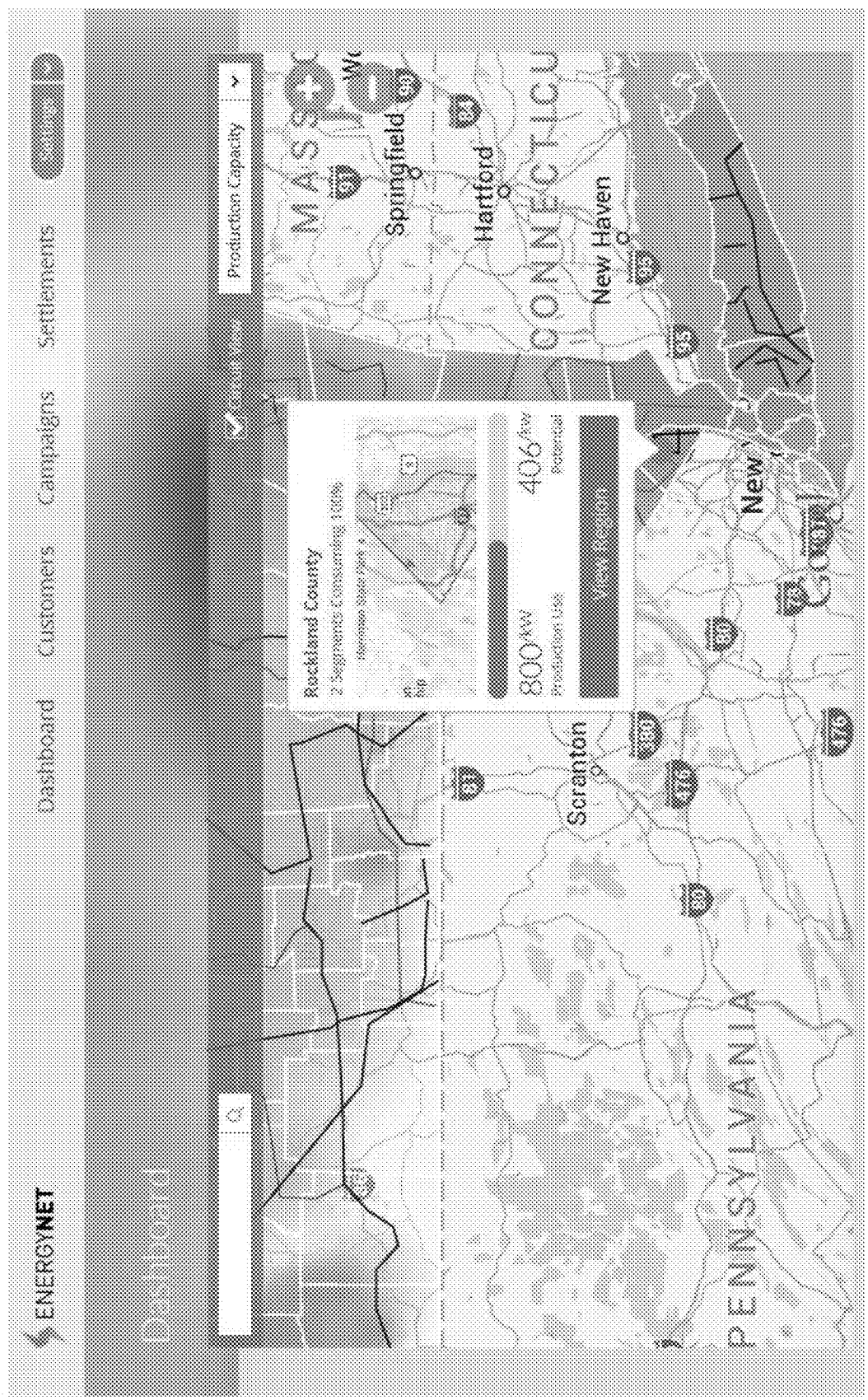
FIG. 16 is a screenshot of a utility operator interface showing a heat map of a distributed energy resource (DER) in a certain area displaying production capacity distribution by circuit view.
Figure 17:
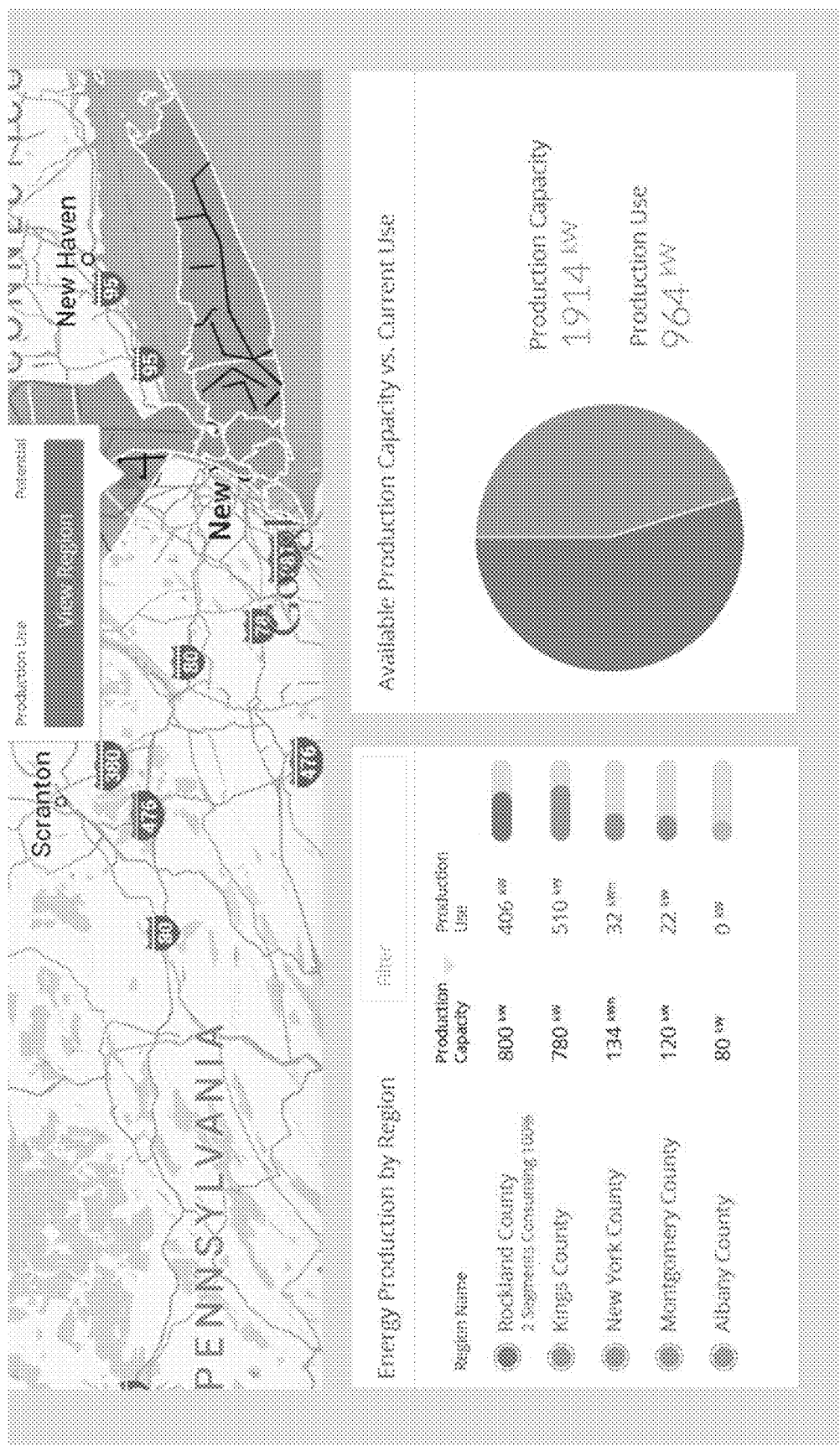
FIG. 17 is a screenshot of a utility operator interface showing energy production in a certain area by region.
Figure 18:
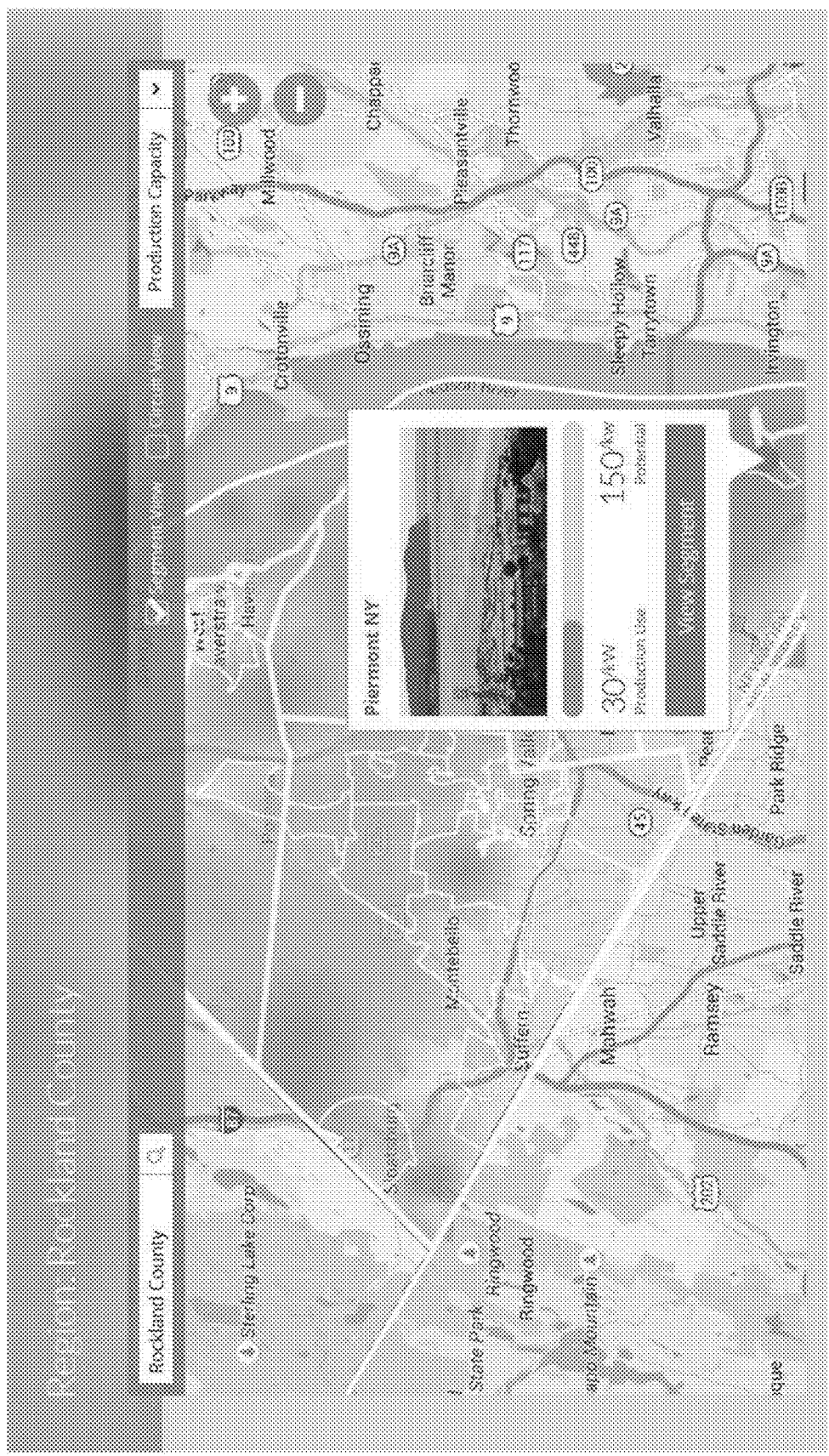
FIG. 18 is a screenshot of a utility operator interface showing a heat map of a DER displaying production capacity distribution by segment view.
Figure 19:
FIG. 19 is a screenshot of a utility operator interface showing a tabular and graphic description of different segments.
Figure 20:
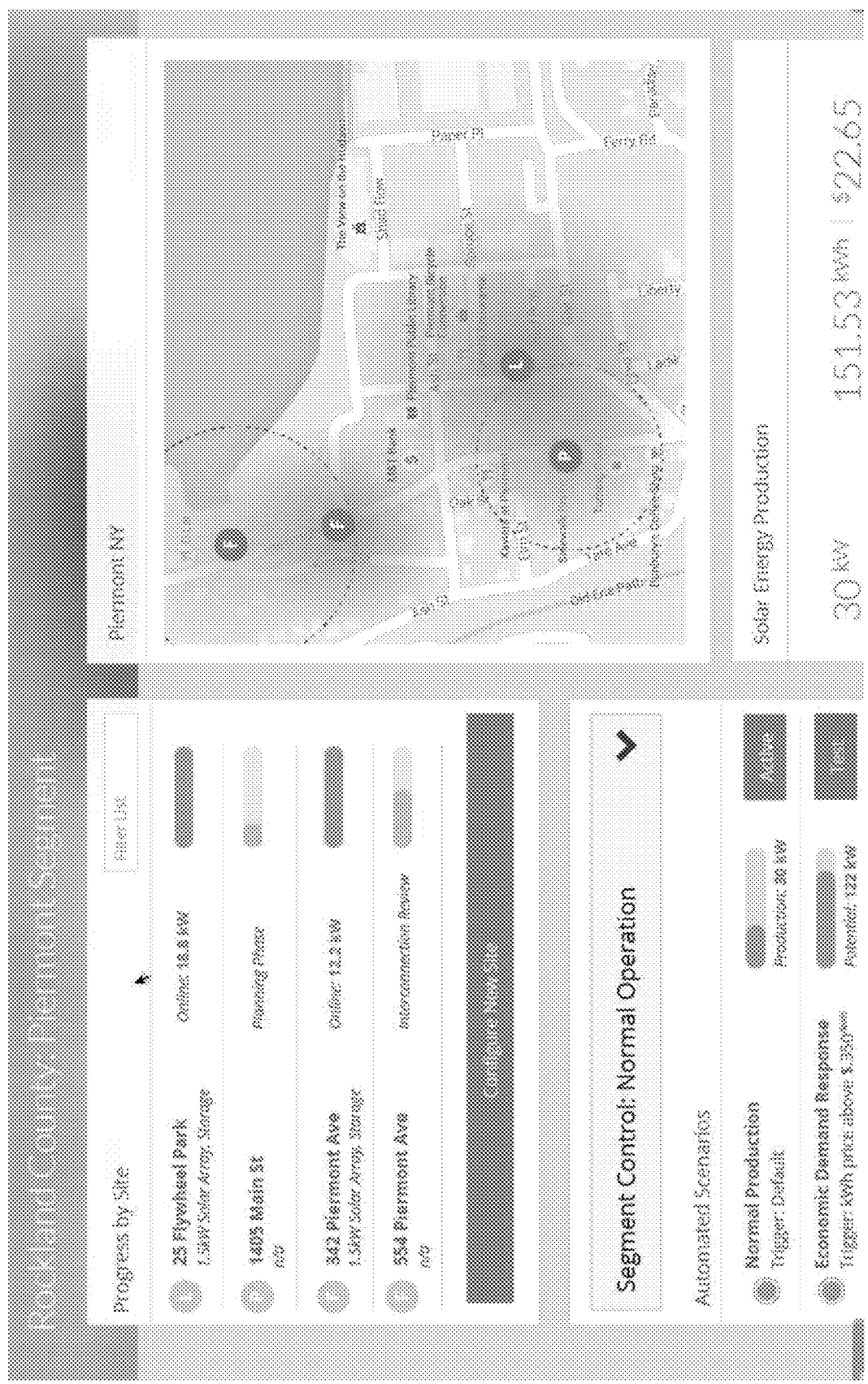
FIG. 20 is a screenshot of a utility operator interface providing a map of different DERs sites in a certain segment and information regarding each site's configuration.
Figure 21:
FIG. 21 is a screenshot of a utility operator interface showing a detailed energy description of a specific site.
Figure 22:
FIG. 22 is a screenshot of a utility operator interface describing the grid configuration of a specific site and showing the energy demand and usage of a specific site.

FIGS. 16-22 are screenshots of a utility operator interface. FIG. 16 shows a heat map of a distributed energy resource (DER) in a certain area displaying production capacity distribution by circuit view. FIG. 17 shows energy production in a certain area by region. Region name, production capacity, and production use are listed. A chart of available production capacity vs. current use is also displayed. FIG. 18 shows a heat map of a DER in a certain region displaying production capacity distribution by segment view. FIG. 19 shows a tabular and graphical description of different segments. Segment status, segment name, zip code, utility usage, the number of DERs sites in a segment, production potential, production use, and the microgrid configuration mode are listed in a table. The microgrid configuration mode options include but are not limited to normal production and economic demand response. When the utility cost is above a threshold, the microgrid in a certain segment may be in economic demand response mode. Control room staff can perform segment control via the utility operator interface, for example, to change microgrid configurations. Production sources are presented in a pie chart listing the type of power source, including but not limited to solar, generator, or storage. A bar graph of production vs. consumption is also shown, along with the average monthly production of energy per square foot, average monthly price per square foot for energy produced, average monthly consumption of energy per square foot, and average monthly price per square foot for energy consumed. FIG. 20 provides a map of different DERs sites in a certain segment and information regarding each site's configuration. Energy production, demand, and usage can be displayed for each site. The progress by site is shown, including information about whether a site is online, in the planning phase, or under interconnection review. A heat map including these different sites is also displayed. FIG. 21 provides a detailed energy description of a specific site. A heat map showing the location of the specific site is provided. Different energy sources, including alternate solar, utility, and battery storage, are listed with their current status, rate, and power usage. Solar energy production is illustrated in a bar graph, and values are shown for the current production and average daily production. FIG. 22 describes the grid configuration of a specific site and shows the energy demand and usage of that site. Various configuration modes include normal operation, off-grid island, grid parallel, distributed generation, demand response, and black start support. Utility operators are enabled to activate a certain configuration mode. Demand and use is displayed graphically, and information about the real-time power usage, current energy usage, current daily cost, average energy usage, and average daily cost is provided.

Interconnection Processing Interface

Figure 23:
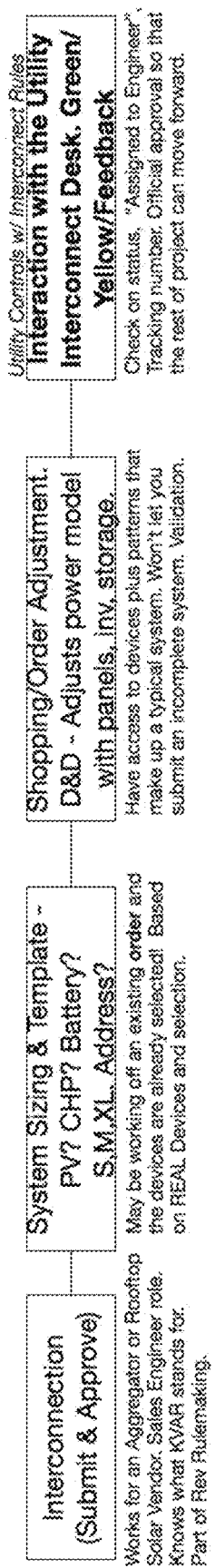
FIG. 23 is a block diagram for the functions of an interconnection processing interface provided by an Energy-Net data platform.

FIG. 23 is a block diagram for the functions of an interconnection processing interface provided by an EnergyNet data platform. The interconnection processing interface enables a sales engineer for a DER provider, demand response, curtailment response provider, or renewable energy provider, or any assets deployed at transmission/distribution system level for electric power grids to facilitate interconnection requests and studies, system sizing and template, shopping and order adjustments, and interaction with the utility interconnect desk. The interconnection processing interface also provides a validation function wherein a sales engineer is unable to submit an incomplete system.

Figure 24:
FIG. 24 is a screenshot of an interconnection processing interface showing interconnection progress by site.
Figure 25:
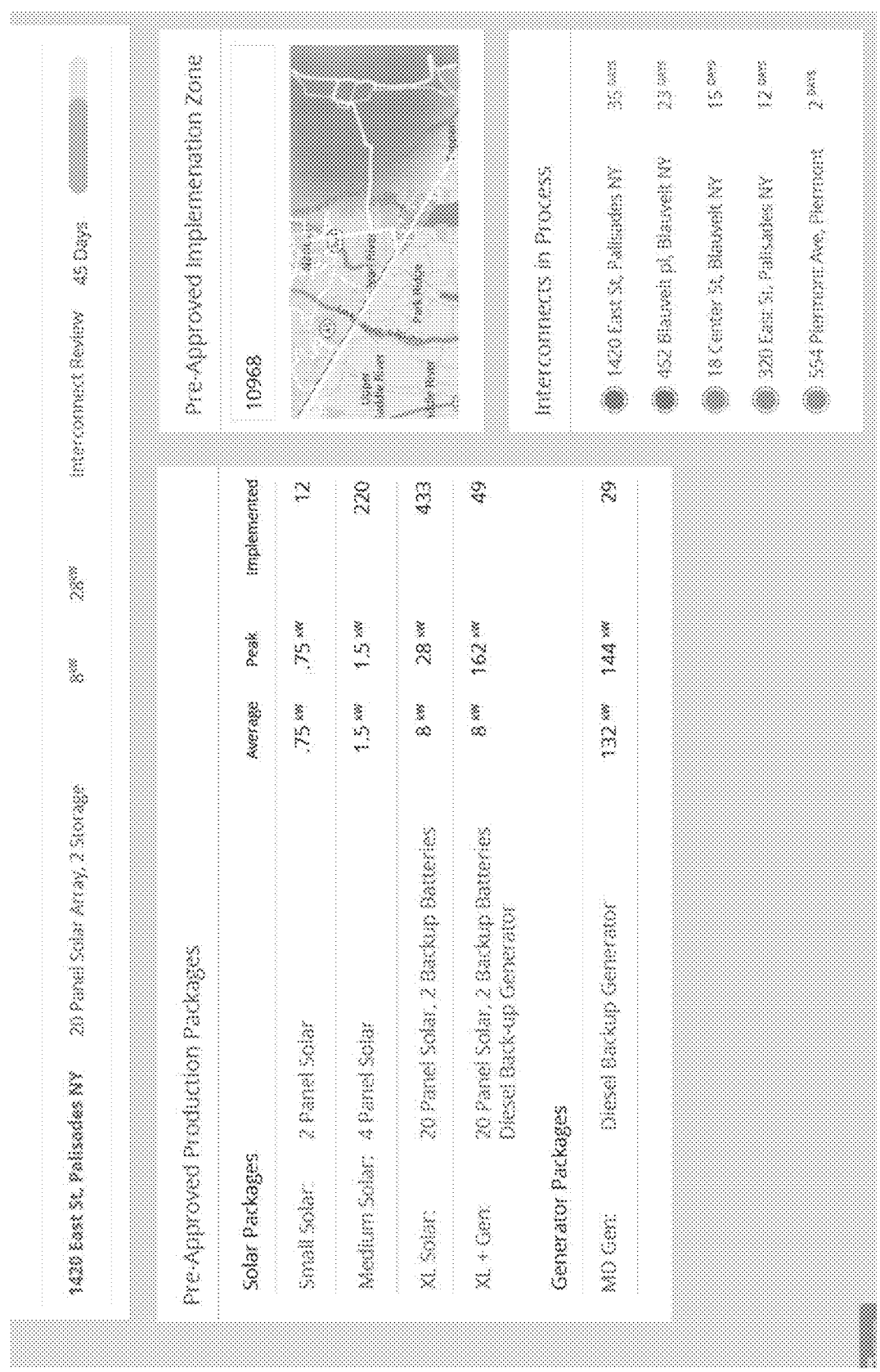
FIG. 25 is a screenshot of an interconnection processing interface displaying pre-approved production packages and listing interconnects in progress.
Figure 26:
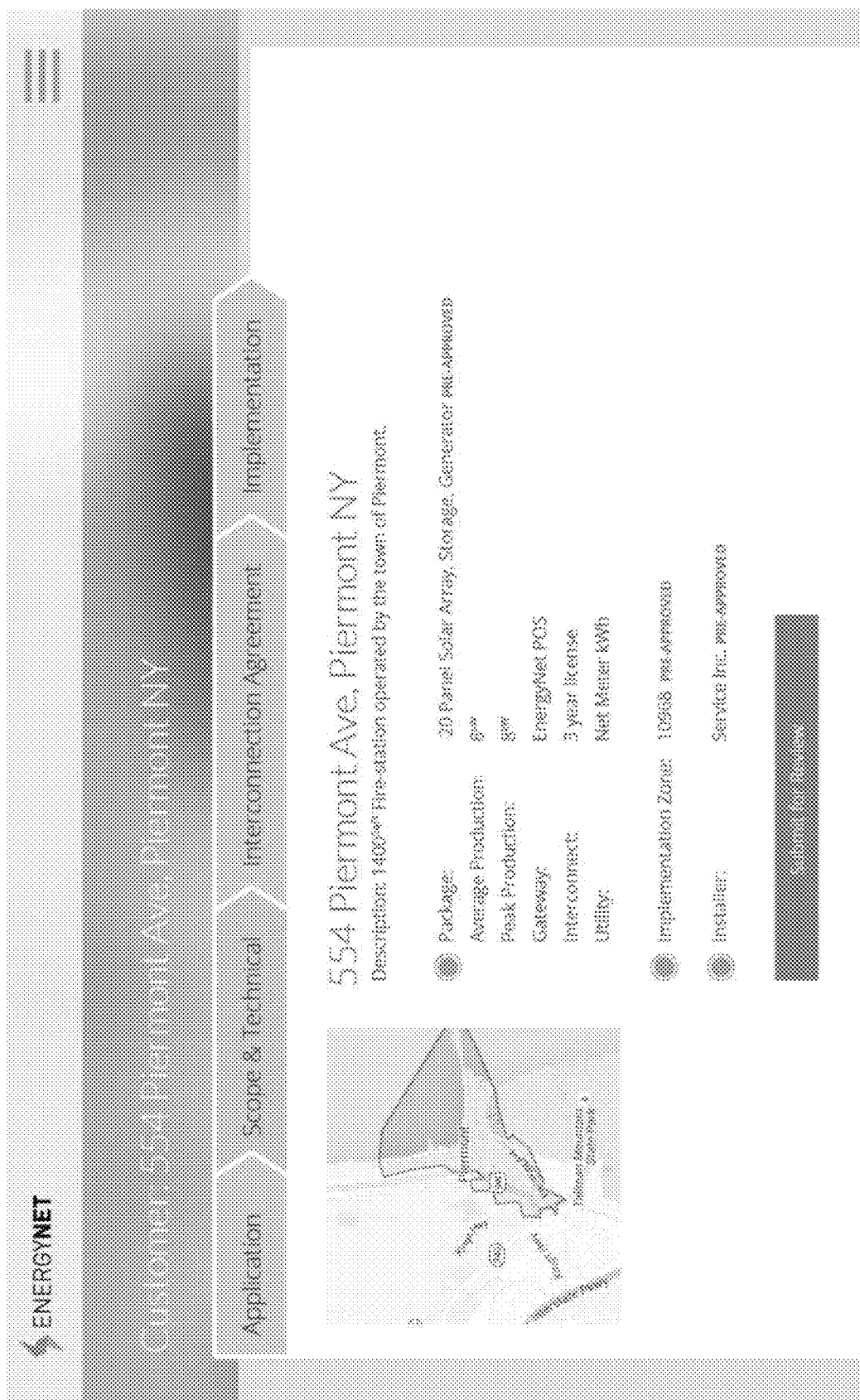
FIG. 26 is a screenshot of an interconnection processing interface displaying the scope and technical description for an interconnection application submitted for review.
Figure 27:
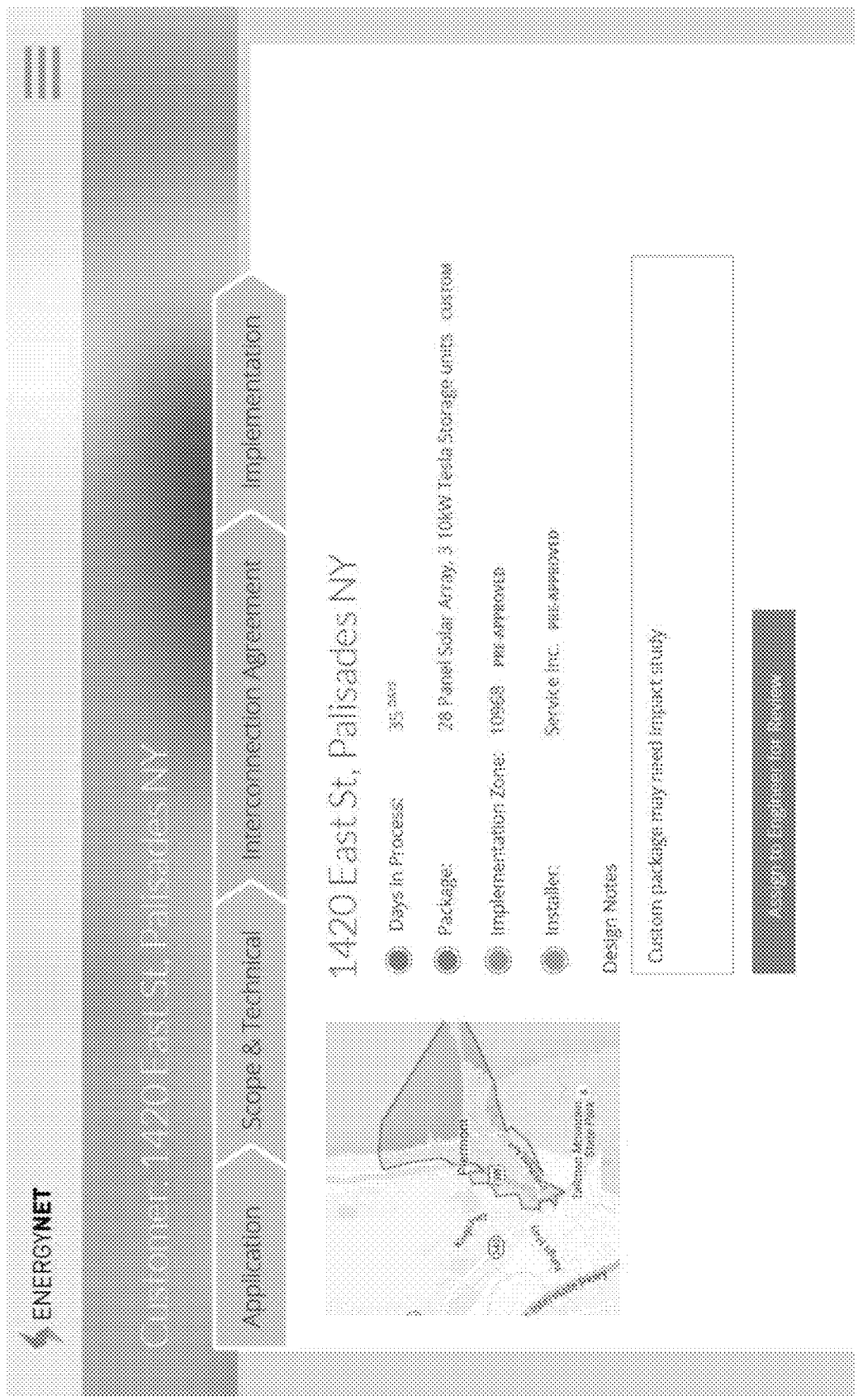
FIG. 27 is a screenshot of an interconnection processing interface displaying information about the interconnection agreement for an interconnection application assigned to an engineer for review.

FIGS. 24-27 are screenshots of an interconnection processing interface. FIG. 24 shows interconnection progress by site. Address, production configuration, average power, peak power, interconnection request stage, and time in progress are provided for each site. FIG. 25 displays pre-approved production packages. Descriptions of solar packages including size, equipment needed (e.g., solar panels, backup batteries, and backup generators), average power, peak power, and the number of implemented packages are provided, as well as descriptions of generator packages including the average power, peak power, and number of implemented packages. The interface also includes a list of interconnects in progress and the time in progress. FIG. 26 displays the scope and technical description for an interconnection application submitted for review. The interface displays a description of the site, the package selected by the customer, the average power production, peak power production, gateway, interconnect license information, utility, implementation zone, and installer. FIG. 27 displays information about the interconnection agreement for an interconnection application assigned to an engineer for review. The interface displays the address, days in process, package selected by the customer, implementation zone, and installer; it also allows for design notes to be entered about the application.

Vendor/Aggregator View Interface

Figure 28:
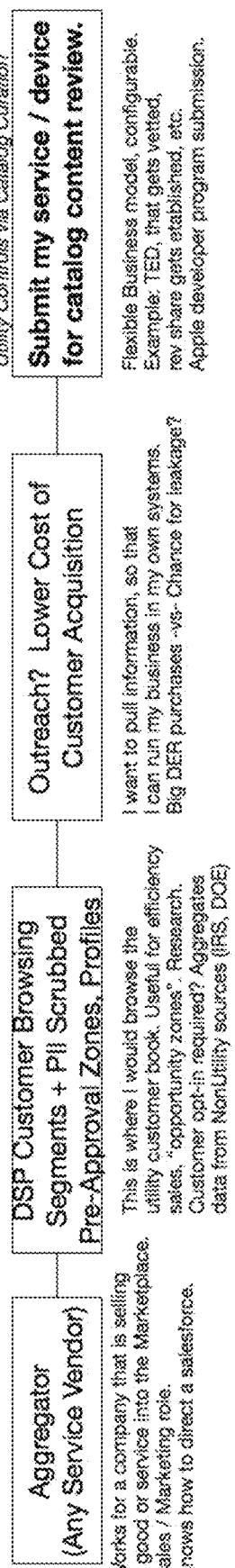
FIG. 28 is a block diagram for the functions of a vendor/aggregator view interface provided by an EnergyNet data platform.

FIG. 28 is a block diagram for the functions of a vendor/aggregator view interface provided by an EnergyNet data platform. The interface enables vendors/aggregators to browse distributed service provider customers, perform outreach, lower the cost of customer acquisition, and submit services and devices for catalog content review.

Figure 29:
FIG. 29 is a screenshot of a vendor/aggregator view interface listing top customer segments, top sellers in the marketplace, top campaigns in the marketplace, and pre-approved production zones.
Figure 30:
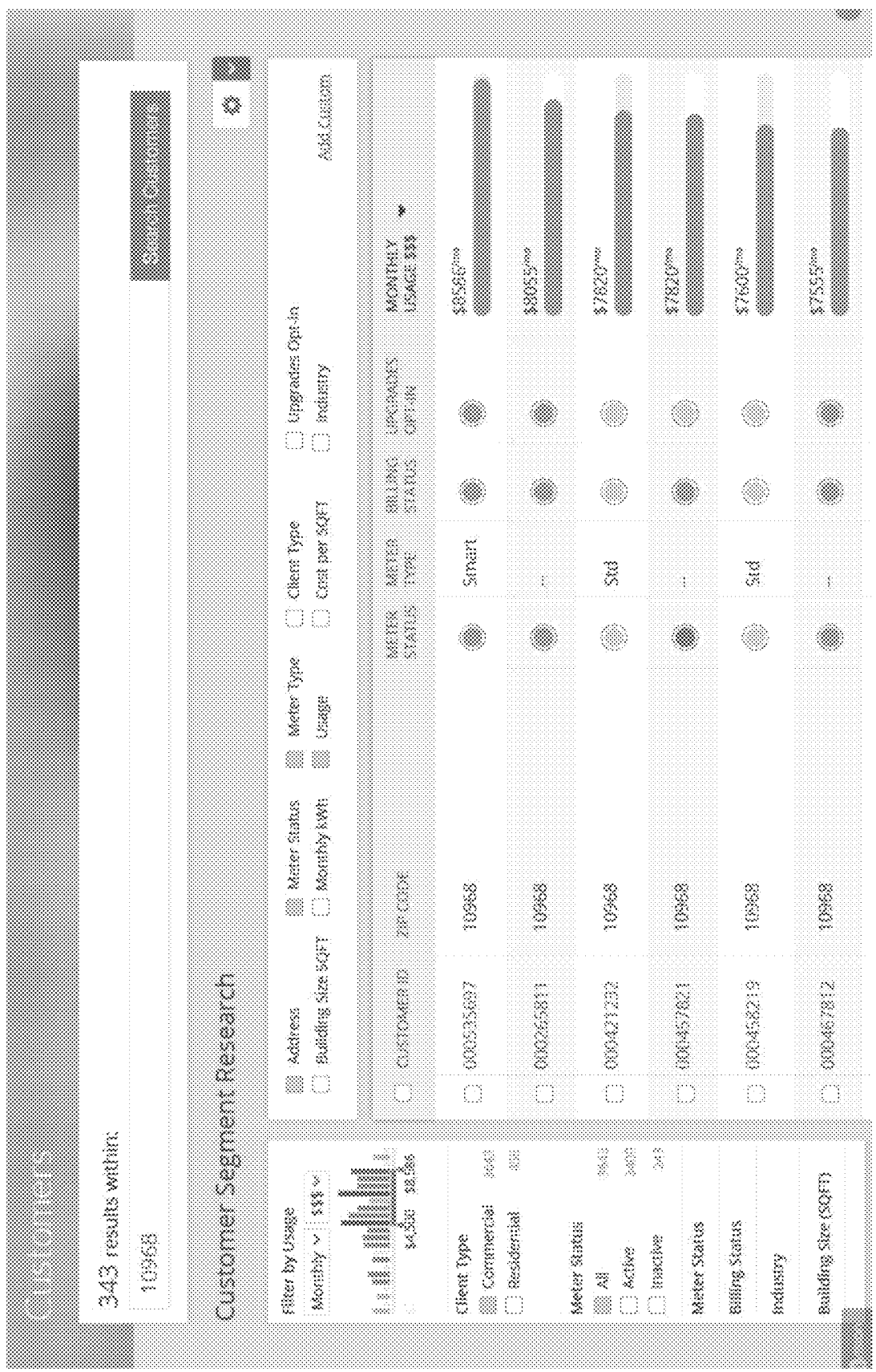
FIG. 30 is a screenshot of a vendor/aggregator view interface displaying customer segment research for vendors/aggregators.
Figure 31:
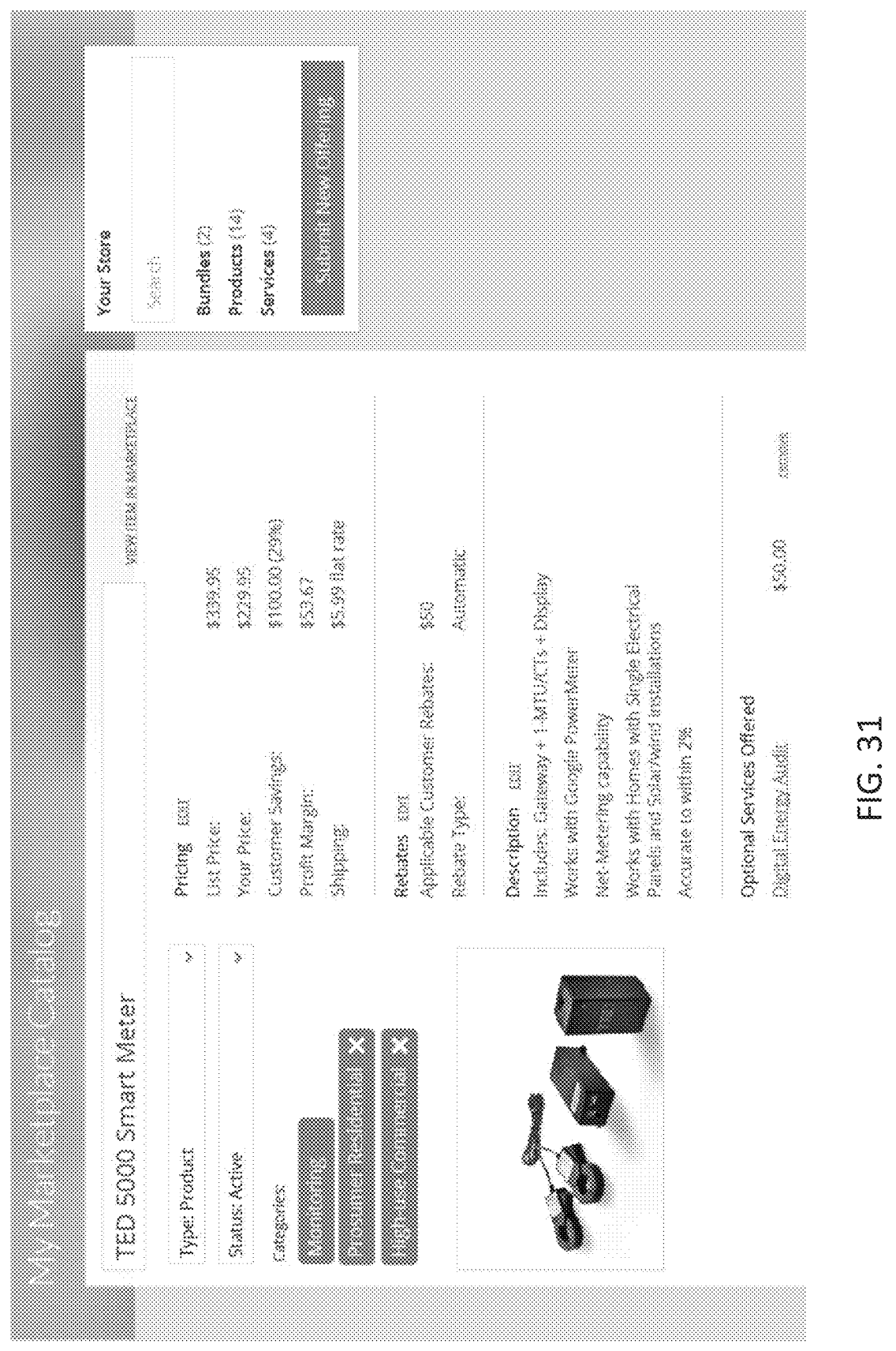

FIGS. 29-31 are screenshots of a vendor/aggregator view interface. Vendors can see their portfolio and prospect for new sales via the vendor/aggregator view interface. FIG. 29 lists top customer segments, top sellers in the marketplace, top campaigns in the marketplace, and pre-approved production zones. FIG. 30 displays customer segment research for vendors/aggregators. The platform is operable to allow a vendor user from level 3 (L3) to search customers based on key words, for example, zip code. The system also presents vendors with GUIs or views customers using relevant information such as address, meter status (e.g., active, inactive), meter type, client type (commercial or residential), billing status, upgrades opt-in, building size, monthly cost, monthly energy consumption, cost per square foot, industry type, etc. FIG. 31 displays submission of a device for catalog content review. Vendors/aggregators can edit information regarding pricing, rebates, and descriptions for a certain type of device, and provide information regarding optional services offered.

Marketplace View Interface

Figure 32:
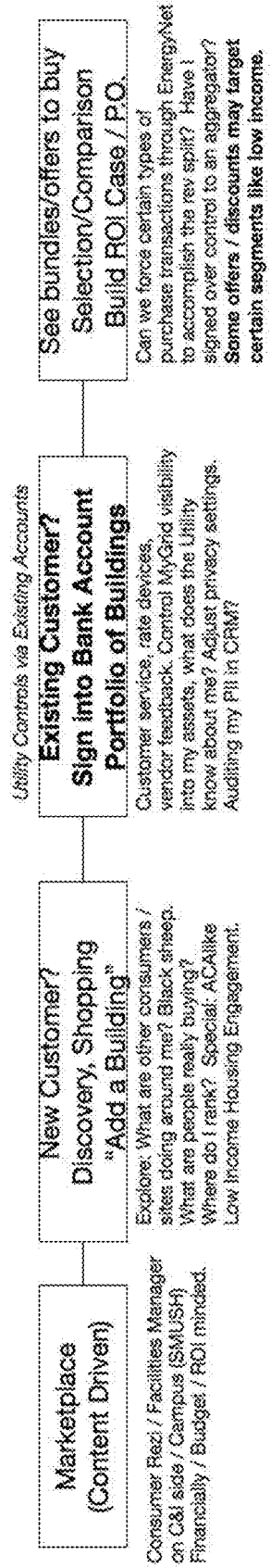
FIG. 32 is a block diagram for the functions of a marketplace view interface provided by an EnergyNet data platform.

FIG. 32 is a block diagram for the functions of a marketplace view interface. The marketplace view interface enables new customers to discover what other customers are doing in the market, and enables existing customers to manage their portfolios on the market and see bundles and offers for transaction.

Figure 33:
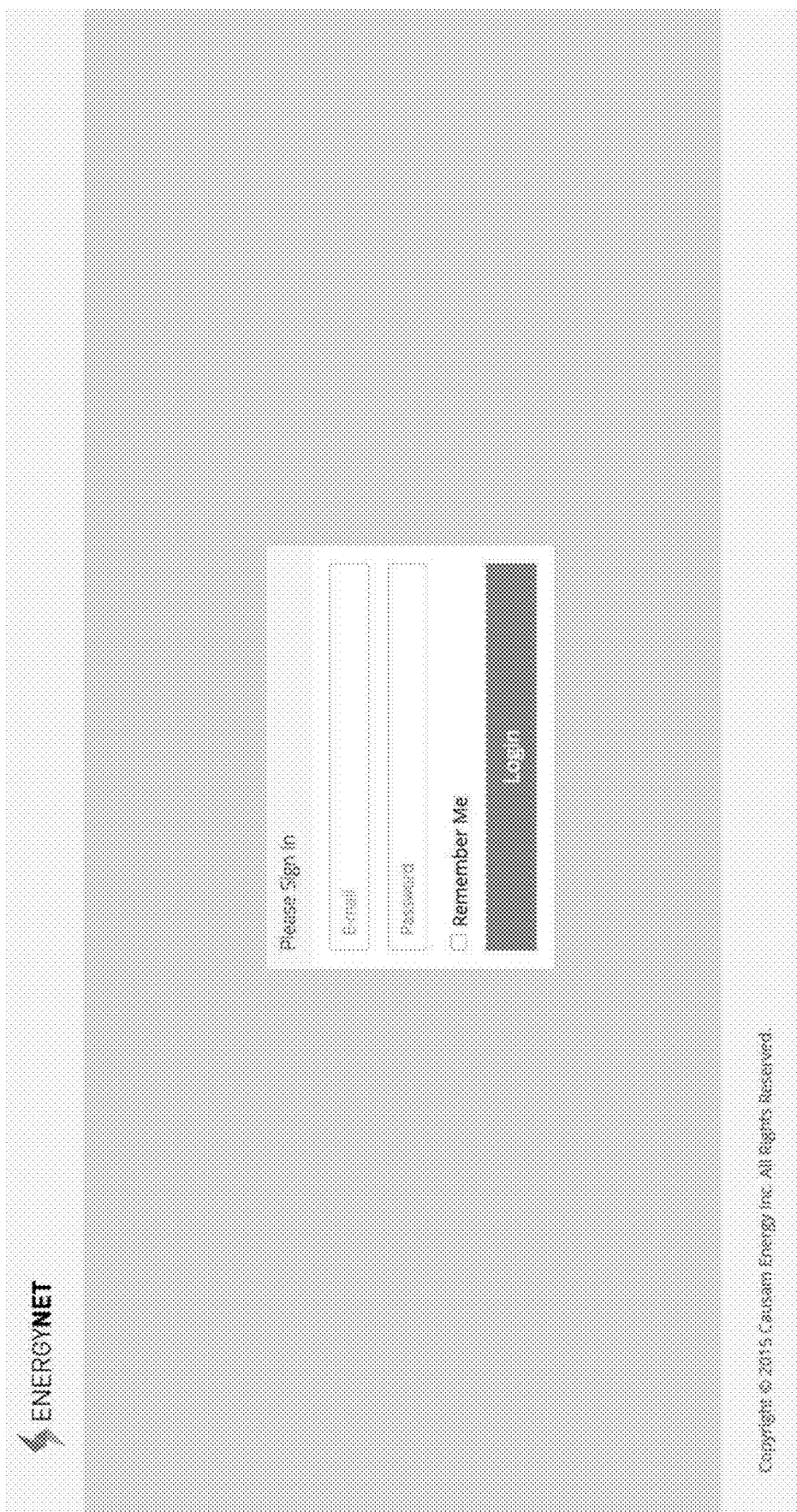
FIG. 33 is a screenshot of the log in screen for a marketplace view interface.
Figure 34:
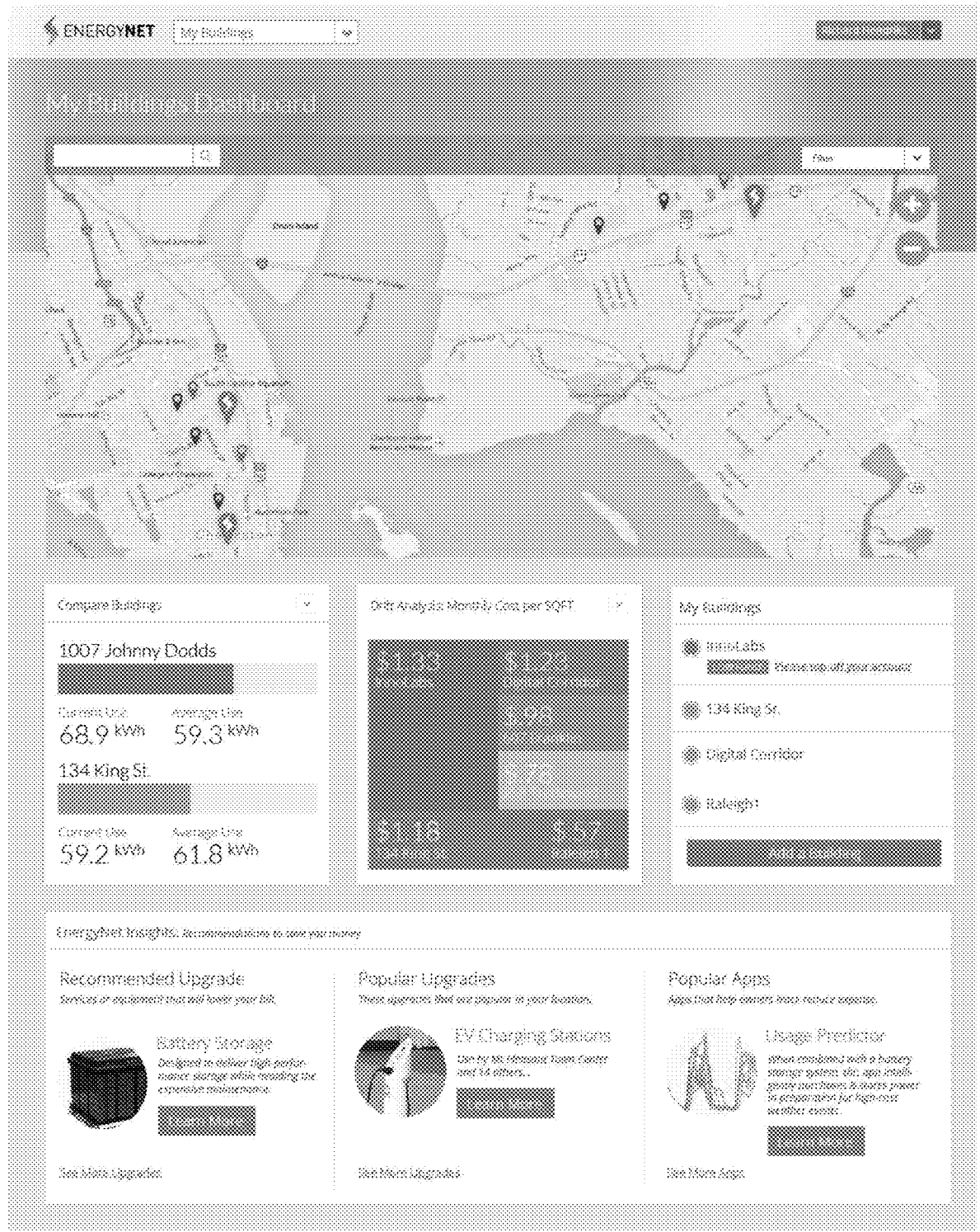
FIG. 34 is a screenshot of a marketplace view interface displaying a customer's buildings on a map and information related to energy usage at the buildings.
Figure 35:
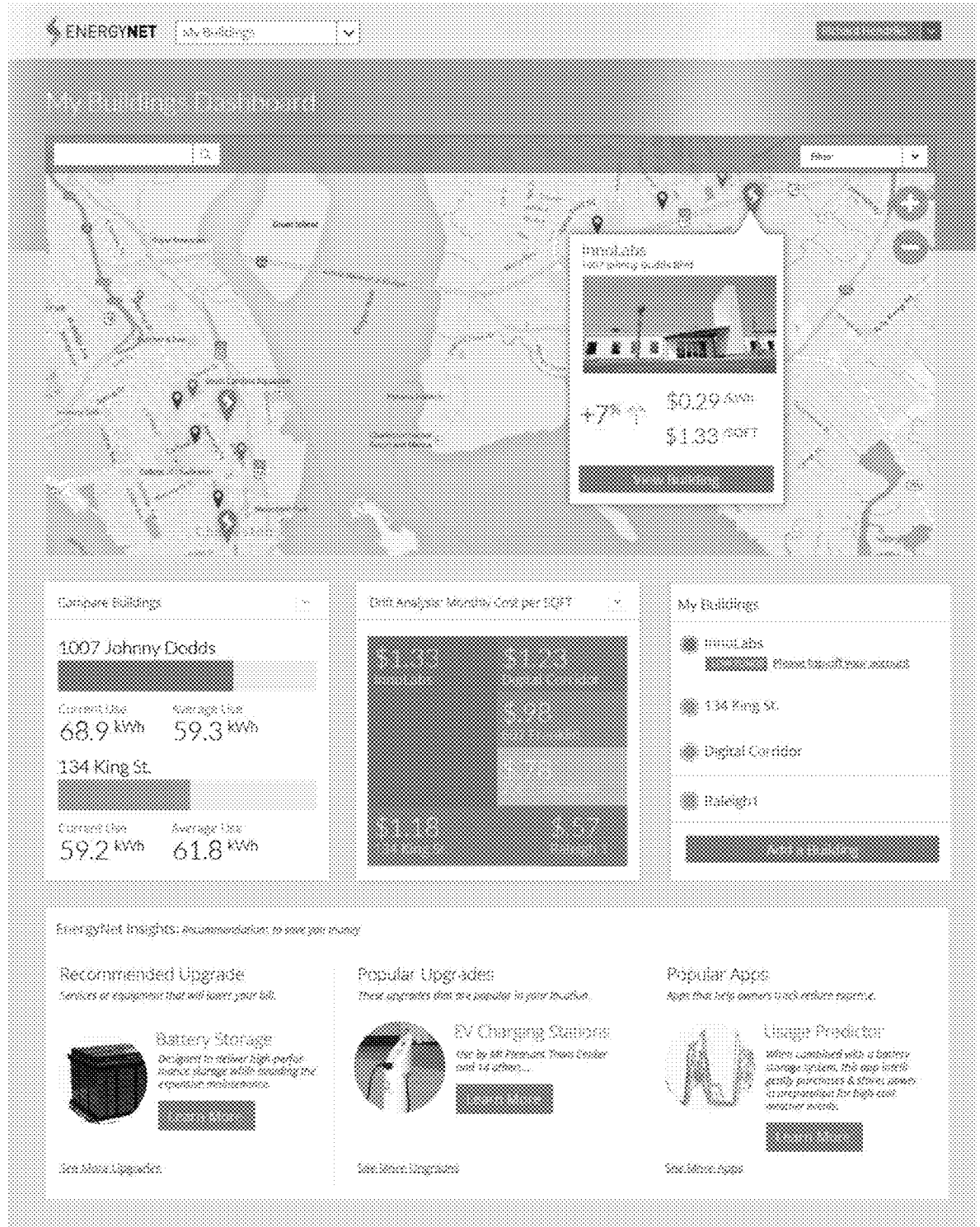
FIG. 35 continues to illustrate the marketplace view interface of FIG. 34 with an overlay providing information about a specific building.
Figure 36:
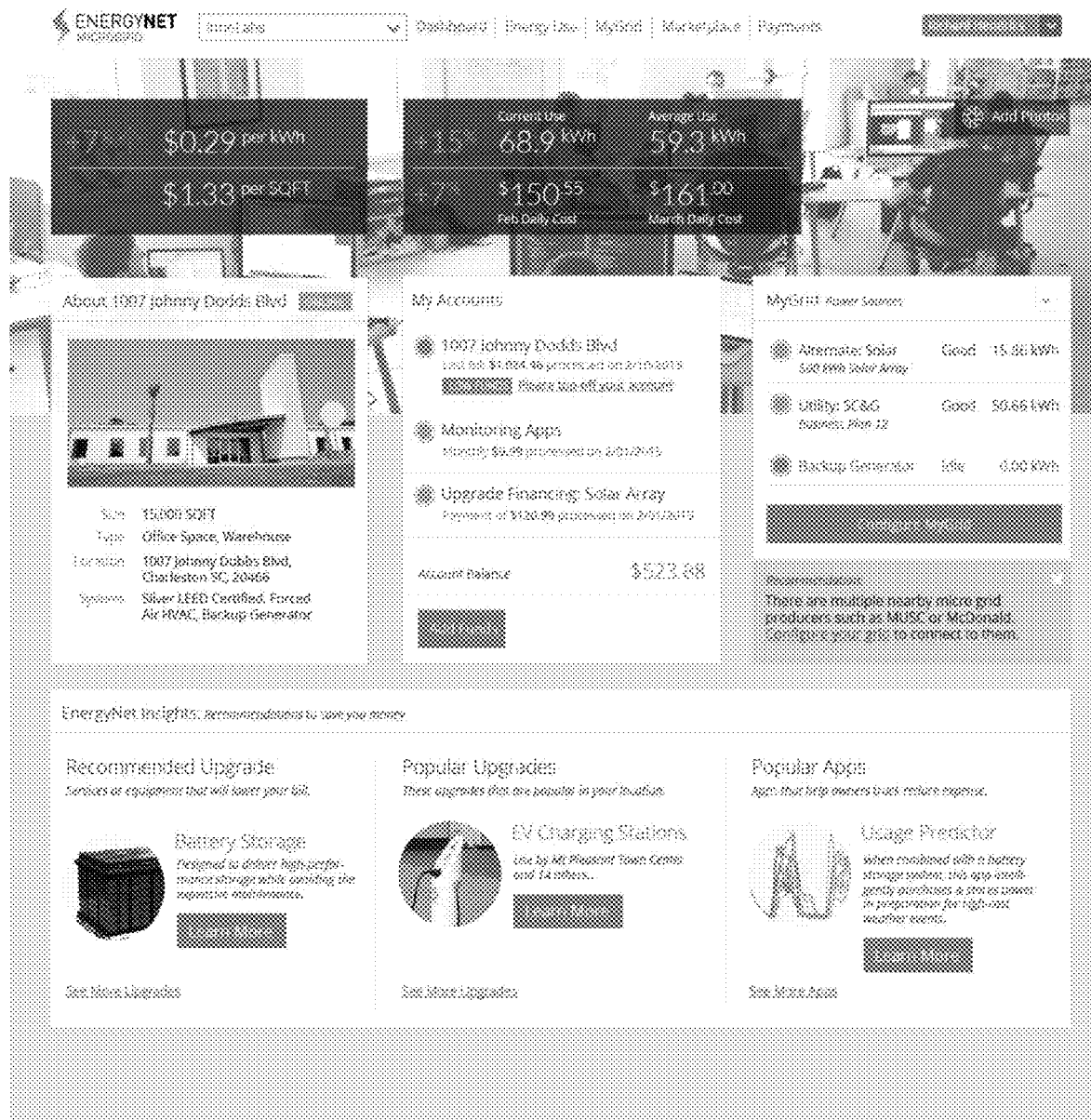
FIG. 36 is a screenshot of a marketplace view interface displaying the description, energy rate, current/average usage, and daily cost for a site.

FIGS. 33-50 are screenshots of a marketplace view interface. The marketplace view interface enables commercial, industrial, and residential participants, such as homeowners or facility managers, to see their energy information, shop for new products or services in the marketplace on the EnergyNet platform, and manage rate plans. FIG. 33 is a screenshot of the log in screen for a marketplace view interface. FIGS. 34-36 display various functions under the "Dashboard" tab in the marketplace view interface. FIG. 34 displays a customer's buildings on a map and information related to energy usage at the buildings. The interface provides a list of all buildings owned or managed by the customer, the monthly cost per square foot for each building, and allows the customer to compare buildings. FIG. 35 continues to illustrate the marketplace view interface of FIG. 34 with an overlay providing information about a specific building. The overlay lists the price per square foot and energy rate for the building. FIG. 36 displays the description, energy rate, current/average usage, and daily cost for a site. The power sources for the site are listed (e.g., utility, solar, backup generator), and a summary of the account balance is shown. Additionally, a recommendation to configure the site's grid to connect to nearby microgrid producers is displayed.

Figure 37:
FIG. 37 is a screenshot of a marketplace view interface displaying current energy usage.
Figure 38:
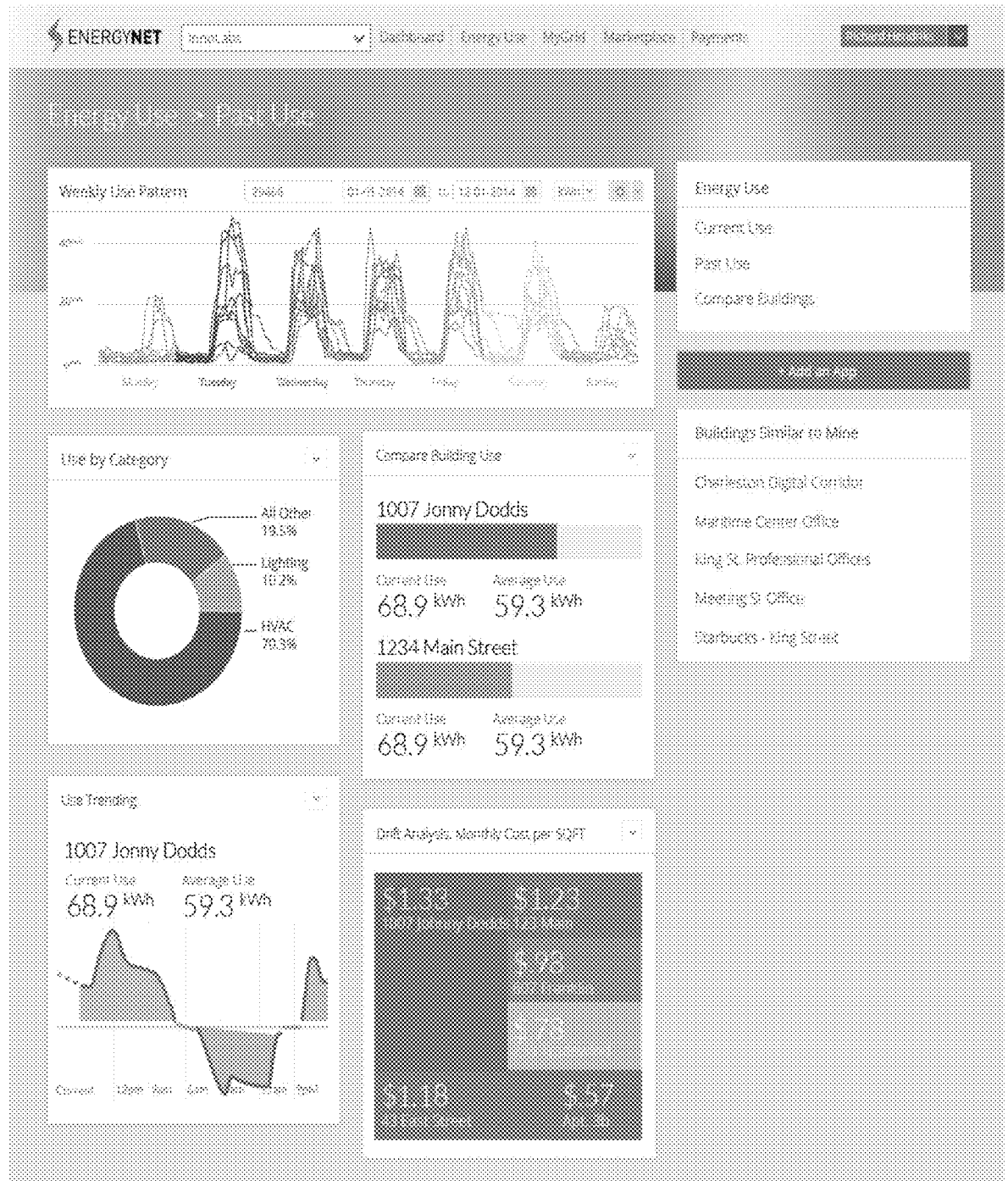
FIG. 38 is a screenshot of a marketplace view interface displaying past energy usage.
Figure 39:
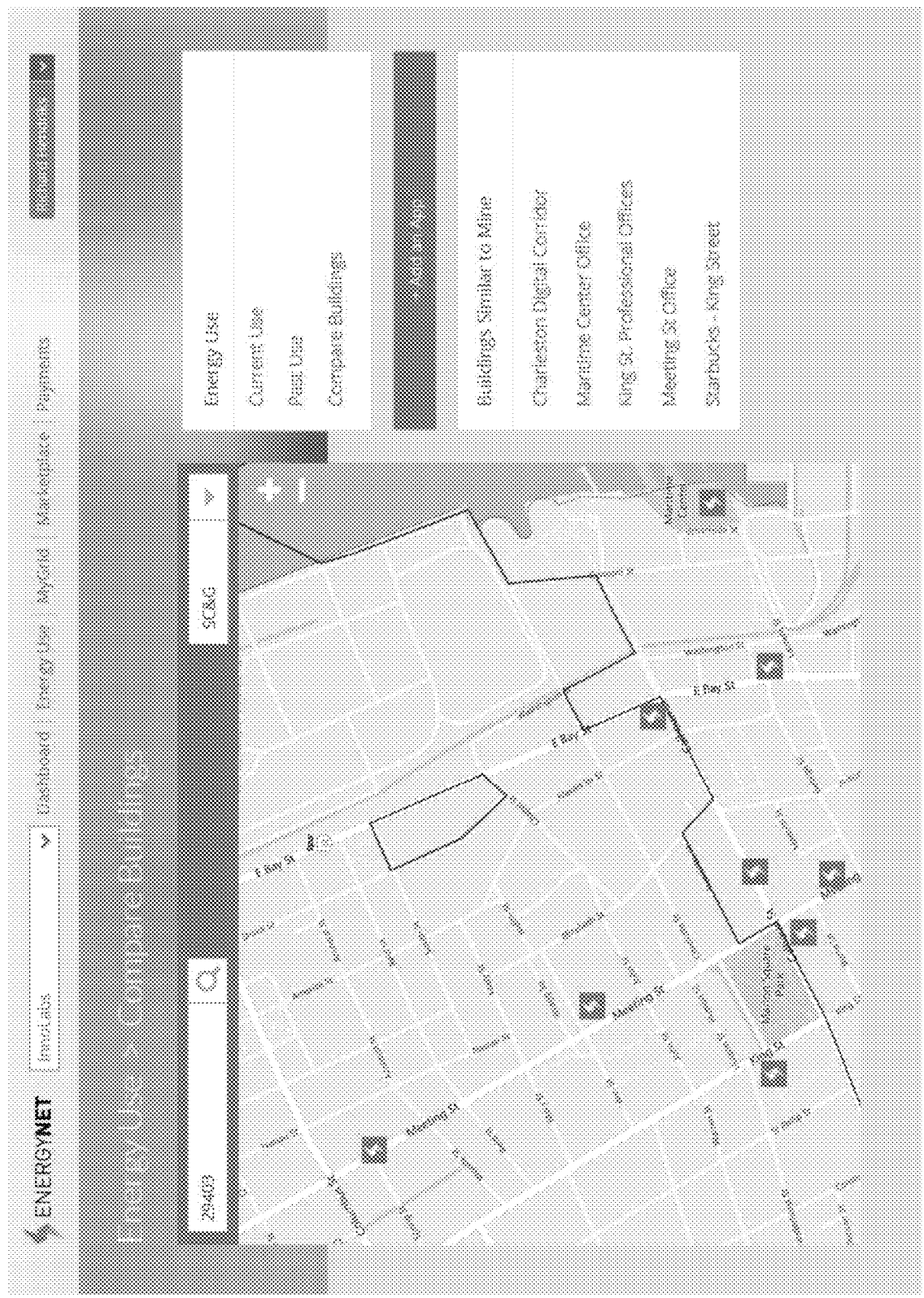
FIG. 39 is a screenshot of a marketplace view interface allowing users to compare the energy use of different buildings.
Figure 40:
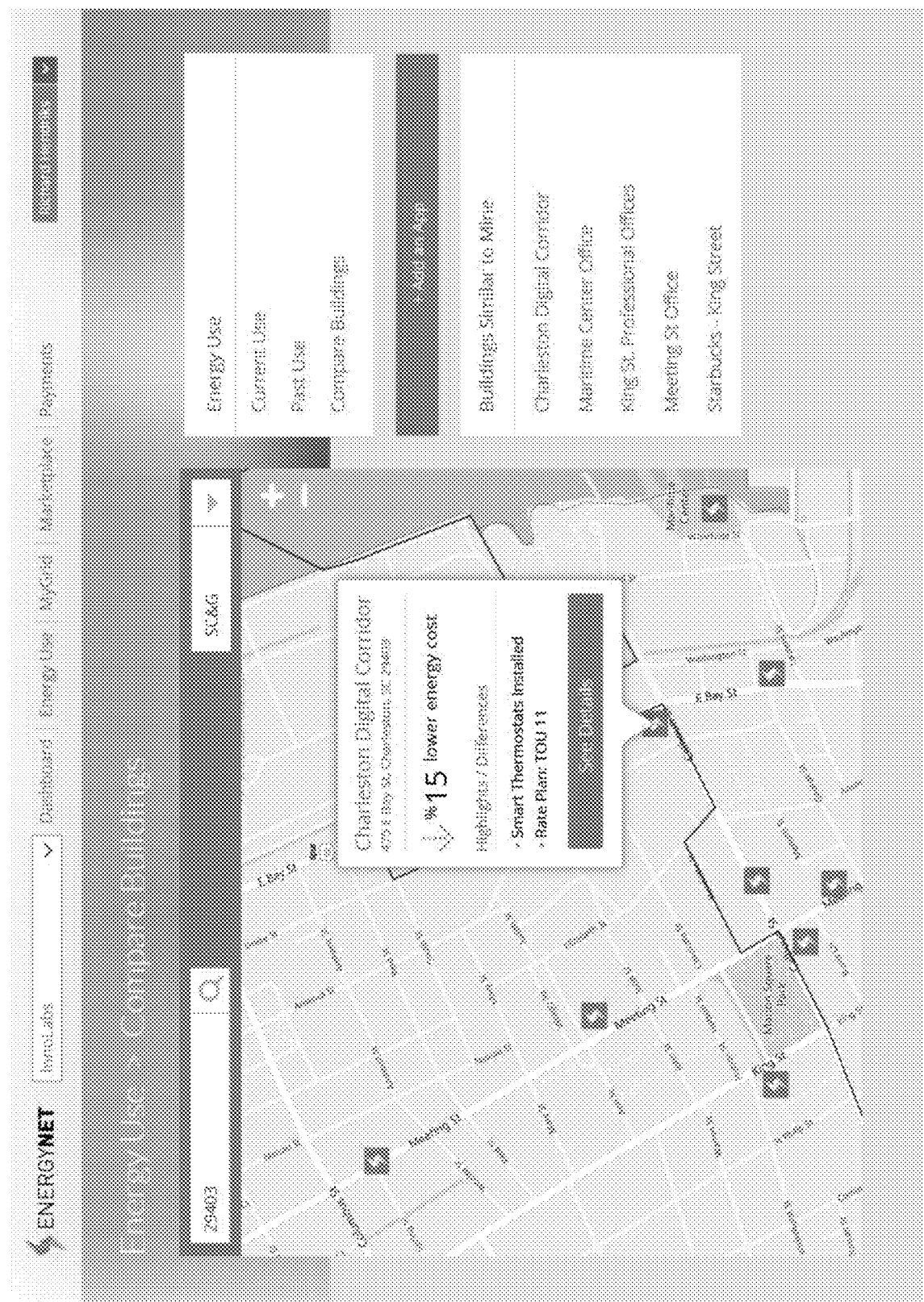
FIG. 40 continues to illustrate the marketplace view interface of FIG. 39 with an overlay showing a brief description of a selected building.
Figure 42:
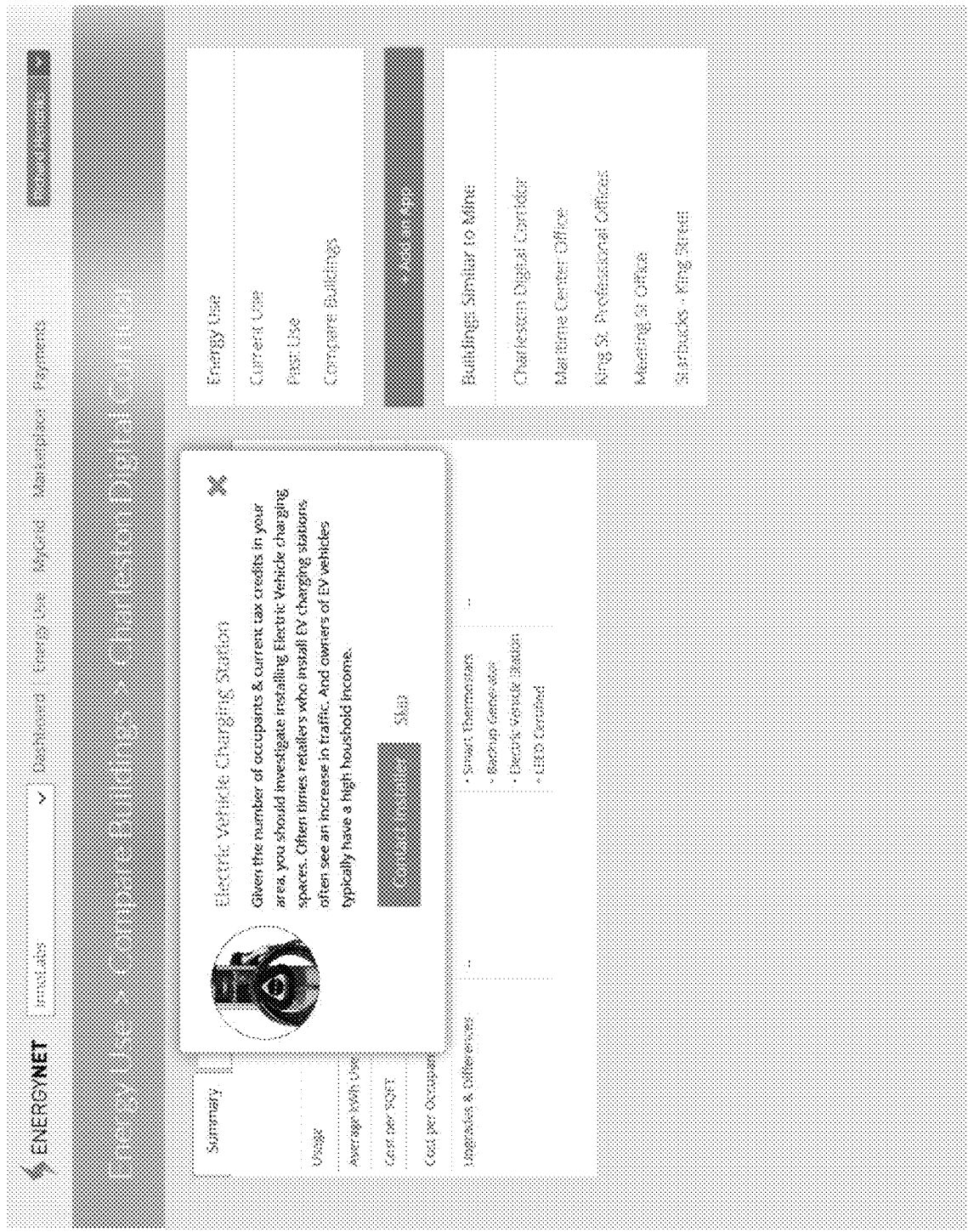
FIG. 42 continues to illustrate the marketplace view interface of FIG. 41 with an overlay showing a recommendation to install an electric vehicle charging station.

FIGS. 37-42 display various functions under the "Energy Use" tab in the marketplace view interface. FIG. 37 displays current energy usage, including a real-time power usage chart, average daily power usage, peak daily power usage, peak monthly power usage, cumulative daily energy use, average daily energy usage, 30 day energy usage, and 30 day reactive energy usage. FIG. 38 displays past energy usage, including weekly use pattern, use by category, use trending, building use comparison, and drift analysis. FIG. 39 is a screenshot of a marketplace view interface allowing users to compare the energy use of different buildings. FIG. 40 continues to illustrate the marketplace view interface of FIG. 39 with an overlay showing a brief description of a selected building. FIG. 41 shows a usage and cost comparison between two buildings. The interface also allows the user to compare the energy use of a specific building to the regional average. FIG. 42 continues to illustrate the marketplace view interface of FIG. 41 with an overlay showing a recommendation to install an electric vehicle (EV) charging station.

Figure 43:
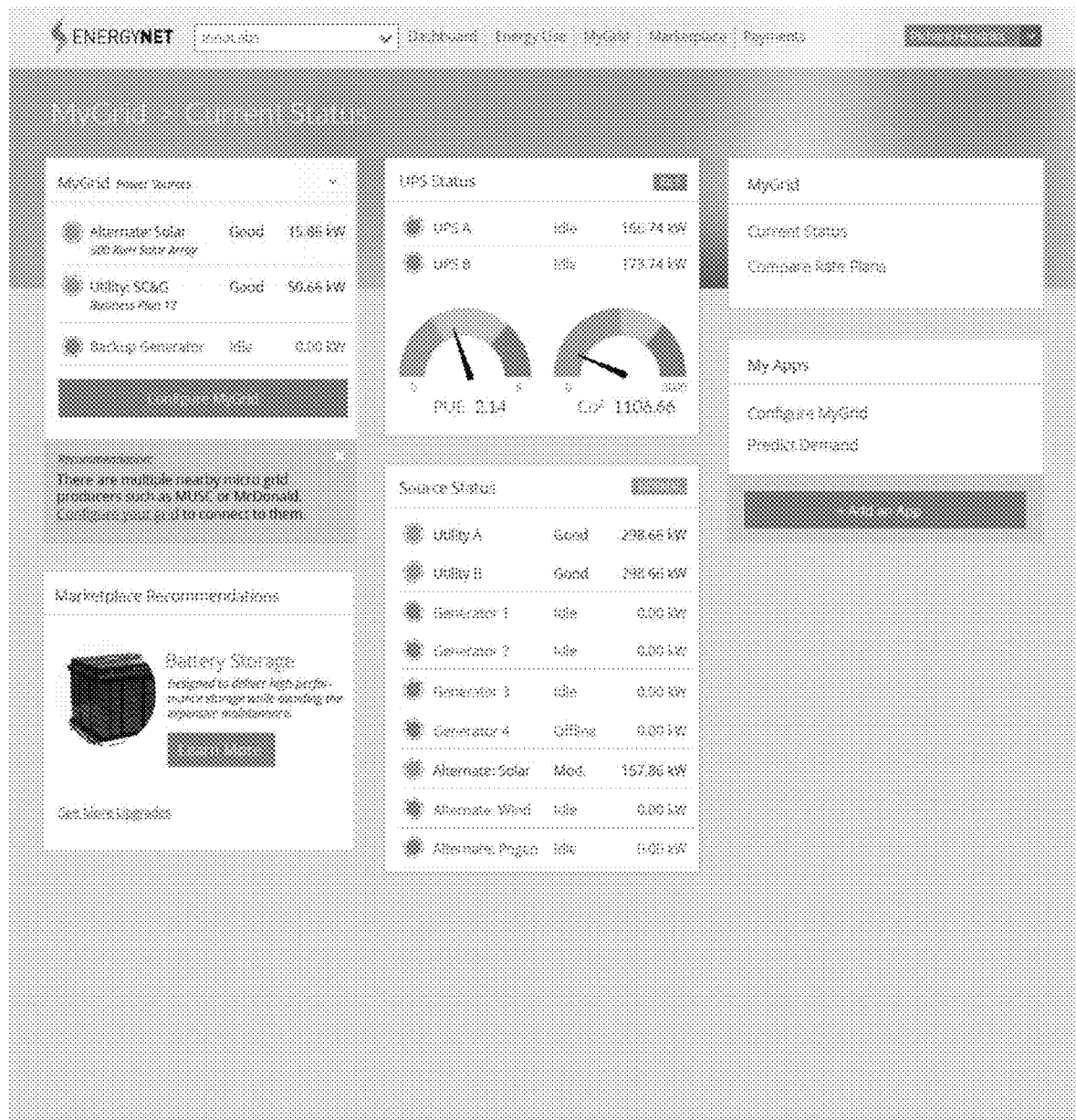
FIG. 43 is a screenshot of a marketplace view interface showing the current status of a customer's grid.

FIG. 43 displays the current status of a customer's grid. Power sources (e.g., solar, utility, backup generator) are listed with real-time and/or near-real-time status and power level, and real-time and/or near-real-time UPS status and power levels are displayed. Graphic representations of power usage efficiency (PUE) and carbon dioxide emissions are shown. A table showing source status, including the source name, status, and power level, is displayed. Additionally, a recommendation to configure the site's grid to connect to nearby microgrid producers is displayed, as well as a recommendation to purchase an upgraded battery storage device.

Figure 44:
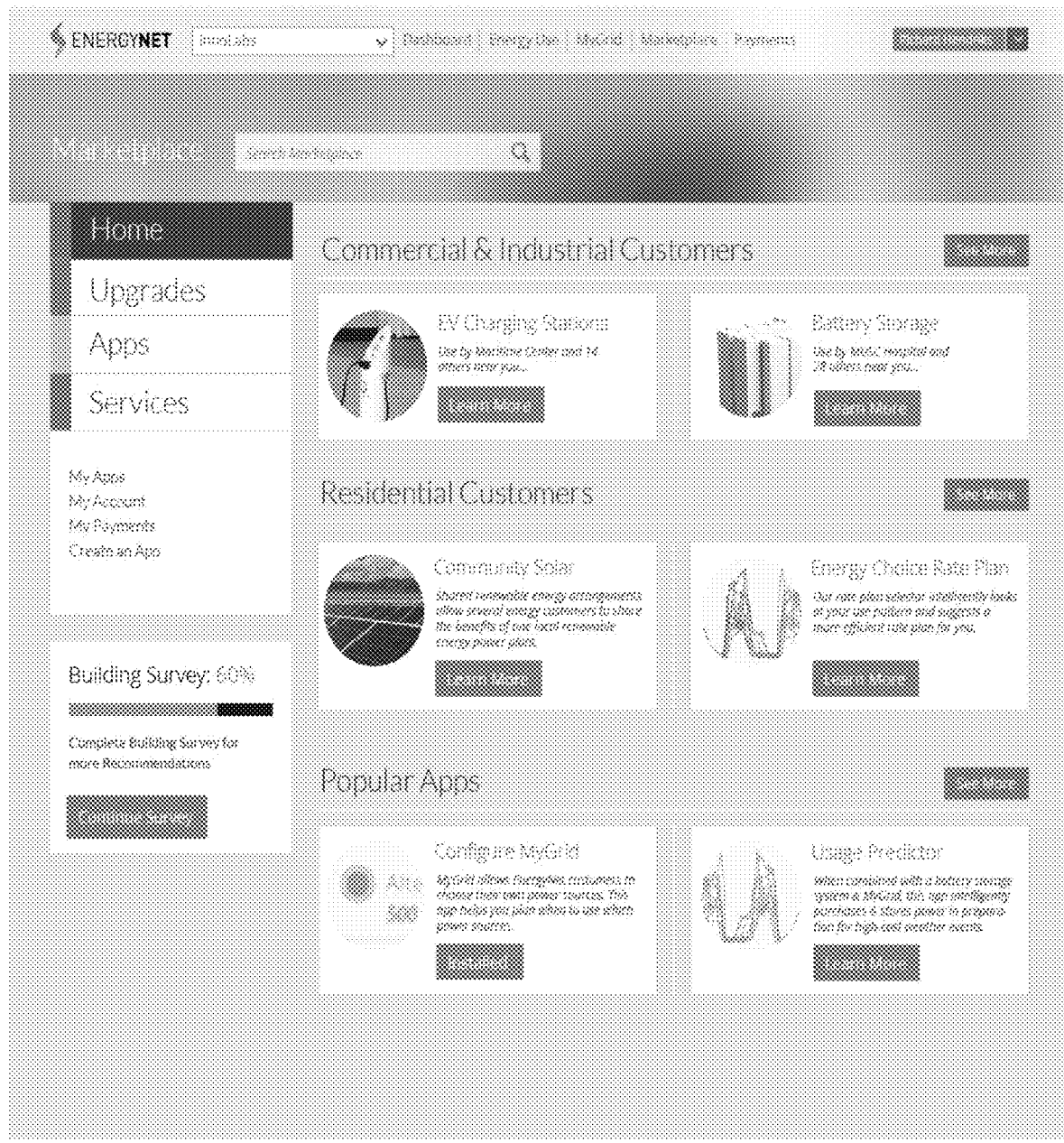
FIG. 44 is a screenshot of the home page of the marketplace for commercial and industrial customers, residential customers, and popular apps.
Figure 45:
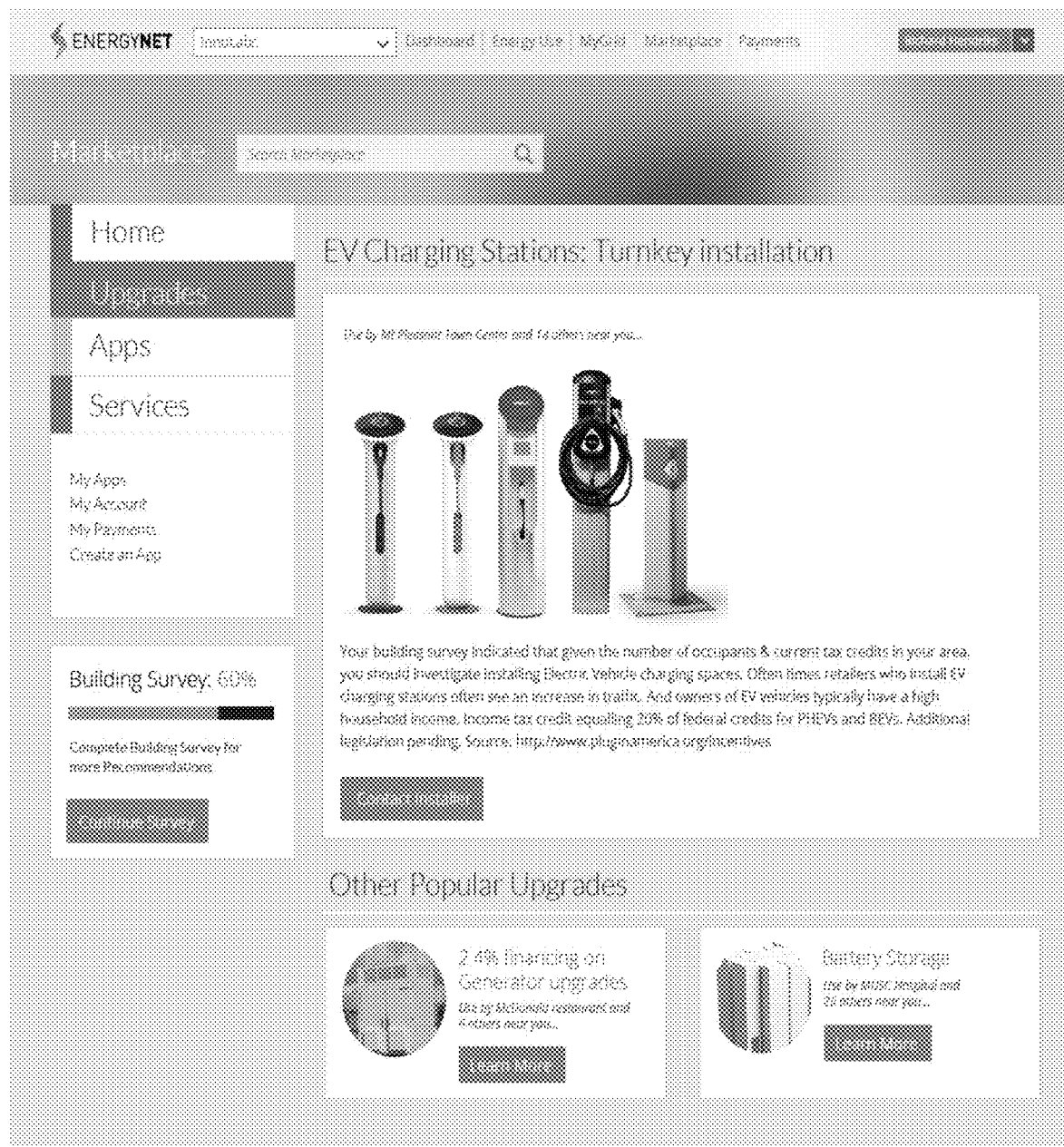
FIG. 45 is a screenshot showing upgrade options in a marketplace view interface.
Figure 46:
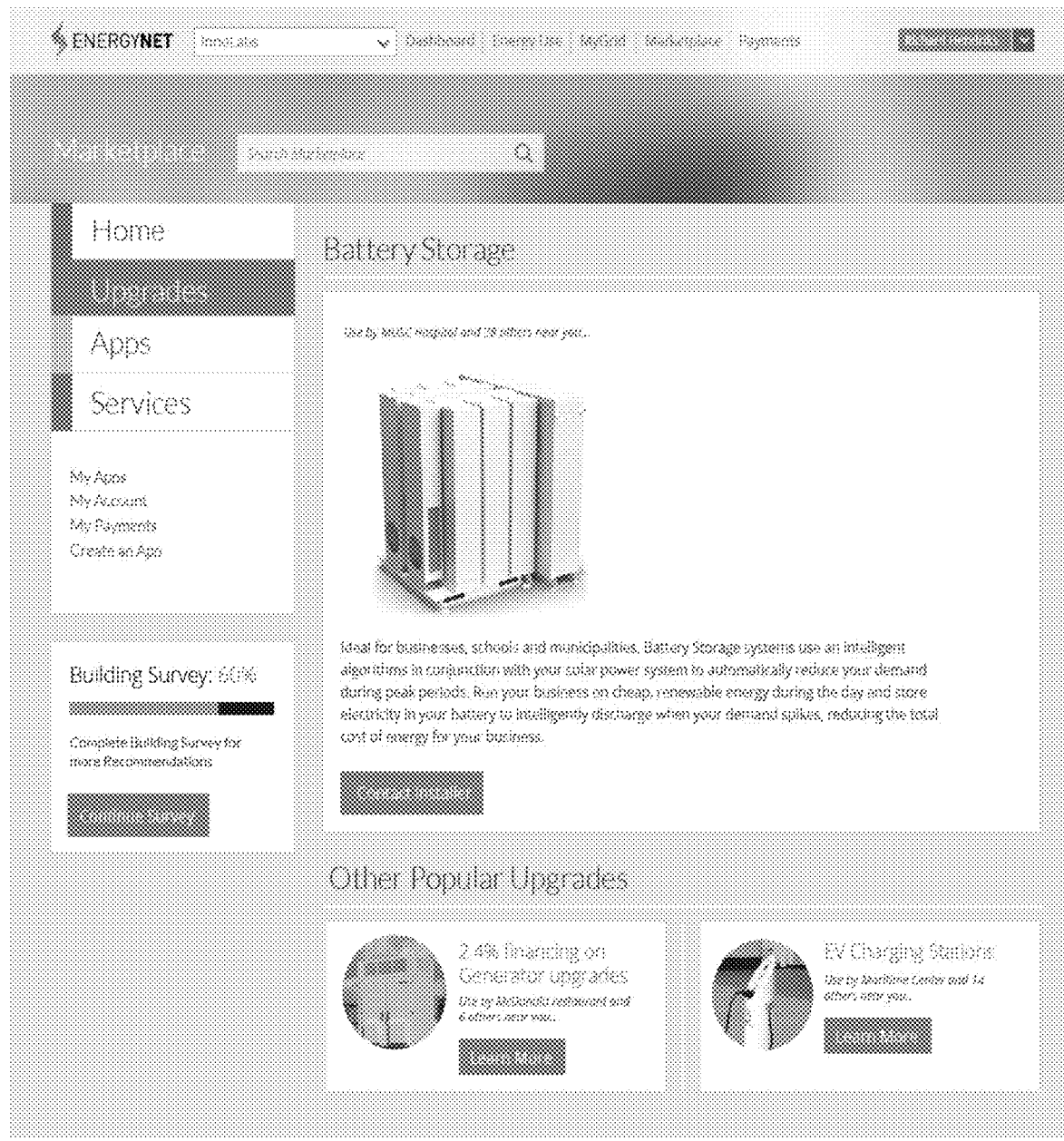
FIG. 46 is another screenshot showing upgrade options in a marketplace view interface.
Figure 47:
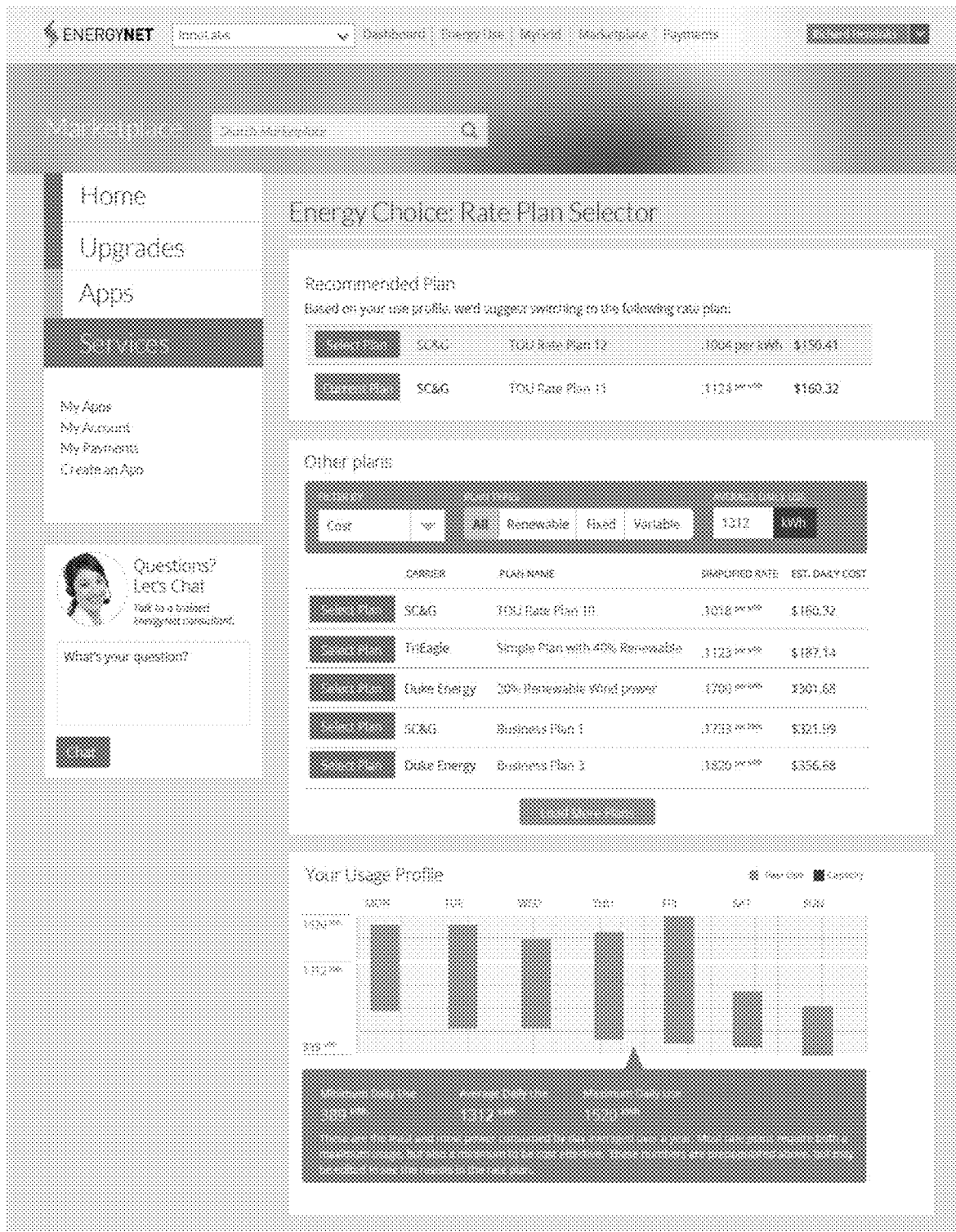
FIG. 47 is a screenshot showing a rate plan selector in a marketplace view interface.
Figure 48:
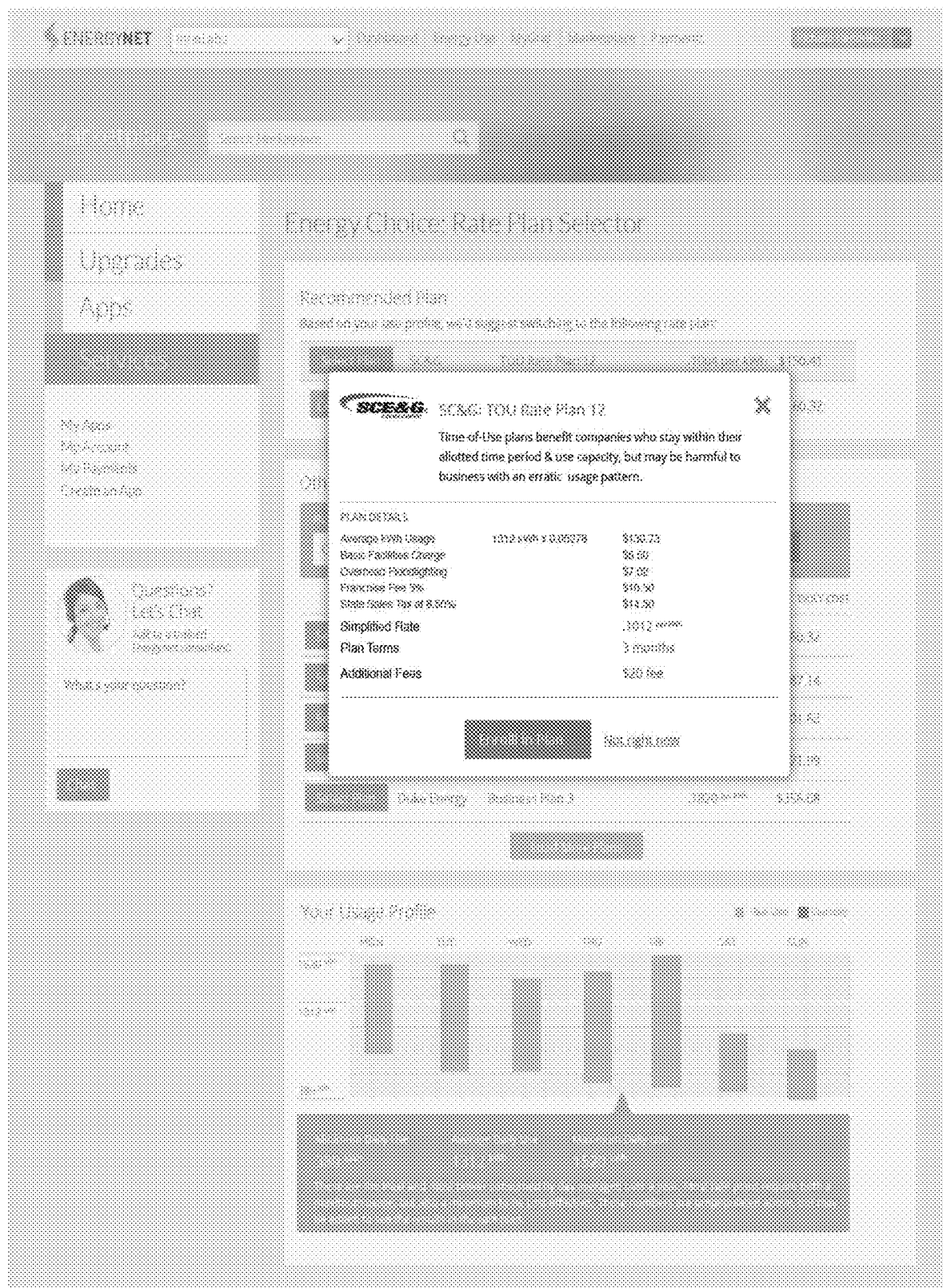
FIG. 48 continues to illustrate the marketplace view interface of FIG. 47 with an overlay showing a description of a selected plan.

FIGS. 44-49 display various functions under the "Marketplace" tab in the marketplace view interface. FIG. 44 is a screenshot of the home page of the marketplace for commercial and industrial customers, residential customers, and popular apps. The home page suggests completing a building survey for more recommendations. FIGS. 45 and 46 show upgrade options, including turnkey installation for EV charging stations, battery storage upgrades, and low interest financing on generator upgrades. FIG. 47 shows a Rate Plan Selector as one of the services provided by the marketplace. Recommended plans are listed based on the user profile. Other plans are also listed and users may filter the listed plans by information such as cost or plan type (e.g., all, renewable, fixed, variable). A user may select a plan by clicking the "Select Plan" button next to the plan. FIG. 48 continues to illustrate the marketplace view interface of FIG. 47 with an overlay showing a description of the selected plan, including the simplified rate, plan terms, and additional fees. If the user decides to select the plan, they can do so by clicking "Enroll in Plan." FIG. 49 displays other services provided by the marketplace, for example, community solar installation, heating and air conditioning inspection and tune-up, and a leasing program for residential battery storage.

FIG. 50 displays the payment dashboard in the marketplace view interface. Payment status, marketplace recommendations, and a billing summary are provided. The billing summary includes weekly history, energy usage, rate, change, and total for the rate plan. Users can also add funds to the account through the payment dashboard.

Financial Settlement View Interface

Figure 51:
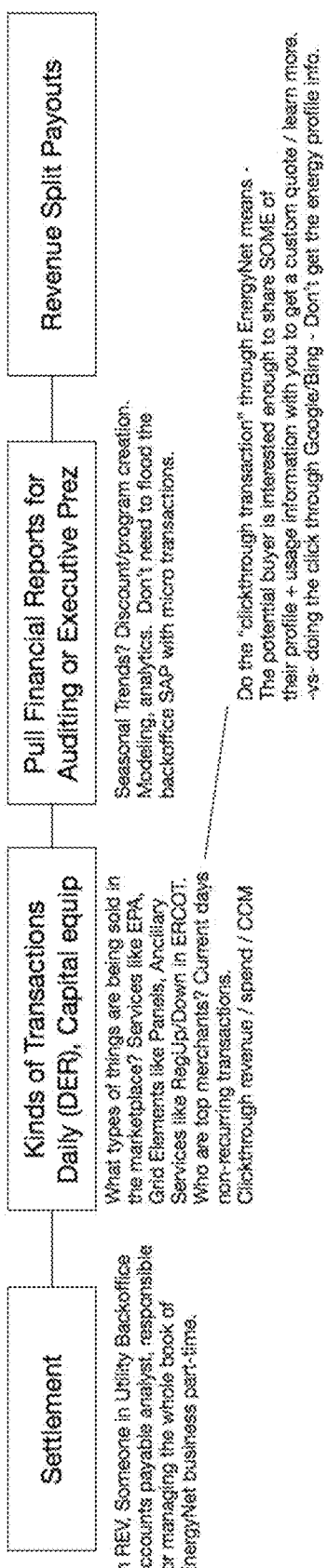
FIG. 51 is a block diagram for the functions of a financial settlement view interface provided by an EnergyNet data platform.

FIG. 51 is a block diagram for the functions of a financial settlement view interface provided by an EnergyNet data platform. The financial settlement view interface provides information regarding settlements, transactions, and revenue split payouts, as well as financial reports. The financial settlement view interface also enables utility back office staff to see a view of revenue streams from the EnergyNet platform to the utility. The supplied energy and consumed energy are also reconciled and provided in similar views such as a general ledger format. A blockchain view may also be provided, wherein a list of nodes is provided that show the number of transactions that are being published through the nodes, which allows users to view their node and status of transactions through the node.

Figure 52:
FIG. 52 is a screenshot of a financial settlement view interface showing the settlements dashboard.
Figure 53:
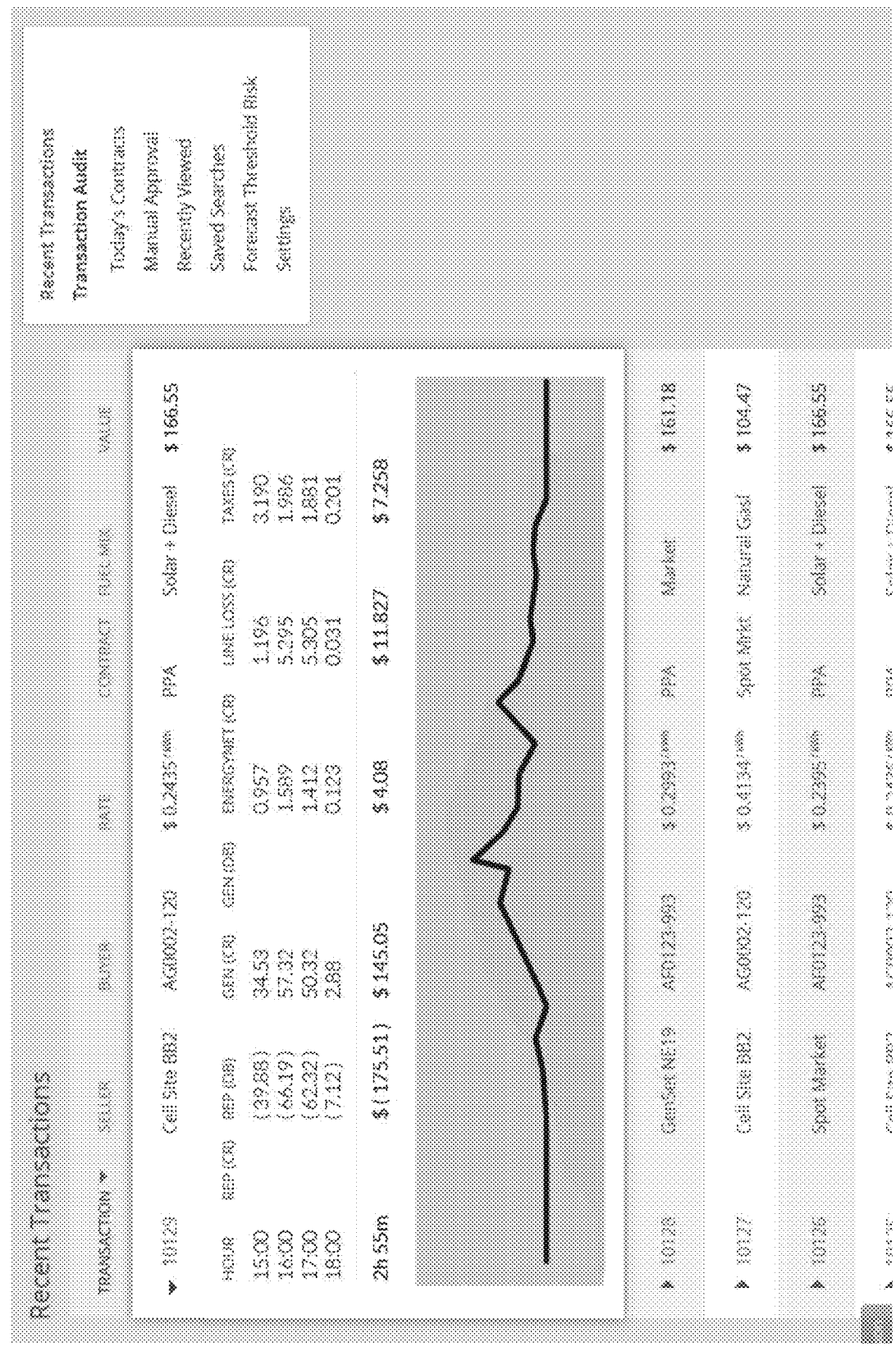
FIG. 53 is a screenshot of a financial settlement view interface showing recent transactions.

FIGS. 52-53 are screenshots of a financial settlement view interface. FIG. 52 displays the settlements dashboard of the financial settlement view interface. The financial settlement view interface is operable to show different transaction types (e.g., energy production, grid elements, services, application programs) performed by the EnergyNet platform and the percentage of financial settlements within the EnergyNet platform for each transaction type. The production transaction type includes settlements between energy consumers and energy providers. The grid elements transaction type includes solar panels and backup generators. The services transaction type includes Environmental Protection Agency (EPA) service, financing, installation, and ancillary services. An example of an ancillary service is regulation down/regulation up in Electric Reliability Council of Texas (ERCOT). The Apps transaction type includes the building monitoring app and other apps. The financial settlement view interface also displays marketplace campaign information, including annual profit potential, and digital contracting status for different sites. A table of recent production settlements, including transaction number, energy rate, and settlement amount (value), is also shown. FIG. 53 displays recent transactions within the financial settlement view interface. Detailed information for each transaction number is provided, including seller, buyer, rate, contract type, fuel mix, and value.

Tiers or Levels within the EnergyNet Platform

One embodiment of the present invention is a system of an advanced energy network, comprising a platform communicatively connected to at least one distributed computing device operable for providing inputs from at least one energy user, wherein the platform is operable to: create a user profile for the at least one energy user; collect energy usage data for the at least one energy user; associate the energy usage data with the user profile corresponding to the at least one energy user; aggregate the energy usage data; estimate projected energy usage for the at least one energy user; predict energy consumption data based on the energy usage data and the projected energy usage data; and store the energy usage data, the projected energy usage data, and the predicted energy consumption data in a database. In Level 0 (L0) of the present invention, the user or consumer is engaged in the platform by providing verified information on actual energy usage to the platform. In Level 1 (L1) of the present invention, the user may provide additional information to the system and/or additional information may be gathered from public sources. In Level 2 (L2) of the present invention, the user may add grid elements to their user profile. In Level 3 (L3) of present invention, the utility, grid element vendors, meter data aggregators, etc. may identify sales opportunities based on data in the database and provide marketing for products and/or service offerings to consumers (consumer users) or commercial users with profiles within the EnergyNet platform. In Level 4 (L4) of the present invention grid elements operable for providing electric power supply (by way of example and not limitation, solar power generation, fuel cell or battery power storage devices, wind generation, back-up power generators, etc.) that are properly constructed and configured, modeled, and connected with revenue grade metrology acceptable for energy settlement and market-based financial settlement within the energy market, are introduced after being registered and profile created within the EnergyNet platform.

In one embodiment, for level 0 (L0) the actual energy usage data documented within a utility bill is uploaded to the platform by an energy user having a profile or creating a profile on the EnergyNet platform. The actual energy usage data is uploaded and communicated over at least one network to at least one computer or server associated with the platform, which automatically recognizes the format of the utility bill based upon prior utility bill(s) uploaded by at least one user. For example, if a first user uploads a utility bill to the platform and selects the relevant information from the utility bill, the platform may automatically recognize the format of utility bills for subsequent users who have the same service provider. Also or alternatively, the energy user inputs indication of which data to capture from the utility bill for automatic association with that user's profile. The system also provides options for the energy user to selectively redact information on the utility bill, such as customer name, account number, and PIN number. The platform may automatically populate the database based on the data on actual energy usage in the utility bill. The platform is further operable to collect at least one of real-time or near real-time data from grid elements and data from smart meters associated with the at least one user.

Figure 54B:
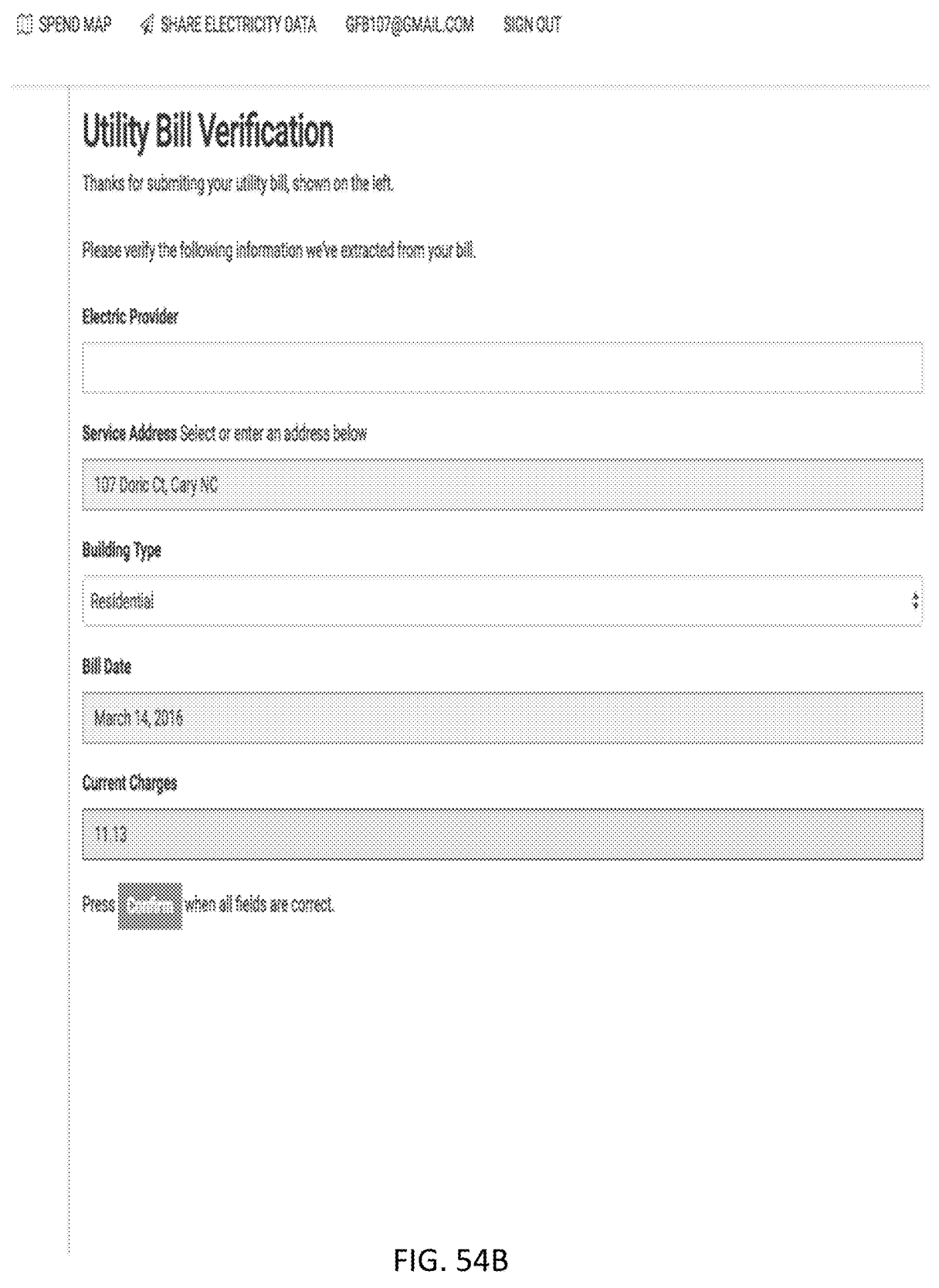
Figure 55A:

FIG. 54A and FIG. 54B are screenshots of a utility bill verification for an electric bill. The utility bill is shown on the left side of the screen in FIG. 54A. The system extracts the relevant information from the utility bill, such as service address, bill date, and current charges for electricity from the bill as shown in FIG. 54B. The system allows users to select the relevant information to be extracted. In a preferred embodiment, the user can adjust the selection overlays with matching colors on the bill by dragging the overlays or their corners as needed. If the information is still incorrect after adjusting the selection overlays, the user can modify the values in the fields themselves. When all fields are correct, the user can verify the values in the fields by pressing the confirm button as shown in FIG. 54B. If the system recognizes the format of the utility bill, it automatically populates the fields in FIG. 54B with the name of the electric provider, service address, building type, bill date, and current charges. Information such as the customer name, account number, and PIN number may be redacted by the system and/or user inputs as shown in FIG. 54A. FIG. 55A and FIG. 55B are screenshots of a utility bill verification for an electric and gas bill. The utility bill is shown in FIG. 55A. The system populates the current charges field in FIG. 55B with the electric charges and does not include "Other Charges & Credits" in the value populated in the field.

The embodiments disclosed make use of the "user profiles" concept. The user profile includes, but is not limited to, the following: (1) energy user name; (2) service address; (3) electric provider; (4) building type; (5) historical and current bill dates; and (6) historical and current charges for electrical service. The user profile may further include information regarding geodetic location; meter ID; customer programs (possibly including program history); device information, including device type and manufacturer/brand; user energy consumption patterns; and connection and disconnection profile. The connection/disconnection profile can include service priority (i.e., elderly, police, etc.) and disconnection instructions.

In other embodiments, additional data called "variability factors" may be captured by the system as part of the user profile, including, but not limited to, the following: (1) outside temperature, (2) sunlight, (3) humidity, (4) wind speed and direction, (5) elevation above sea level, (6) orientation of the service point structure, (7) duty duration and percentage, (8) set point difference, (9) current and historic room temperature, (10) size of structure, (11) number of floors, (12) type of construction (brick, wood, siding etc.) (13) color of structure, (14) type of roofing material and color, (15) construction surface of structure (built on turf, clay, cement, asphalt etc.), (16) land use (urban, suburban, rural), (17) latitude/longitude, (18) relative position to jet stream, (19) quality of power to devices, (20) number of people living in and/or using structure, (21) age of structure, (22) type of heating, (23) lot description, (24) type of water, (25) other square footage, and (26) other environmental factors. Additional data that may be stored by the system include vacancy times, sleep times, and times in which control events are permitted. User profiles may also include whether a swimming pool is located at the service address.

In level 1 (L1) of the present invention, the user may provide additional information to the system and/or additional information may be gathered from public sources to further populate the user profile. Information regarding the plurality of variability factors may obtained from public sources. For example, information regarding weather (e.g., outside temperature, sunlight, humidity, wind speed and direction) may be obtained from publicly available weather services. Additionally, information regarding size of structure (e.g., square footage), number of floors or stories, type of roofing material, type of construction, age of structure, type of heat, etc. may be found on publicly available websites (e.g., county or state records, Zillow, and Trulia). Users may be given incentives to provide additional information for their user profile.

The user profile may further contain information regarding user preferences, wherein the user preferences comprise at least one of automatic uploading of utility bills, contact preferences, payment preferences, privacy preferences, renewability of energy sources, grid element preferences, rate plans, consumption, cost, locality, and market supply.

The platform uses information in the user profile to generate more accurate predictive consumption data. For example, if one energy user uploads a utility bill, that utility bill may be used to generate predictive consumption data for similar structures or similar geographic locations (e.g., houses in the same neighborhood). If additional energy users upload utility bills, the aggregated data from the utility bills may be used to generate more accurate predictive consumption data. With additional information, such as variability factors, the platform is able to increase the accuracy of the prediction. For example, a house with a pool and an electric vehicle would be expected to use more electricity than a house in the same neighborhood without a pool or electric vehicle. Additionally, a larger house or multi-story house would have a larger predictive energy consumption than a smaller house or single-story house in the same neighborhood. Also, typically older houses have lower energy efficiency, due to factors affecting energy consumption, e.g., older HVAC equipment that is less efficient than modern equipment, and/or factors affecting the leakage of conditioned air, e.g., less insulation, older windows and doors, etc. Variability factors may be added to the system by users or obtained from public sources of data.

Figure 56:
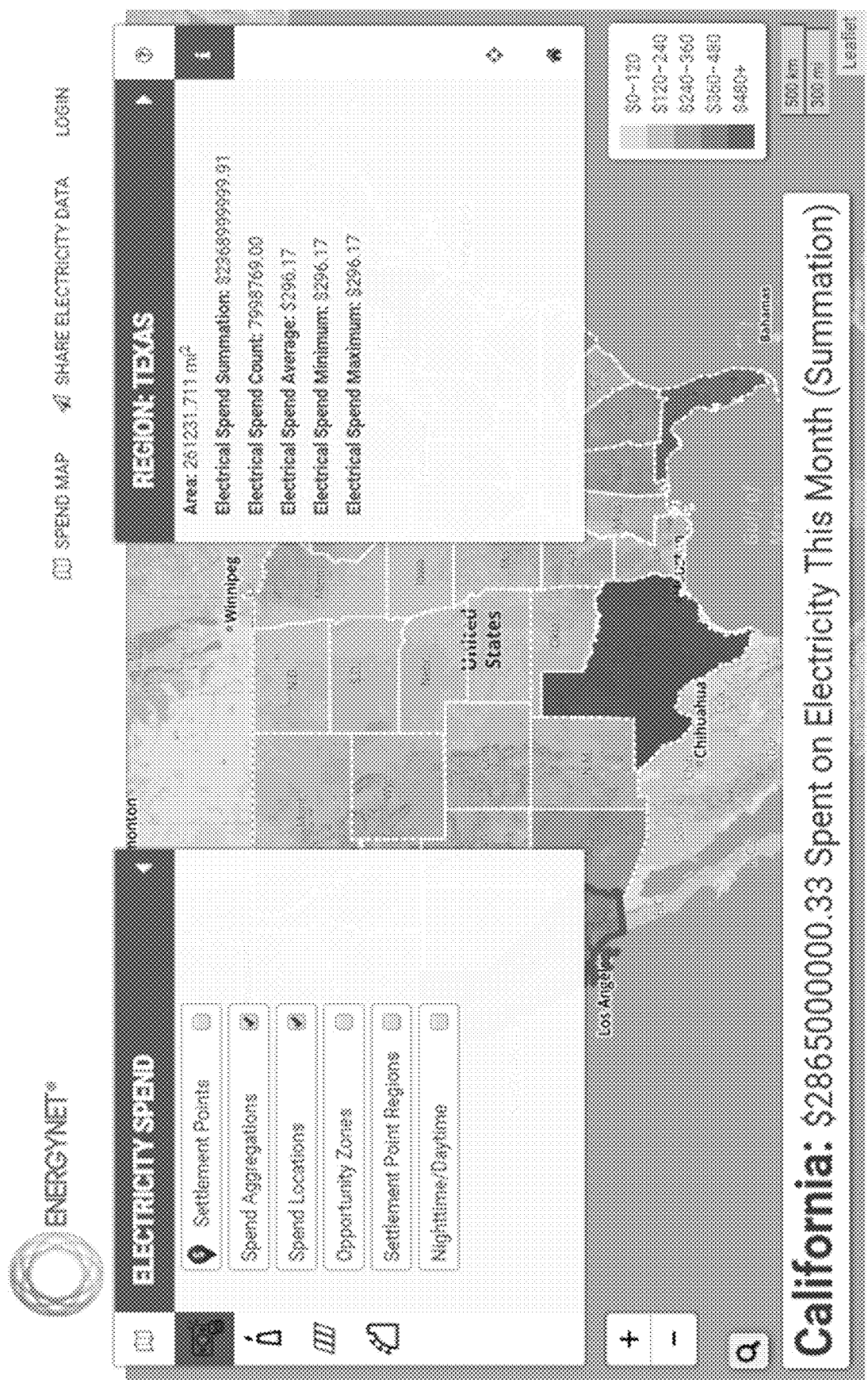
FIG. 56 is a screenshot of a map of an electrical spend map zoomed out to show the Continental United States.
Figure 57:
FIG. 57 is a screenshot of a map of an electrical spend map zoomed in to the region level.
Figure 58:
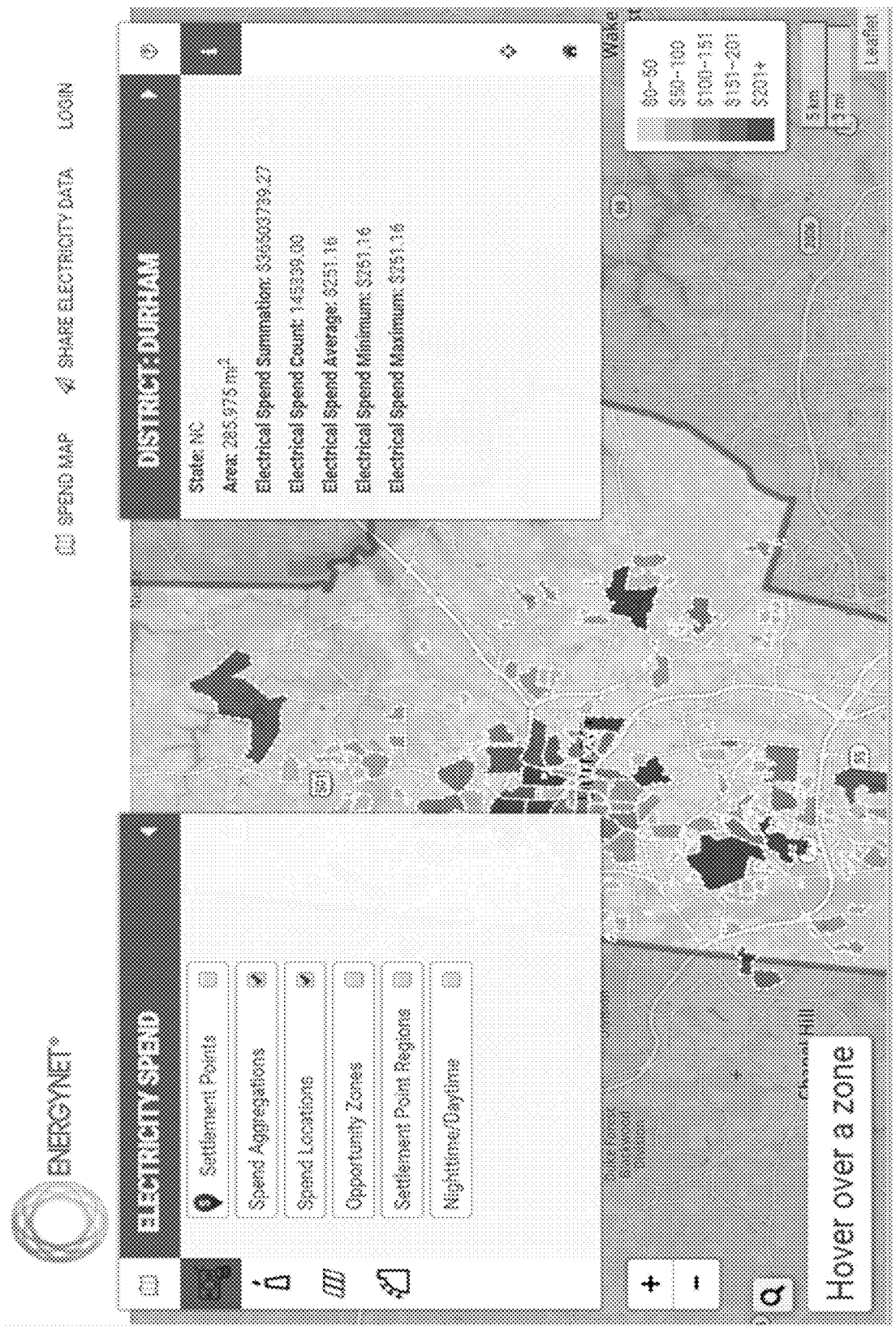
FIG. 58 is a screenshot of a map of an electrical spend map zoomed in to the district level.
Figure 59:
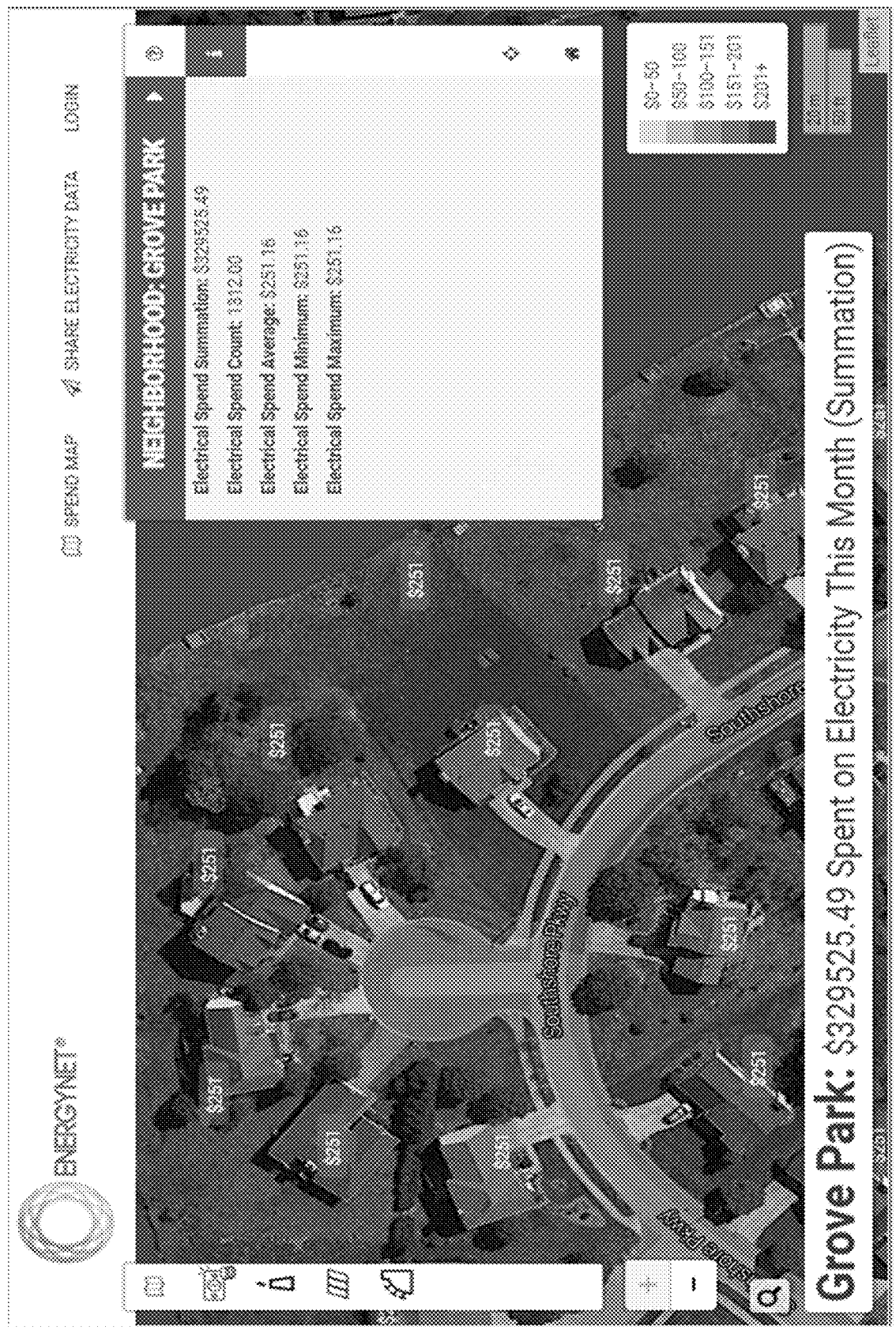
FIG. 59 is a screenshot of a map of an electrical spend map zoomed in to the neighborhood level.

The platform is further operable to display a map of the predicted energy consumption as shown in FIGS. 56-59. FIG. 56 shows an electricity spend map zoomed out to show the Continental United States. FIG. 57 shows an electricity spend map zoomed in to the region level. The area, electrical spend summation, electrical spend count, electrical spend average, electrical spend minimum, and electrical spend maximum are listed in a table. FIG. 58 shows an electricity spend map zoomed in to the district level. The state, area, electrical spend summation, electrical spend count, electrical spend average, electrical spend minimum, and electrical spend maximum are listed in a table. FIG. 59 shows an electricity spend map zoomed in to the neighborhood level. The zoomed in map is a satellite image showing houses in a particular neighborhood. The electrical spend summation, electrical spend count, electrical spend average, electrical spend minimum, and electrical spend maximum are listed in a table. The electrical spend for each house is shown above the house.

In Level 2 (L2) of the present invention, the system receives user inputs that associate at least one grid element with their corresponding user profile. The grid elements include but are not limited to power transfer switches, wind meters, utility meters, battery discharge controllers, tenant sub-meters, solar meters, power distribution units (PDUs), appliance switches, electric vehicle charging stations, distributed energy resources (DERs), transfer switches, electric vehicle batteries, inverters, controllable loads, weather stations, and/or HVAC environments. For example, the system may receive an indication or selection inputs from a user regarding a present or future interest in, or action for installing and operating of, solar panels to their roof for the location associated with their corresponding user profile;

this change and the user's preferences or profile regarding the solar panels is saved in the database.

In Level 3 (L3) of present invention, the at least one utility or market participant and its partners (e.g., vendors) utilize the EnergyNet platform to identify sales opportunities based on data in the database. Data that is anonymized or permission-based access to data from user profiles may be used to provide insights on inefficient devices, defective devices, or devices that require updating to meet current standards. User profile data may also be used to identify related sales opportunities. For example, if energy consumption patterns suggest that the user may be very interested in personal energy conservation, then sales efforts could be directed toward that individual concerning products related to that lifestyle. This information can be used by the utility or its partners to provide incentives to users to buy newer, updated devices, or obtain maintenance for existing devices. The user is given the option to opt out of having his user profile used for sales and marketing efforts, or for regulating energy conservation. The user profile makes use of open standards (such as the CPExchange standard) that specify a privacy model with the user profile. The use of consumption patterns in this manner is governed by national, state, or local privacy laws and regulations.

A further embodiment of using user profiles to identify sales opportunities involves the use of device information to create incentives for users to replace inefficient devices. By identifying the known characteristics and/or behavior of devices within a service point, the invention identifies those users who may benefit from replacement of those devices. The invention estimates a payback period for replacement. This information is used by the utility or its partners to create redemptions, discounts, and campaigns to persuade users to replace their devices.

Users may be grouped by geography or some other common characteristics. For example, groups might include "light consumers" (because they consume little energy), "daytime consumers" (because they work at night), "swimmers" (for those who have a pool and use it), or other categories. Categorizing users into groups allows the utility or its partners or market participants to target sales and marketing efforts to relevant users.

EnergyNet Graphs

Figure 60:
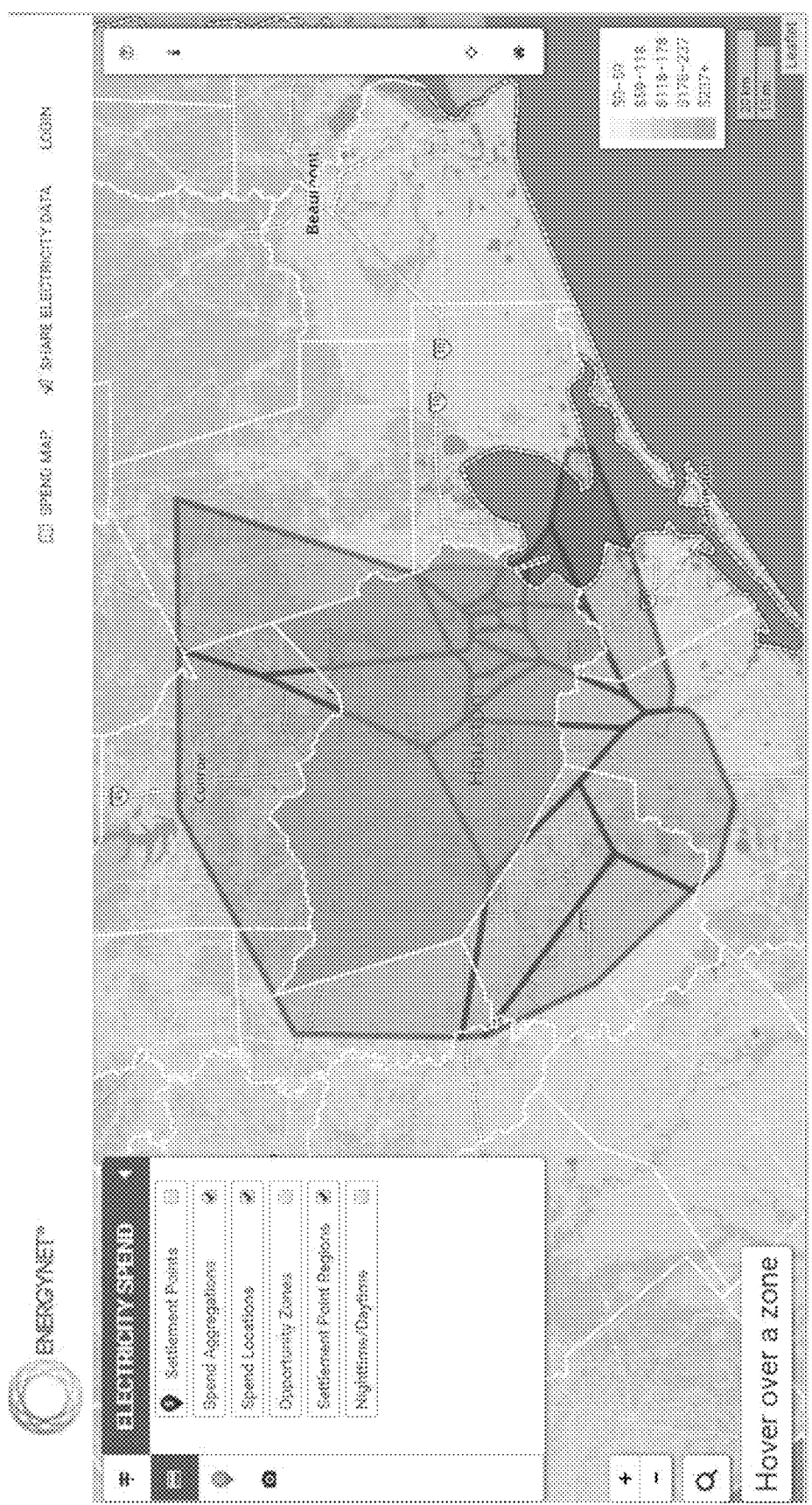
FIG. 60 is a screenshot of a sample settlement pricing zone.
Figure 61:
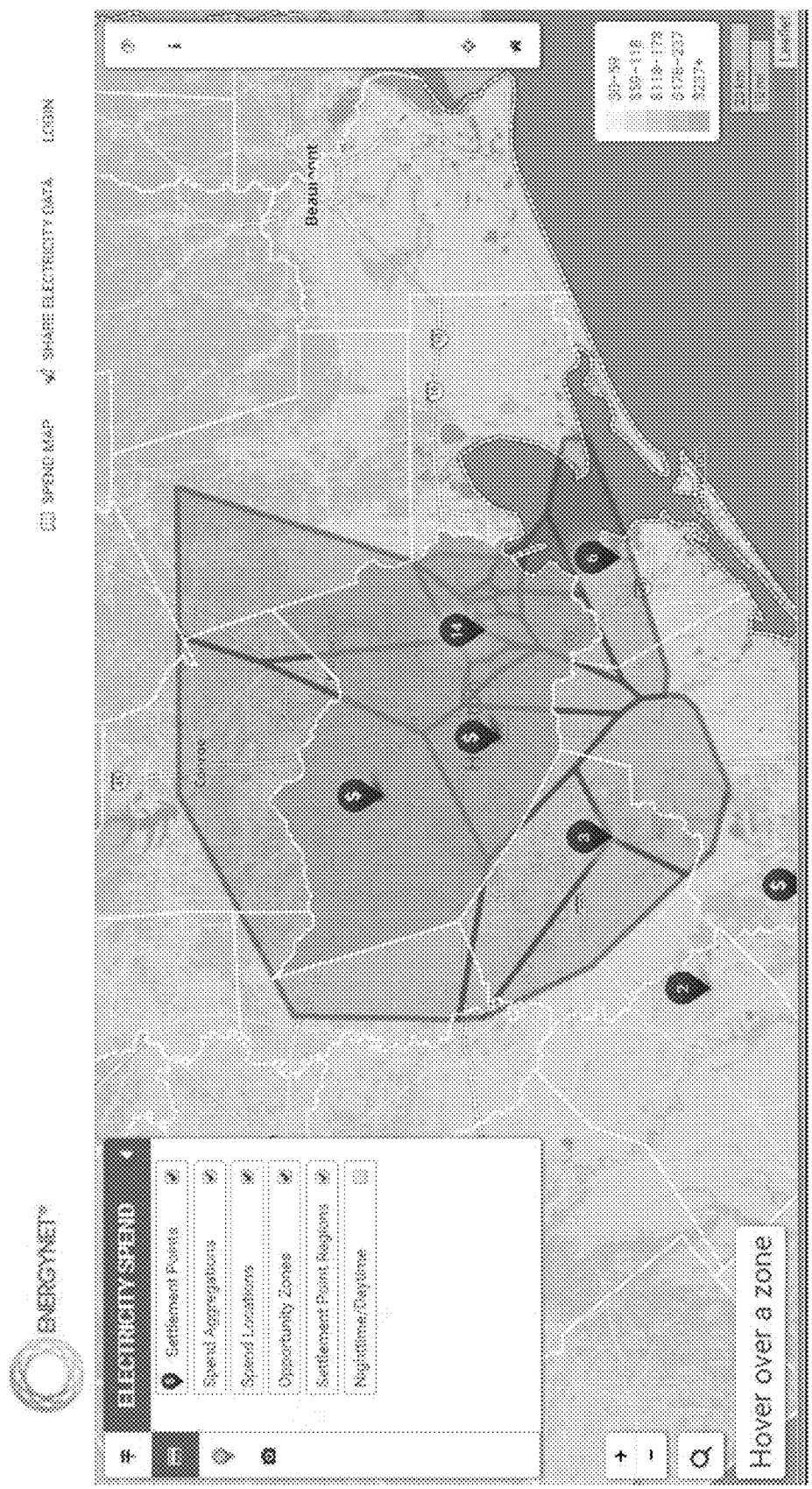
FIG. 61 continues to illustrate the screenshot of FIG. 60 with additional map layers for ERCOT Settlement Points.

FIG. 60 is a screenshot of a sample settlement pricing zone. The blue shaded areas with dark outlines in the figure are settlement zones corresponding to traditional settlement zones established by energy markets, e.g., ERCOT, wherein the market (ERCOT) determines the geographic zones that comprise the settlement zones, wherein electric power grid resources settle energy supplied and load consumed to the nearest resource point or settlement point, which are shown in the additional map layers in FIG. 61. Anything northwest of the blue shaded zone with dark outlines illustrated settles in the uppermost settlement area marked with a "$" on the map. Larger grid elements, by way of example and not limitation, power plants, substations, transmission interconnections, large commercial or industrial locations with their own substations, are also identified and energy settlement and corresponding market-based financial settlement by the market (e.g., ERCOT), which also defines them within its settlement zones and defines the pricing node for them. Locational marginal price (LMP) is based upon where the grid elements (supply or load grid elements) are relative to the blue settlement area with dark outlines marked with a "$" on the map.

Figure 62:
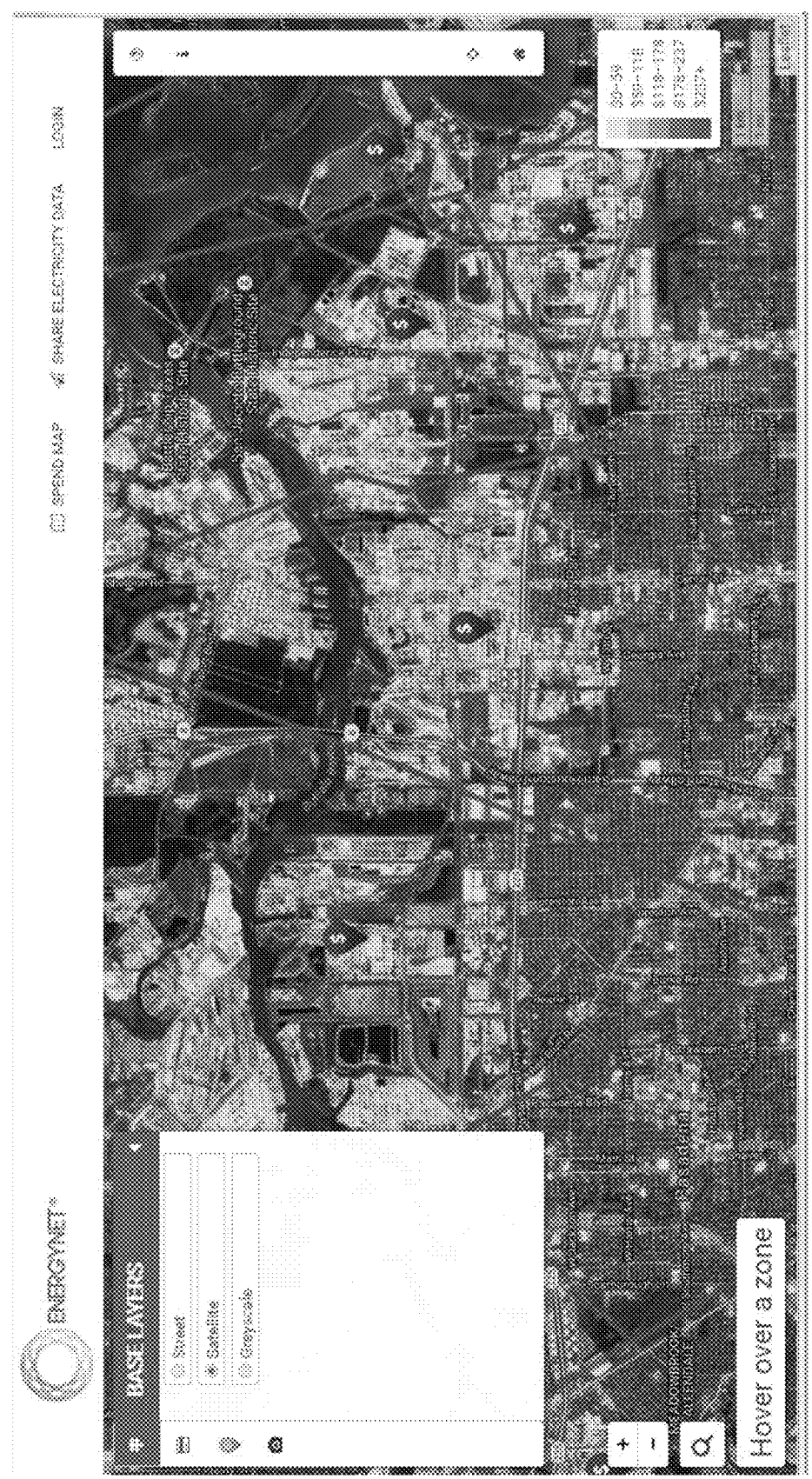
FIG. 62 is a screenshot showing a satellite image of actual settlement points.

FIG. 62 is a screenshot showing a satellite image of actual settlement points. The interface allows the user to zoom in with satellite photography to identify each grid element, e.g., power plant, substation, large commercial and/or industrial grid elements or power supply grid elements. The zones are close together in this view because a commercial facility is drawing significant amounts of power off the distribution of electrical power of the grid. Also illustrated are a power plant and light commercial and/or industrial, and residential consumers in that second zone. While these grid elements and electric power loads exist and are identifiable within the GUIs and within the EnergyNet platform and system, within the EnergyNet platform the traditional zones and nodes established by the market (e.g., ERCOT) are subdivisible into logical points below the LMP or settlement nodes. The systems and methods of the present invention are operable to aggregate and/or directly control load below these traditional zones, nodes, and attachment points. While new loads and new power supply (e.g., new generation source) may be introduced and operable below the traditional zones or nodes, the market (e.g., ERCOT) will not have data associated with those newly introduced and operable grid elements (for load and for supply) unless it is supplied to the market via the EnergyNet platform. For example, if a solar generation grid element and solar energy fuel cell or storage is introduced to the electrical power grid via the EnergyNet platform and located within one of the illustrated traditional zones, then it is operable to start introducing power for distribution at the proximal substation. The market would only be able to detect that a lower amount of electrical power is being drawn at the substation level or traditional zone. However, after the solar generation grid element and solar energy fuel cell or storage is registered and active within the EnergyNet platform, energy settlement and market-based financial settlement for the electrical power introduced or supplied to the electric power grid is provided at the point of attachment (attachment point) for those solar grid elements. This contrasts with prior art, where the market cannot detect or settle energy or provide for market-based financial settlement below the traditional zones or substation level.

Figure 63:
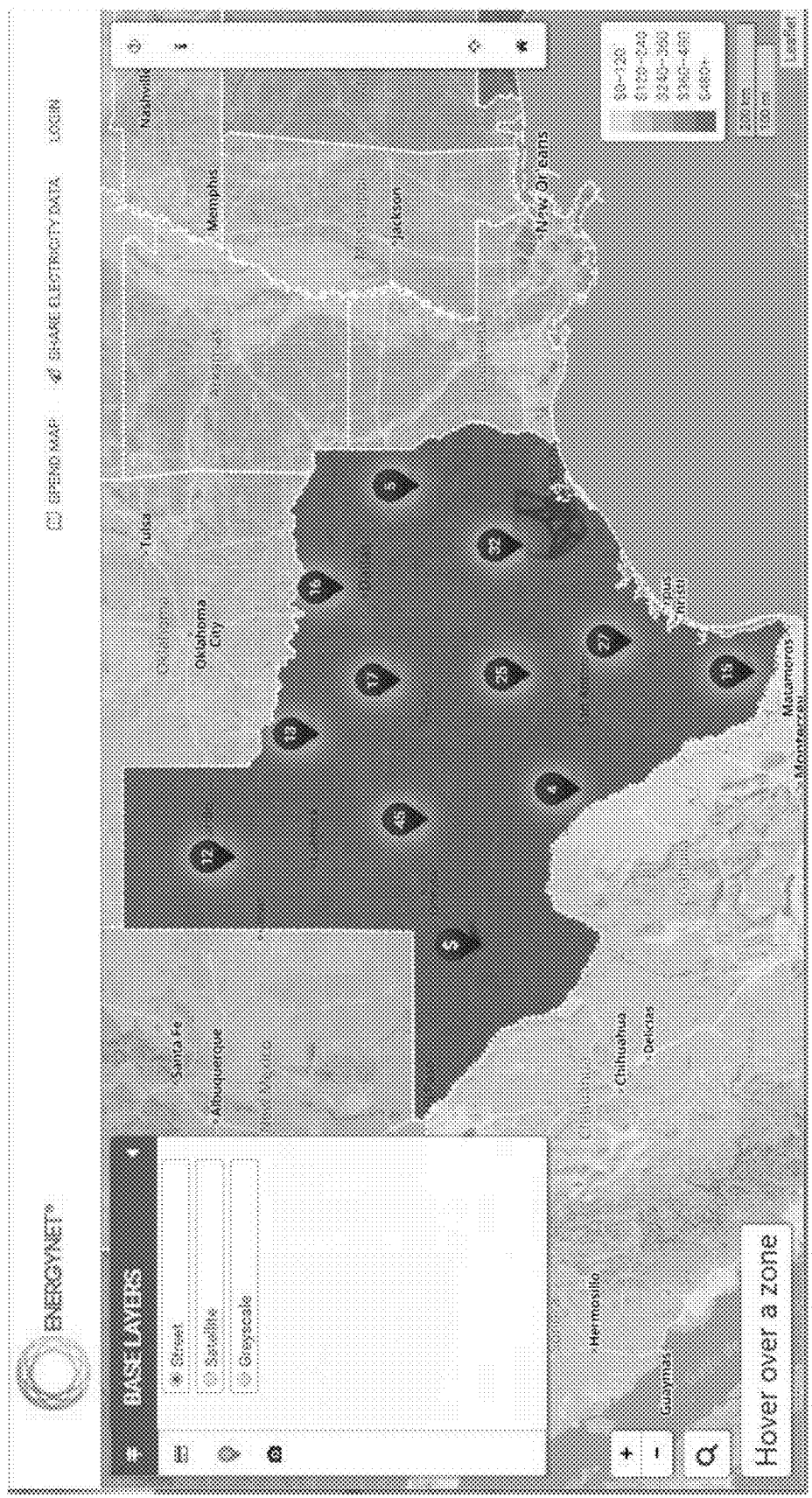
FIG. 63 is a screenshot of an overview of ERCOT Settlement Zones.

FIG. 63 is a screenshot of an overview of ERCOT Settlement Zones. The number inside the point represents the number of nodes geographically at each point. For example, there are 17 subnodes within the location marked with a "17" on the map, and 16 subnodes within the location marked with a "16" on the map; these subnodes correspond to ERCOT subnodes, which provide for settlement zones at Level 4 within the system.

Financial Model Visualization Interface

A financial model visualization interface allows at least one utility or market participant, to run Monte Carlo simulations for adding new meters to the market, energy usage distribution, and/or energy generation distribution. Adjusting the simulation parameters (e.g., mean, standard deviation, skewness) provides for minimizing or managing risk for decision-making and investment related to the electric power grid, and to better predict outcomes.

Figure 64:
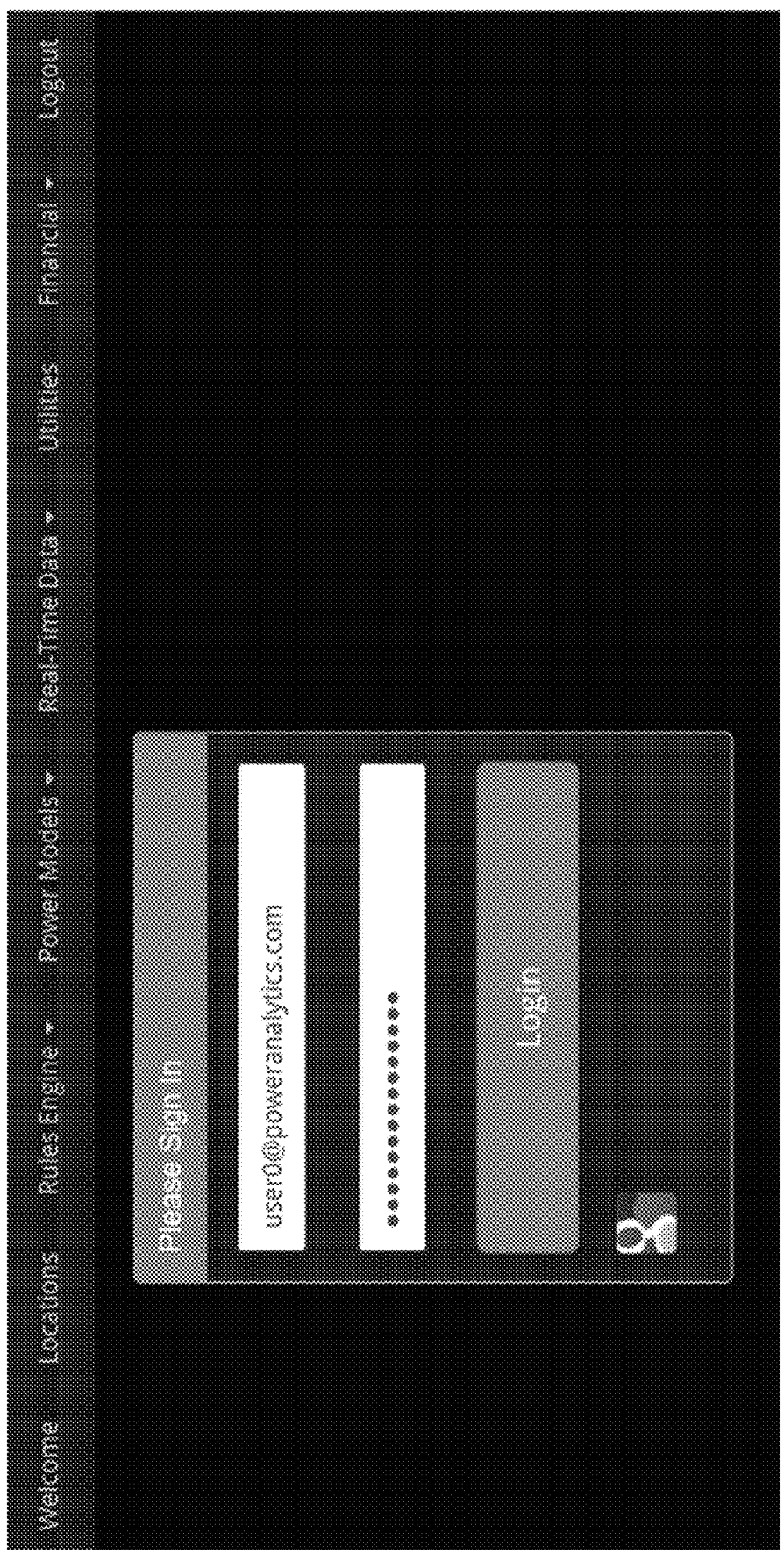
FIG. 64 is a screenshot of the log in screen for a financial model visualization interface.
Figure 65:
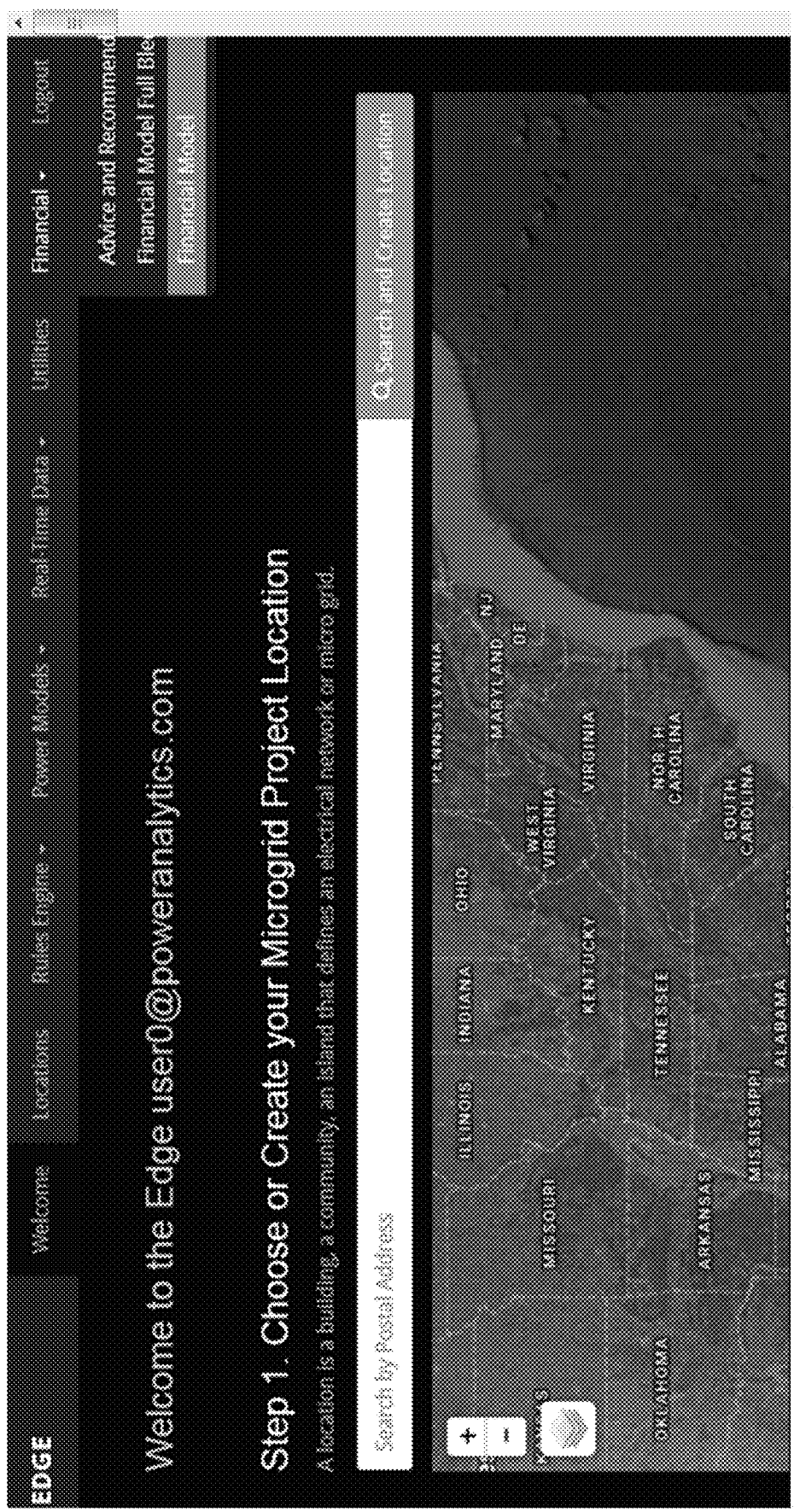
FIG. 65 is a screenshot showing the selection of the financial model from the dropdown menu.
Figure 66:
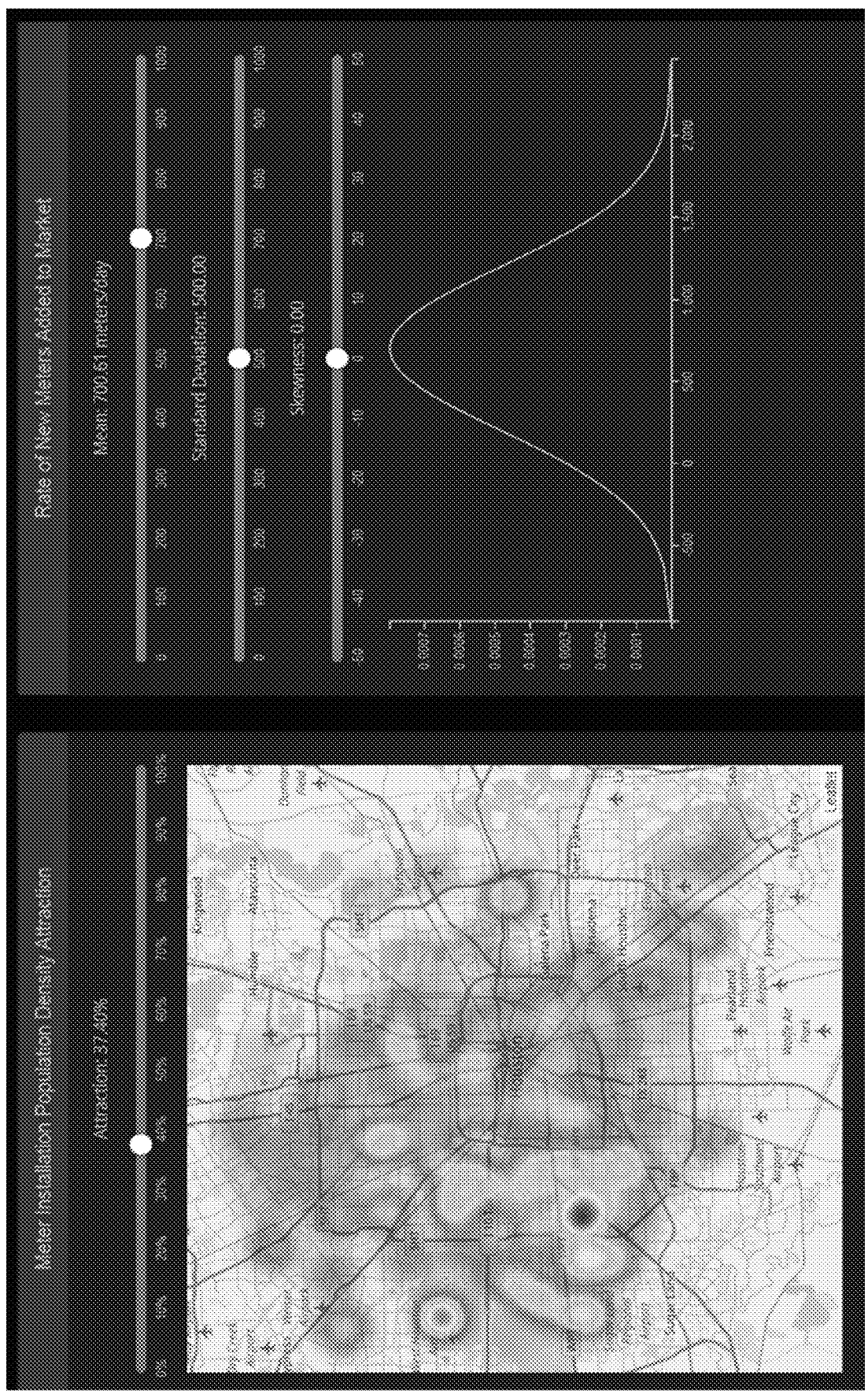
FIG. 66 is a screenshot of a financial model page.
Figure 67:
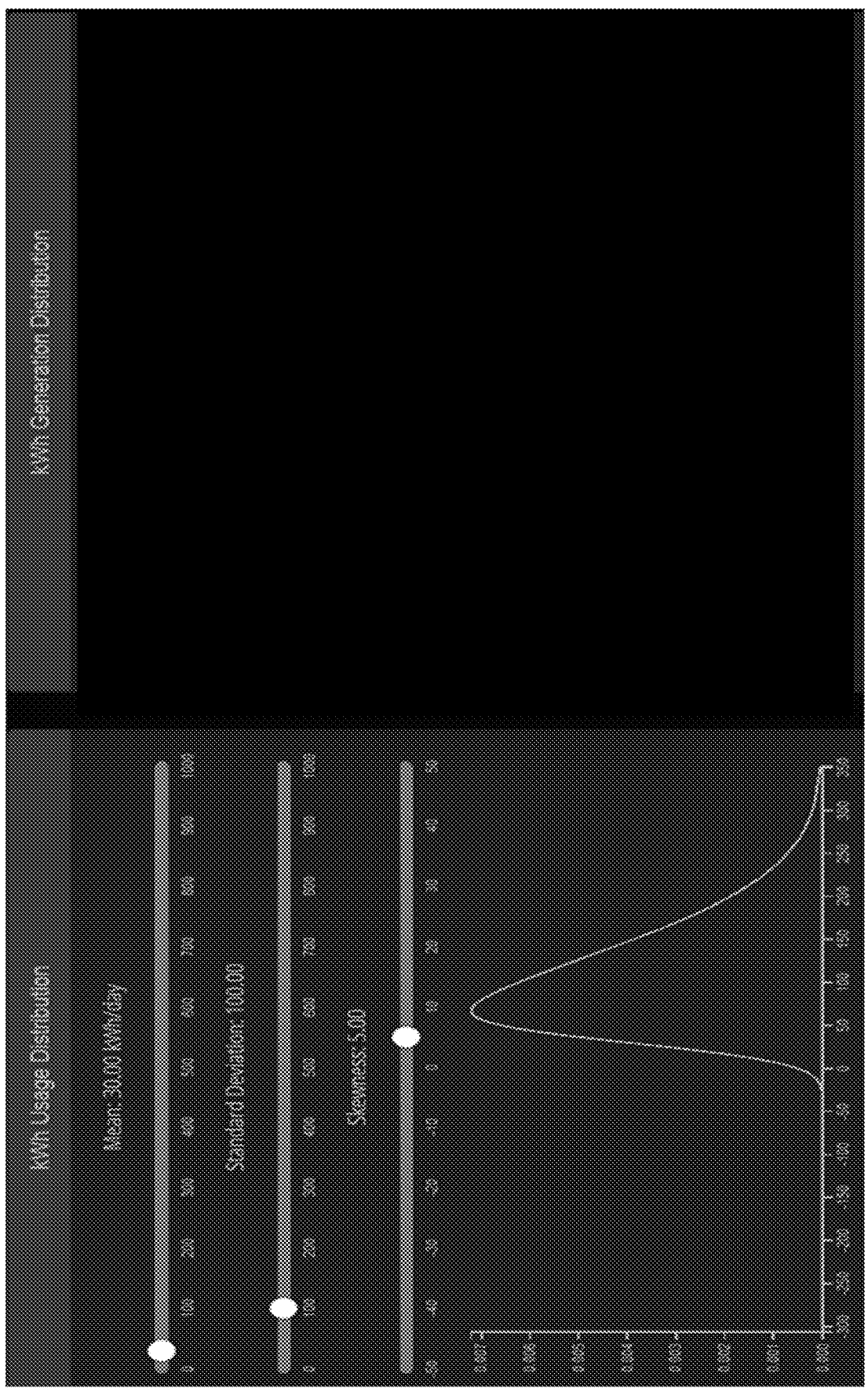
FIG. 67 is a screenshot showing kilowatt hour (kWh) Usage Distribution and kWh Generation Distribution.

FIG. 64 is a screenshot of the log in screen for a financial model visualization interface. In a preferred embodiment, the user can sign in to system and authorize the application with an account provided by a third party, e.g., Google. FIG. 65 is a screenshot showing the selection of the financial model from the dropdown menu. FIG. 66 is a screenshot of a financial model page. The left half of the screen shows a meter installation population density attraction with a heat map. The attraction percentage can be adjusted with a sliding bar. The right half of the screen shows the rate of new meters added to the market. The mean rate of new meters added to the market per day, the standard deviation, and the skewness can be adjusted with a sliding bar. A graph displays the rate of new meters added to the market based on the mean, standard deviation, and skewness selected. FIG. 67 is a screenshot showing kWh Usage Distribution and kWh Generation Distribution. These left half of the screen shows kWh Usage Distribution. The mean energy usage, standard deviation, and the skewness can be adjusted with a sliding bar. A graph displays the kWh usage distribution based on the mean, standard deviation, and skewness selected. The right half of the screen is to display kWh Generation Distribution. Users would be able to adjust the mean energy generation, standard deviation, and the skewness in much the same way as for kWh Usage Distribution. A graph could also be displayed with the kWh generation distribution based on the mean, standard deviation, and skewness selected. Skewness values may differ for residential, commercial, and industrial uses.

Figure 68:
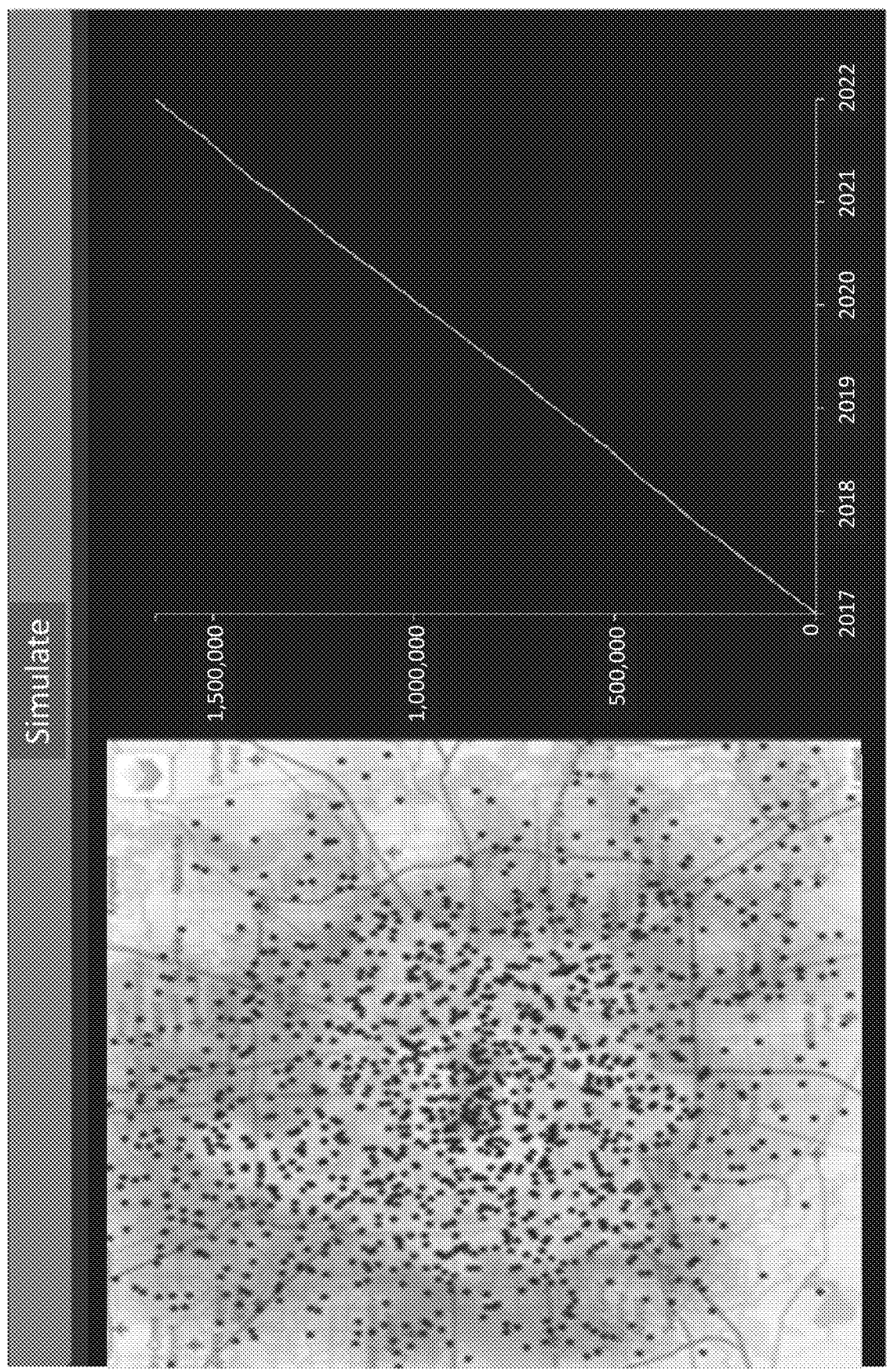
FIG. 68 is a screenshot of a simulation showing meter distributions randomly added to the map over time.
Figure 69:
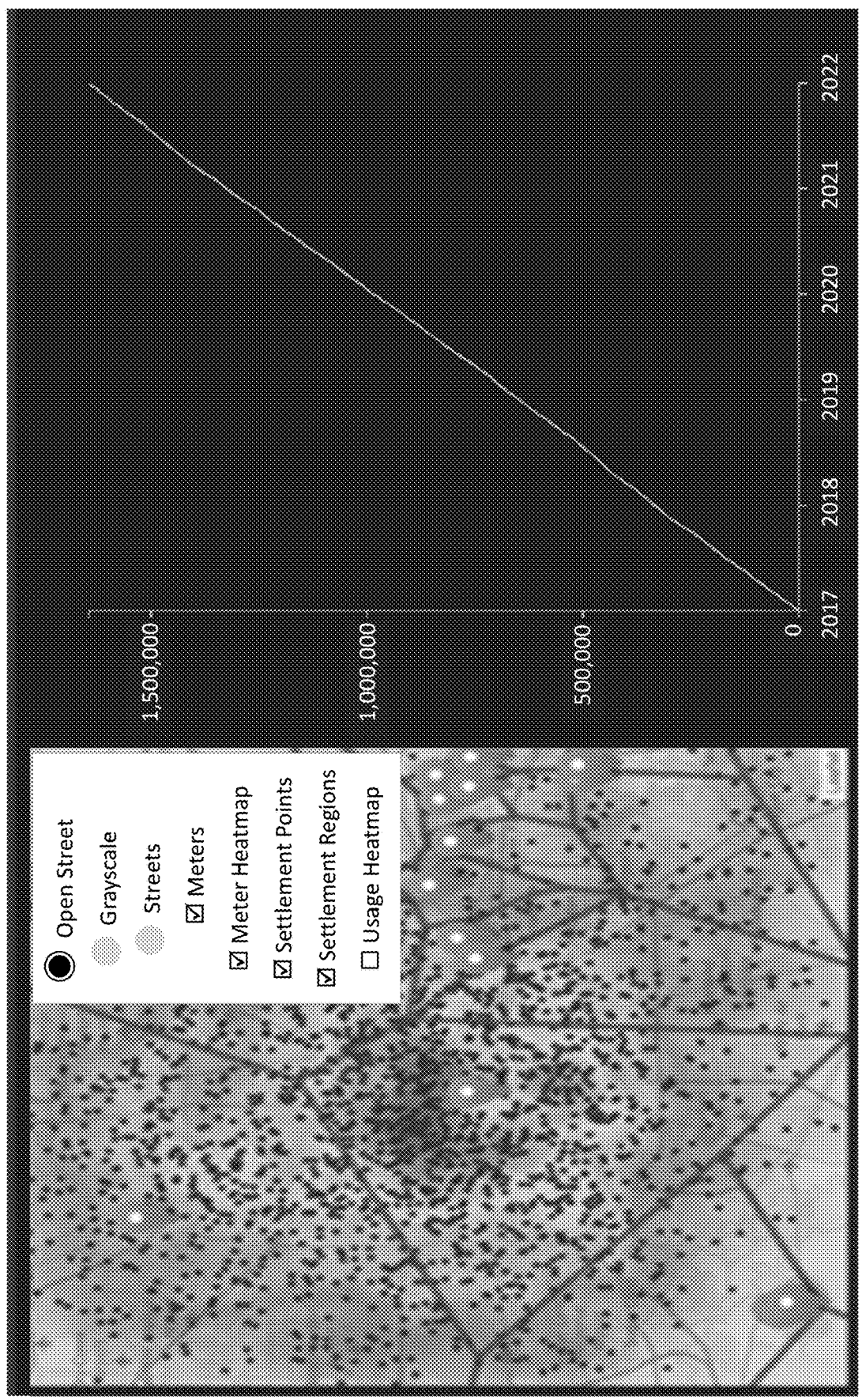
FIG. 69 continues to illustrate the screenshot of FIG. 68 with additional map layers for ERCOT Settlement Points.

FIG. 68 is a screenshot of a simulation showing meter distributions randomly added to the map over time. A map is shown on the left half of the screen showing a meter heatmap with the dots representing meters. A graph is shown on the right half of the screen showing the increase in the number of meters on the y-axis and time on the x-axis based on the parameters selected. FIG. 69 continues to illustrate the screenshot of FIG. 68 with additional map layers for ERCOT Settlement Points. The user can select the following levels: meters, meter heatmap, settlement points, settlement regions, and usage heatmap. The user can also view the map as open street, grayscale, and streets. A map is shown on the left half of the screen showing a meter heatmap, settlement points, meters, and settlement regions. A graph is shown on the right half of the screen showing the increase in the number of meters on the y-axis and time on the x-axis based on the parameters selected.

The following are incorporated herein by reference in their entirety: the NY REV order, CAL ISO rules and proposed rules and subsequent order for DER marketplace, ERCOT presentation stakeholder concerns, and terms and their definitions: telemetry light, telemetry medium, etc.

Certain modifications and improvements will occur to those skilled in the art upon a reading of the foregoing description. For example, Software as a Service (SaaS) or Platform as a Service (PaaS) may be provided in embodiments of the present invention. Also, updated communications such as 5G and later alternatives are considered within the scope of the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for managing an advanced energy network comprising:
   a server platform and at least one server computer associated with the server platform;
   wherein the at least one server computer is constructed and configured for network-based communication with an electric power grid and at least one computing device; and
   wherein the server platform interacts with the electric power grid and the at least one computing device via the at least one server computer;
   wherein the electric power grid includes a multiplicity of grid elements;
   wherein the server platform is operable to provide at least one interactive graphical user interface (GUI) for the at least one computing device;
   wherein the server platform is operable to:
   create a device profile for at least one device via the at least one interactive GUI;
   collect energy usage data from the multiplicity of grid elements;
   build a power model of the electric power grid via the at least one interactive GUI based on the energy usage data from the multiplicity of grid elements, historical data of the multiplicity of grid elements, and/or a current environment of the electric power grid;
   control a participation of at least one of the multiplicity of grid elements based on market information and revenue grade metrology data for the at least one of the multiplicity of grid elements in real-time or near real-time;
   perform energy financial settlements for the participation of the at least one of the multiplicity of grid elements based on the market information and the revenue grade metrology data; and
   generate and transmit predictive energy consumption data, control information for the participation of the at least one of the multiplicity of grid elements, and energy settlement data to the at least one computing device for displaying the predictive energy consumption data, the control information for the participation of the at least one of the multiplicity of grid elements, and the energy settlement data via the at least one interactive GUI.

2. The system of claim 1, wherein the predictive energy consumption data is based on the energy usage data and the historical data of the multiplicity of grid elements.

3. The system of claim 1, wherein the server platform is operable to collect historical energy usage data from a utility bill uploaded to the server platform, and wherein the server platform is further operable to automatically recognize the format of the utility bill.

4. The system of claim 1, wherein the server platform automatically populates a database based on historical energy usage data, and wherein the database stores the energy usage data and the predictive energy consumption data.

5. The system of claim 1, wherein the predictive energy consumption data is based on a plurality of variability factors including outside temperature, sunlight, humidity, wind speed and direction, elevation above sea level, orientation of a service point structure, duty duration and percentage, set point difference, current and historical room temperature, size of structure, number of floors, types of construction, color of structure, type of roofing material and color, construction surface of structure, land use, latitude and longitude, relative position to jet steam, quality of power to device, number of people living in and/or using structure, age of structure, type of heating, lot description, type of water, square footage, and/or other environmental factors.

6. The system of claim 1, wherein the server platform is further operable to display a map including the predictive energy consumption data.

7. The system of claim 1, wherein the participation of the at least one of the multiplicity of grid elements includes supplying, consuming, and/or curtailing power.

8. A system for managing an advanced energy network comprising:

a server platform and at least one server computer associated with the server platform;
wherein the at least one server computer is constructed and configured for network-based communication with an electric power grid and at least one computing device; and
wherein the server platform interacts with the electric power grid and the at least one computing device via the at least one server computer;
wherein the electric power grid includes a multiplicity of grid elements;
wherein the server platform is operable to provide at least one interactive graphical user interface (GUI) for the at least one computing device;
wherein the server platform is operable to:
build a power model of the electric power grid via the at least one interactive GUI based on energy usage data from the multiplicity of grid elements, historical data of the multiplicity of grid elements, and a current environment of the electric power gird;
control a participation of at least one of the multiplicity of grid elements based on market information and revenue grade metrology data for the at least one of the multiplicity of grid elements in real-time or near real-time;
perform energy financial settlements for the participation of the at least one of the multiplicity of grid elements based on the market information and the revenue grade metrology data for the at least one of the multiplicity of grid elements in real-time or near real-time; and
transmit predictive energy consumption data, control information for the participation of the at least one of the multiplicity of grid elements, and energy settlement data to the at least one computing device.

9. The system of claim 8, wherein the server platform is further operable to build a pro forma power model, and wherein the pro forma power model includes at least one generator and/or at least one load device.

10. The system of claim 8, wherein the server platform is operable to dynamically update the power model of the electric power grid when a grid element is coupled to or decoupled from the electric power grid.

11. The system of claim 8, wherein the server platform is operable to create a device profile for at least one device via the at least one interactive GUI, wherein the device profile includes energy consumption data, an energy rate plan, at least one grid element associated with the at least one device, a service address, a building type, historical and/or current bill dates, a geodetic location, and/or a customer program enrollment status.

12. The system of claim 8, wherein the power model is operable to recommend a power usage plan based on a set of energy preferences including a cost, a payment preference, renewability of energy, market supply, energy consumption data, and/or minimum and maximum usage constraints.

13. The system of claim 8, wherein the power model is operable to provide an interconnection for a point of attachment for the at least one of the multiplicity of grid elements and at least one market-based financial settlement point.

14. The system of claim 8, wherein the power model is operable to provide energy financing information and/or energy capacity program information via the at least one interactive GUI.

15. The system of claim 8, wherein the server platform is further operable to generate a cost curve based on the power model, wherein the cost curve indicates a predicted energy consumption cost and/or a funds receivable value based upon participation in at least one energy program.

16. A system for managing an advanced energy network comprising:
a server platform and at least one server computer associated with the server platform;
wherein the at least one server computer is constructed and configured for network-based communication with an electric power grid and at least one computing device; and
wherein the server platform interacts with the electric power grid and the at least one computing device via the at least one server computer;
wherein the electric power grid includes a multiplicity of grid elements;
wherein the server platform is operable to provide at least one interactive graphical user interface (GUI) for the at least one computing device;
wherein the server platform is operable to:
create a device profile for at least one device;
build a power model for the electric power grid based on energy usage data from the multiplicity of grid elements, historical data of the multiplicity of grid elements, and/or a current environment of the electric power grid;
generate predictive energy consumption data;
control a participation of at least one of the multiplicity of grid elements;
perform energy financial settlements for the participation of the at least one of the multiplicity of grid elements; and
transmit the predictive energy consumption data, control information for the participation of the at least one of the multiplicity of grid elements, and energy settlement data to the at least one computing device for displaying the predictive energy consumption data, the control information for the participation of the at least one of the multiplicity of grid elements, and the energy settlement data via the at least one interactive GUI.

17. The system of claim 16, wherein the server platform is operable to perform settlements for electrical power introduced and/or supplied to the electric power grid at a point of attachment for the at least one of the multiplicity of grid elements.

18. The system of claim 16, wherein the at least one interactive GUI includes at least one view interface operable for searching energy customers, managing energy portfolios on a marketplace, displaying information for energy transactions, controlling and displaying behaviors of distributed energy resources (DERs) in the electric power grid, displaying a heat map of DERs including available and running capacity, facilitating interconnection requests and studies in the electric power grid, visualizing meter installation, visualizing energy usage distribution, and/or visualizing energy generation distribution.

19. The system of claim 16, wherein the server platform is operable to provide information contained in the device profile for sales and marketing efforts by at least one of a vendor, a utility, and/or a utility partner, and wherein the information contained in the device profile is anonymized.

20. The system of claim 16, wherein the energy settlement data is aggregated into at least one settlement block in real-time or near real-time, and wherein the at least one settlement block includes revenue grade metrology data for the at least one of the multiplicity of grid elements.

\* \* \* \* \*